(12) United States Patent
Muralidhar et al.

(10) Patent No.: US 9,130,789 B2
(45) Date of Patent: Sep. 8, 2015

(54) RECOVERING DATA FROM A SECONDARY ONE OF SIMULTANEOUS SIGNALS, SUCH AS ORTHOGONAL-FREQUENCY-DIVISION-MULTIPLEXED (OFDM) SIGNALS, THAT INCLUDE A SAME FREQUENCY

(75) Inventors: Karthik Muralidhar, Bangalore (IN); George A. Vlantis, Sunnyvale, CA (US)

(73) Assignees: STMICROELECTRONICS ASIA PACIFIC PTE. LTD., Singapore (SG); STMICROELECTRONICS, INC., Coppell, TX (US)

( * ) Notice: Subject to any disclaimer, the term of this patent is extended or adjusted under 35 U.S.C. 154(b) by 253 days.

(21) Appl. No.: 13/560,947

(22) Filed: Jul. 27, 2012

(65) Prior Publication Data

US 2013/0022091 A1 Jan. 24, 2013

Related U.S. Application Data

(63) Continuation-in-part of application No. 13/284,879, filed on Oct. 29, 2011, and a continuation-in-part of application No. 13/284,890, filed on Oct. 29, 2011, which is a continuation-in-part of application No.

(Continued)

(51) Int. Cl.
*H04B 1/40* (2015.01)
*H04L 25/02* (2006.01)
(Continued)

(52) U.S. Cl.
CPC ............ *H04L 25/022* (2013.01); *H04L 5/0048* (2013.01); *H04L 25/03821* (2013.01);
(Continued)

(58) Field of Classification Search
CPC . H04L 25/022; H04L 5/0048; H04L 27/2601; H04L 25/03821
USPC .......................................... 375/219, 260, 340
See application file for complete search history.

(56) References Cited

U.S. PATENT DOCUMENTS 5,852,630 A * 12/1998 Langberg et al. ............. 375/219
6,680,901 B1 1/2004 Yamamoto et al.
(Continued)

OTHER PUBLICATIONS

Karthik Muralidhar and Kwok Hung Li, "A Low-Complexity Kalman Approach for Channel Estimation in Doubly-Selective OFDM Systems", IEEE Signal Processing Letters, vol. 16, No. 7, Jul. 2009, pp. 632-635.
(Continued)

*Primary Examiner* — Shuwang Liu
*Assistant Examiner* — Helene Tayong
(74) *Attorney, Agent, or Firm* — Allen, Dyer, Doppelt, Milbrath & Gilchrist, P.A.

(57) ABSTRACT

An embodiment of a receiver includes a channel estimator and a data-recovery unit. The channel estimator is configured to determine a characteristic of a channel over which a first signal, which is received simultaneously with a second signal, propagated, the first and second signals respectively having first and second components that include approximately a frequency. And the data-recovery unit is configured to recover data from the first signal in response to the determined channel characteristic. For example, such a receiver may be able to receive simultaneously, and over the same channel space, orthogonal-frequency-division-multiplexed (OFDM) signals that include one or more of the same subcarrier frequencies, and to recover data from one or more of the OFDM signals despite the frequency overlap. A receiver with this capability may allow an increase in the effective bandwidth of the channel space, and thus may allow more devices to simultaneously share the channel space.

13 Claims, 15 Drawing Sheets

Related U.S. Application Data

13/284,894, filed on Oct. 29, 2011, which is a continuation-in-part of application No. 13/284,898, filed on Oct. 29, 2011, said application No. 13/284,879 is a continuation-in-part of application No. 12/963,569, filed on Dec. 8, 2010, now Pat. No. 9,020,050, said application No. 13/284,879 is a continuation-in-part of application No. 12/579,935, filed on Oct. 15, 2009, now Pat. No. 8,737,536, said application No. 13/284,879 is a continuation-in-part of application No. 12/579,969, filed on Oct. 15, 2009, now Pat. No. 8,718,208, said application No. 13/284,890 is a continuation-in-part of application No. 12/963,569, filed on Dec. 8, 2010, now Pat. No. 9,020,050, said application No. 13/284,890 is a continuation-in-part of application No. 12/579,969, filed on Oct. 15, 2009, now Pat. No. 8,737,536, said application No. 13/284,894 is a continuation-in-part of application No. 12/963,569, filed on Dec. 8, 2010, now Pat. No. 9,020,050, said application No. 13/284,894 is a continuation-in-part of application No. 12/579,935, filed on Oct. 15, 2009, now Pat. No. 8,737,536, said application No. 13/284,894 is a continuation-in-part of application No. 12/579,969, filed on Oct. 15, 2009, now Pat. No. 8,718,208, said application No. 13/284,898 is a continuation-in-part of application No. 12/963,569, filed on Dec. 8, 2008, now Pat. No. 9,020,050, said application No. 13/284,898 is a continuation-in-part of application No. 12/579,935, filed on Oct. 15, 2009, now Pat. No. 8,737,536, said application No. 13/284,898 is a continuation-in-part of application No. 12/579,969, filed on Oct. 15, 2009, now Pat. No. 8,718,208.

(60) Provisional application No. 61/495,218, filed on Jun. 9, 2011, provisional application No. 61/360,367, filed on Jun. 30, 2010, provisional application No. 61/267,667, filed on Dec. 8, 2009, provisional application No. 61/158,290, filed on Mar. 6, 2009, provisional application No. 61/105,704, filed on Oct. 15, 2008.

(51) Int. Cl.
*H04L 25/03* (2006.01)
*H04L 27/26* (2006.01)
*H04L 5/00* (2006.01)

(52) U.S. Cl.
CPC ........... *H04L27/2601* (2013.01); *H04L 5/0023* (2013.01); *H04L 25/0204* (2013.01); *H04L 25/0224* (2013.01)

(56) References Cited

U.S. PATENT DOCUMENTS

| | | | |
|---|---|---|---|
| 7,961,696 B2 * | 6/2011 | Ma et al. .................... | 370/344 |
| 8,446,998 B2 | 5/2013 | Rezvani et al. | |
| 8,488,694 B2 | 7/2013 | Wu et al. | |
| 8,565,339 B2 * | 10/2013 | Ko et al. ..................... | 375/295 |
| 2002/0018483 A1 | 2/2002 | Kuwabara et al. | |
| 2003/0058951 A1 * | 3/2003 | Thomson et al. ............ | 375/260 |
| 2003/0129951 A1 * | 7/2003 | Tandy ........................ | 455/90 |
| 2003/0181163 A1 | 9/2003 | Ofuji et al. | |
| 2005/0201268 A1 | 9/2005 | Aoki et al. | |
| 2006/0209979 A1 | 9/2006 | Sandell et al. | |
| 2007/0121750 A1 | 5/2007 | Shirakata et al. | |
| 2007/0133699 A1 | 6/2007 | Roh et al. | |
| 2007/0248151 A1 | 10/2007 | Kim et al. | |
| 2007/0263667 A1 | 11/2007 | Dubuc et al. | |
| 2007/0297522 A1 | 12/2007 | Baggen et al. | |
| 2008/0002645 A1 * | 1/2008 | Seki et al. ................... | 370/338 |
| 2008/0144486 A1 | 6/2008 | Wilhelmsson et al. | |
| 2008/0219343 A1 * | 9/2008 | Wu et al. ..................... | 375/232 |
| 2008/0225934 A1 | 9/2008 | Mourad et al. | |
| 2008/0298264 A1 * | 12/2008 | Ramesh et al. ............. | 370/252 |
| 2009/0034659 A1 * | 2/2009 | Beaulieu et al. ............ | 375/340 |
| 2009/0052566 A1 | 2/2009 | Maltsev et al. | |
| 2009/0103568 A1 | 4/2009 | Garba et al. | |
| 2009/0154625 A1 | 6/2009 | Kwak et al. | |
| 2010/0091898 A1 | 4/2010 | Muralidhar et al. | |
| 2010/0098198 A1 | 4/2010 | Muralidhar et al. | |
| 2010/0166118 A1 | 7/2010 | Mantravadi et al. | |
| 2011/0110323 A1 * | 5/2011 | Kim et al. .................... | 370/329 |
| 2011/0129024 A1 | 6/2011 | Karthik | |
| 2011/0211630 A1 | 9/2011 | Nakahara et al. | |
| 2012/0045008 A1 | 2/2012 | Karthik et al. | |
| 2012/0114053 A1 | 5/2012 | Karthik et al. | |
| 2012/0114069 A1 | 5/2012 | Karthik et al. | |
| 2012/0114080 A1 | 5/2012 | Karthik et al. | |
| 2012/0287974 A1 | 11/2012 | Muralidhar et al. | |
| 2012/0300866 A1 | 11/2012 | Muralidhar et al. | |

OTHER PUBLICATIONS

Karthik Muralidhar, Evelyn Kurniawati, Samsudin Ng, "Further Results on the VSSO Kalman Channel Estimator for Doubly-Selective OFDM Systems", pp. 4.

Osvaldo Simeone, Yeheskel Bar-Ness, and Umberto Spagnolini, "Pilot-Based Channel Estimation for OFDM Systems by Tracking the Delay-Subspace", IEEE Transactions on Wireless Communications, vol. 3, No. 1, Jan. 2004, pp. 315-325.

Zijian Tang, Rocco Claudio Cannizzaro, Geert Leus, and Paolo Banelli, "Pilot-Assisted Time-Varying Channel Estimation for OFDM Systems", IEEE Transactions on Signal Processing, vol. 55, No. 5, May 2007, pp. 2226-2238.

M. R. Raghavendra, S. Bhashyam, and K. Giridhar, "Exploiting Hopping Pilots for Parametric Channel Estimation in OFDM Systems", IEEE Signal Processing Letters, vol. 12, No. 11, Nov. 2005, pp. 737-740.

Baoguo Yang, Khaled Ben Letaief, Roger S. Cheng, and Zhigang Cao, "Channel Estimation for OFDM Transmission in Multipath Fading Channels Based on Parametric Channel Modeling", IEEE Transactions on Communications, vol. 49, No. 3, Mar. 2001, pp. 467-479.

Karkarthik Muralidhar, Li Kwok Hung and Ying Chang Liang, "Low-Complexity Equalisation Methods for OFDM Systems in doubly Selective Channels", Vehicular Technology Conference, 2008. VCT Spring 2008. IEEE, May 11-14, 2008, Singapore, pp. 683-687.

S. M. Kay, "Fundamentals of Statistical signal processing: Estimation Theory," vol. 1, Prentice Hall: New Jersey, 1993, pp. 6.

Proakis, "Digital Communications," McGraw Hill, 1995, pp. 4.

Xiaodong Cai and Georgios B. Giannakis, "Bounding Performance and Suppressing Intercarrier Interference in Wireless Mobile OFDM", IEEE Transactions on Communications, vol. 51, No. 12, Dec. 2003, pp. 2047-2056.

Paolo Banelli, Rocco Claudio Cannizzaro, and Luca Rugini, "Data-Aided Kalman Tracking for Channel Estimation in Doppler-Affected OFDM Systems", ICASSP 2007, IEEE 2007, pp. 133-136.

Hongmei Wang, Xiang Chen, Shidong Zhou, Ming Zhao, and Yan Yao, "Letter—Low-Complexity ICI Cancellation in Frequency Domain for OFDM Systems in Time-Varying Multipath Channels", IEICE Trans. Commun., vol. E89-B, No. 3, Mar. 2006, pp. 1020-1023.

U.S. Appl. No. 12/579,935, entitled: "Recovery of Data From a Multi Carrier Signal", filed Oct. 15, 2009, pp. 52.

U.S. Appl. No. 12/579,969, entitled: "Recovery of Data From a Multi Carrier Signal", filed Oct. 15, 2009, pp. 55.

DVB Mobile TV—DVB-H—DVB-SH—DVB-IPDC, http://www.dvb-h.org/ p. 1.

IEEE 802.11—Wikipedia, the free encyclopedia, http://en.wikipedia.org/wiki/IEEE_802.11, pp. 13.

IEEE 802.16—Wikipedia, the free encyclopedia, http://en.wikipedia.org/wiki/IEEE_802.16, p. 1.

3GPP Long Term Evolution—Wikipedia, the free encyclopedia, http://en.wikipedia.org/wiki/3GPP_Long_Term_Evolution, p. 1.

(56) References Cited

OTHER PUBLICATIONS

IEEE 802.22 WRAN WG Home Page, IEEE 802.22 Working Group on Wireless Regional Area Networks Enabling Rural Broadband Wireless Access Using Cognitive Radio Technology in TV Whitespaces, http://www.ieee802.org/22/, pp. 2.

Rocco Claudio Cannizzaro, Paolo Banelli, and Geert Leus, "Adaptive Channel Estimation for OFDM Systems with Doppler spread", IEEE Signal Processing Advances in Wireless Communications, Jul. 2006, pp. 5.

Steven M. Kay, "Fundamentals of Statistical Signal Processing—Estimation Theory", Prentice Hall Signal Processing Series, 1993, vol. 1, Chapter 8, pp. 219-288.

Steven M. Kay, "Fundamentals of Statistical Signal Processing—Estimation Theory", Prentice Hall Signal Processing Series, 1993, vol. 1, Chapter 12, pp. 379-418.

I. Barhumi, G. Leus, and M. Moonen, "Optimal training design for MIMO OFDM systems in mobile wireless channels," IEEE Transactions Signal Processing, vol. 51, No. 6, pp. 1615-1624, Jun. 2003.

3GPP TS 36.211, "3rd generation partnership project: Physical channels and modulation," 3GPP 2009.

ETSI EN 300 744, "DVB: Framing structure, channel coding and modulation for digital terrestrial television" ETSI 2004.

A. Stamoulis, S. N. Diggavi, and Al-Dhahir, "Intercarrier interference in MIMO OFDM," IEEE Trans. Communications, vol. 50, No. 10, pp. 2451-2464, Oct. 2002.

G. B. Giannakis and C. Tepedelenlioglu, "Basis expansion models and diversity techniques for blind identification and equalization of time-varying channels," Proc. IEEE, vol. 86, No. 10, pp. 1969-1986, Oct. 1998.

W. G. Song and J. T. Lim, "Channel estimation and signal detection for MIMO-OFDM with time varying channels," IEEE Communications Letters, vol. 10, No. 7, Jul. 2006.

F. F. Cao and J. Li, "Comments on channel estimation and signal detection for MIMO-OFDM with time varying channels," IEEE Communications Letters, vol. 13, No. 9, Sep. 2009.

T. L. Tung, K. Yao, and R. E. Hudson, "Channel estimation and adaptive power allocation for performance and capacity improvement of multiple-antenna OFDM systems," IEEE Signal Processing Advances in Wireless Communications, Mar. 2001.

T. Wang, J. G. Proakis, E. Marsy, and J. R. Zeidler, "Performance degradation of OFDM systems due to Doppler spreading," IEEE Transactions Wireless Communications, vol. 5, No. 6, pp. 1422-1432, Jun. 2006.

W. S. Hou and B. S. Chen, "ICI cancellation for OFDM communication systems in time-varying multipath fading channels," IEEE Transactions Wireless Communications, vol. 4, No. 5, pp. 2055-2066, Sep. 2005.

L. Rugini, P. Banelli, and G. Leus, "Simple equalization of time-varying channels for OFDM," IEEE Communications Letters, vol. 9, No. 7, pp. 619-621, Jul. 2005.

W. G. Jeon, K. H. Chang, and Y. S. Cho, "An equalization technique for orthogonal frequency-division multiplexing systems in time-variant multipath channels," IEEE Transactions Communications, vol. 47, No. 1, pp. 27-32, Jan. 1999.

P. S. Rossi and R. R. Muller, "Slepian-based two-dimensional estimation of time-frequency variant MIMO-OFDM channels," IEEE Signal Processing Letters, vol. 15, pp. 21-24, May 2007.

T. Zemen and C. F. Mecklenbrauker, "Time-variant channel estimation using discrete prolate spheroidal sequences," IEEE Trans. Signal Processing, vol. 53, No. 9, pp. 3597-3607, Sep. 2005.

X. Dai, "Optimal training design for linearly time-varying MIMO/OFDM channels modeled by a complex exponential basis expansion," IET Trans. Communications, vol. 1, No. 5, pp. 945-953, Oct. 2007.

Karthik Muralidhar, and Kwok H. Li, "On the Full Column-Rank Condition of the Channel Estimation Matrix in Doubly-Selective MIMO-OFDM Systems," http://arxiv.org/abs/1010.1391.

P. Schniter, "Low-complexity equalization of OFDM in doubly selective channels," IEEE Transactions Signal Processing, vol. 52, No. 4, pp. 1002-1011, Apr. 2004.

Z. Tang and G. Leus, "Pilot schemes for time-varying channel estimation in OFDM systems," IEEE Signal Processing Advances in Wireless Communications, pp. 1-5, Jun. 2007.

K. Muralidhar, "Equivalence of VSSO and VSVO Kalman Channel Estimators in Doubly-Selective OFDM SystemsA Theoretical Perspective," IEEE Trans. Sig. Proc., vol. 18, No. 4, pp. 223-226, Apr. 2011.

H. Hijazi, E. P. Simon, M. Lienard, and L. Ros, "Channel estimation for MIMO-OFDM systems in Fast Time-Varying Environments," IEEE 4th International Symposium on Communications, Control and Signal Processing (ISCCSP)., pp. 1-6, Mar. 2010.

Tom Minka, "Lightspeed Matlab Toolbox," http://research.microsoft.com/en-us/um/people/minka/software/lightspeed/.

Viveck R. Cadambe, Syed Ali Jafar, "Interference Alignment and Degrees of Freedom of the K-User Interference Channel", IEEE Transactions on Information Theory, vol. 54, No. 8, Aug. 2008, 17 pages.

Mohammad Ali Maddah-Ali, Abolfazl Seyed Motahari, Amir Keyvan Khandani, "Communication Over MIMO X Channels: Interference Alignment, Decomposition, and Performance Analysis", IEEE Transactions on Information Theory, vol. 54, No. 8, Aug. 2008, 14 pages.

Luca Bixio, Giacomo Oliveri, Marina Ottonello, Mirco Raffetto, and Carlo S. Regazzoni, "Cognitive Radios With Multiple Antennas Exploiting Spatial Opportunities", IEEE Transactions on Signal Processing, vol. 54, No. 8, Aug. 2010, 7 pages.

Samir M. Perlaza, Nadia Fawaz, Samson Lasaulce, and Merouane Debbah, "From Spectrum Pooling to Space Pooling: Opportunistic Interference Alignment in MIMO Cognitive Networks", IEEE Transactions on Signal Processing, vol. 58, No. 7, Jul. 2010, 14 pages.

* cited by examiner

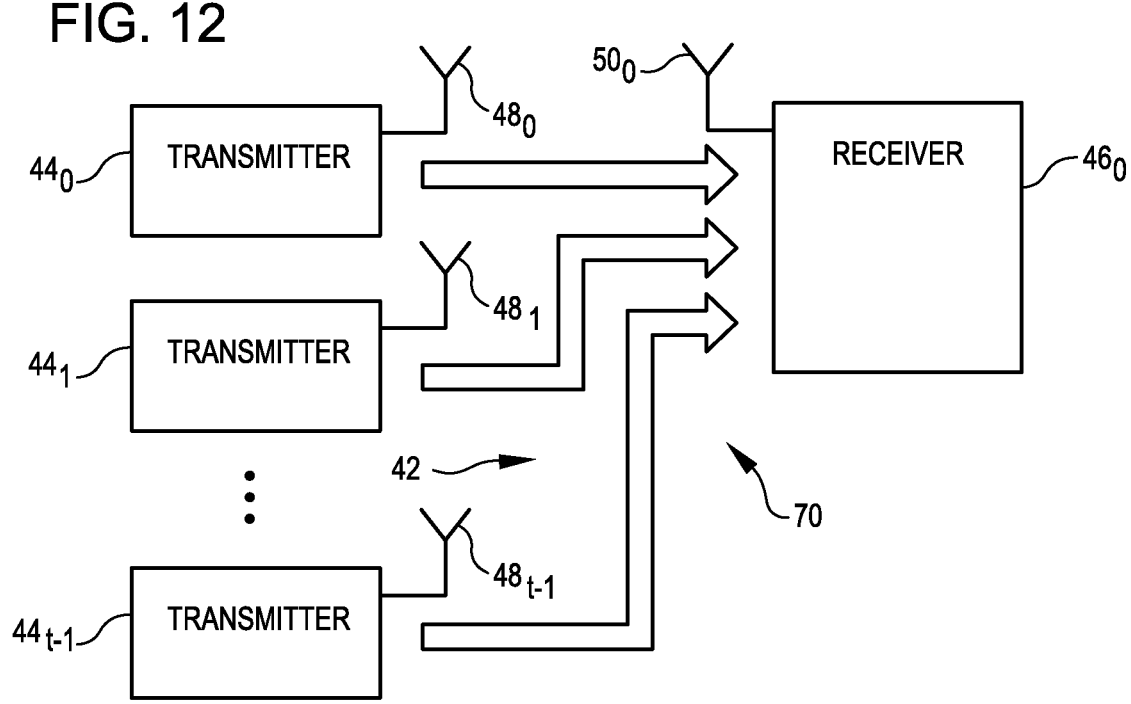

RECOVERING DATA FROM A SECONDARY ONE OF SIMULTANEOUS SIGNALS, SUCH AS ORTHOGONAL-FREQUENCY-DIVISION-MULTIPLEXED (OFDM) SIGNALS, THAT INCLUDE A SAME FREQUENCY

PRIORITY CLAIM

The present application claims the benefit of priority to the following applications, and is a Continuation-in-Part of co-pending U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011, which applications claim the benefit of priority to U.S. Provisional Patent Application Ser. No. 61/495,218, filed Jun. 9, 2011, and which applications are each a Continuation-in-Part of co-pending U.S. patent application Ser. No. 12/963,569, filed Dec. 8, 2010, which application claims the benefit of priority to U.S. Provisional Patent Application Nos. 61/360,367, filed Jun. 30, 2010, and 61/267,667, filed Dec. 8, 2009, and which application is a Continuation-in-Part of co-pending U.S. patent application Ser. No. 12/579,935, filed Oct. 15, 2009, and Ser. No. 12/579,969, filed Oct. 15, 2009, which applications claim the benefit of priority to U.S. Provisional Patent Application Ser. Nos. 61/158,290, filed Mar. 6, 2009, and 61/105,704, filed Oct. 15, 2008. All of the foregoing applications are incorporated herein by reference in their entireties.

RELATED APPLICATION DATA

The present application is related to co-pending U.S. patent application Ser. No. 13/560,928, entitled SIMULTANEOUS TRANSMISSION OF SIGNALS, SUCH AS ORTHOGONAL-FREQUENCY-DIVISION-MULTIPLEXED (OFDM) SIGNALS, THAT INCLUDE A SAME FREQUENCY filed Jul. 27, 2012, and is related to U.S. patent application Ser. No. 13/560,939, entitled RECOVERING DATA FROM A PRIMARY ONE OF SIMULTANEOUS SIGNALS, SUCH AS ORTHOGONAL-FREQUENCY-DIVISION-MULTIPLEXED (OFDM) SIGNALS, THAT INCLUDE A SAME FREQUENCY filed Jul. 27, 2012, all of the foregoing applications are incorporated herein by reference in their entireties.

SUMMARY

In an embodiment, a receiver includes a channel estimator and a data-recovery unit. The channel estimator is configured to determine a characteristic of a channel over which a first signal, which is received simultaneously with a second signal, propagated, the first and second signals respectively having first and second components that include approximately a frequency. And the data-recovery unit is configured to recover data from the first signal in response to the determined channel characteristic.

For example, such a receiver may be able to simultaneously receive multiple orthogonal-frequency-division-multiplexed (OFDM) signals that include one or more of the same sub-carrier frequencies, and to recover data from one or more of the OFDM signals despite the frequency overlap. A receiver that is able to recover data from one or more signals received simultaneously on the same frequency and over the same signal space may allow an increase in the effective bandwidth of the signal space, and thus may allow more devices (e.g., smart phones) to simultaneously share the same signal space. Furthermore, the receiver may be able to move relative to one or more of the OFDM-signal transmitters while simultaneously receiving the multiple OFDM signals.

BRIEF DESCRIPTION OF THE DRAWINGS

FIG. 12 is a diagram of OFDM transmitters that may simultaneously transmit signals that include at least one same frequency over a shared transmission-channel space to a common receiver according to an embodiment.

DETAILED DESCRIPTION

Figure 1:
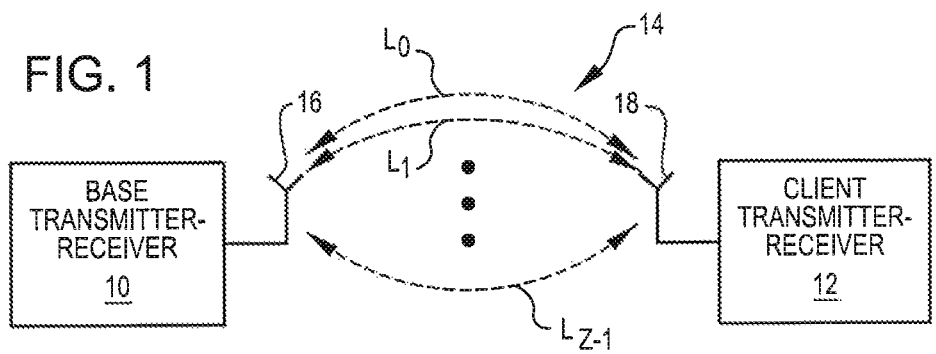
FIG. 1 is a diagram of an embodiment of base and client orthogonal-frequency-division-Multiplexing (OFDM) transmitter-receivers that are not moving significantly relative to one another while they are communicating with one another.

FIG. 1 is a diagram of an embodiment of a base transmitter-receiver 10 and of a client transmitter-receiver 12, which communicates with the base transmitter-receiver over a wireless channel 14 via multicarrier signals (e.g., OFDM signals) while remaining substantially stationary relative to the base transmitter-receiver. For example, the base 10 may be a wireless router in a home or office, and the client 12 may be a computer that communicates with the base via OFDM signals that have N carriers. One or more antennas 16 are coupled to the base 10, and one or more antennas 18 are coupled to the client 12. Each antenna 16 may function as only a transmit antenna, as only a receive antenna, or as a transmit-receive antenna; and each antenna 18 may function similarly. Furthermore, the channel 14 may include Z multiple paths $L_0$-$L_{Z-1}$, over which the multicarrier signals propagate. For example, a first path $L_0$ may be a straight-line path between the antennas 16 and 18, and a second path $L_1$ and subsequent paths $L_2$-$L_{Z-1}$ may each be a respective multi-segmented path that is caused by signal reflections from one or more objects (not shown in FIG. 1) near the base 10 or the client 12, or near or within the channel 14.

Figure 2:
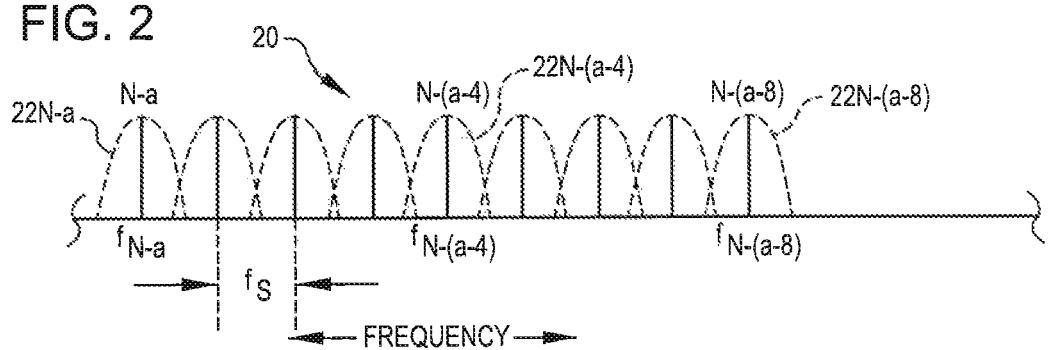
FIG. 2 is a plot of an embodiment of the frequencies of the carrier signals (solid lines) generated by the presently transmitting transmitter-receiver of FIG. 1, and of the frequency "slots" (dashed lines) that these carrier signals may respectively occupy at the presently receiving transmitter-receiver of FIG. 1.

FIG. 2 is a frequency plot of some of the N carriers (here, carriers N–a to N–(a–8) are shown in solid line and are hereinafter called "subcarriers") of an embodiment of an OFDM data symbol 20, which may be transmitted by the base 10 of FIG. 1 and received by the client 12, or vice versa—an OFDM data symbol is a portion of an OFDM signal that is modulated with the same data subsymbols for a symbol period. Each of the subcarriers N–a to N–(a–8) has a respective frequency $f_{N-a}$-$f_{N-(a-8)}$, and is orthogonal to the other subcarriers. In this context, "orthogonal" means that, in the absence of inter-carrier interference (discussed below) and noise, one may construct a time-domain signal from these modulated subcarriers (e.g., using an Inverse Fast Fourier Transform (IFFT)), and then extract these modulated subcarriers, and the information that they carry, from the time-domain signal (e.g., using a Fast Fourier Transform (FFT)) with no loss of information. Furthermore, although the base 10 is described as transmitting the OFDM signal in the example below, it is understood that this example would be similar if the client 12 were transmitting the OFDM signal.

Referring to FIGS. 1 and 2, the transmitter of the base 10 modulates each of at least some of the N subcarriers with a respective data value (hereinafter a data subsymbol) for a time period hereinafter called a symbol period—the transmitter may not use one or more of the N subcarriers due to, for example, excessive interference at the frequencies of these subcarriers. Examples of suitable modulation schemes include binary phase-shift keying (BPSK), quadrature phase-shift keying (QPSK), and quadrature amplitude modulation (QAM), the latter two schemes each utilizing multi-bit data subsymbols.

The frequency spacing $f_s$ between adjacent ones of the N subcarriers is typically constant, and is conventionally selected to minimize inter-carrier interference (ICI), which is a phenomenon that occurs if energy from one subcarrier "spills over" to the frequency slot of another subcarrier at the receiver of the client 12. At the transmitter of the base 10, each of the active ones of the N subcarriers has a frequency $f_k$ (for k=0 to N–1) represented by a respective one of the solid lines (only the frequencies $f_k$ for k=N–a to N–(a–8) are shown in FIG. 2). But at the receiver of the client 12, the respective frequency $f_k$ of each subcarrier may be effectively shifted within a respective frequency slot 22 indicated by the dashed lines (only the slots 22 of the frequencies $f_k$ for k=N–a to N–(a–8) are shown in FIG. 2). For example, at the receiver of the client 12, the frequency $f_{N-a}$ of the subcarrier N–a may be shifted to another location within the frequency slot $22_{N-a}$, or may be "spread" over multiple locations within this frequency slot. Causes for this frequency shifting/spreading may include, for example, the existence of multiple transmission paths (e.g., paths $L_0$-$L_{Z-1}$ for Z>1), and channel conditions (e.g., humidity, temperature) that may effectively shift the respective phase and attenuate the respective amplitude of each modulated subcarrier.

To allow the receiver of the client 12 to recover the data subsymbols in the presence of ICI, other interference, or noise, the transmitter of the base 10 transmits an OFDM training symbol—a "training symbol" is the combination of all the training subsymbols transmitted during a training-symbol period—shortly before transmitting an OFDM data symbol—a "data symbol" is the combination of all of the data subsymbols transmitted during an OFDM data-symbol period. That is, the transmitter of the base 10 transmits the training symbol during a first OFDM symbol period, and transmits the data symbol during a second, subsequent OFDM symbol period. Because the receiver of the client 12 "knows" the identity of the transmitted training symbol ahead of time, the receiver characterizes the channel 14 by comparing the received training symbol with the "known" transmitted training symbol. For example, the receiver may characterize the channel 14 by generating an N×N matrix $\hat{H}$ of estimated complex frequency-domain coefficients that respectively represent the estimated frequency response (e.g., the imparted ICI, amplitude attenuation, and phase shift) of the channel at each of the subcarrier frequencies $f_k$—the "^" indicates that a matrix is an estimate of a matrix of actual values, e.g., that $\hat{H}$ is an estimate of the actual channel matrix H. As discussed in more detail below, the receiver may then use this channel-estimation matrix $\hat{H}$ to recover transmitted data symbols from respective received data symbols.

Figure 3:
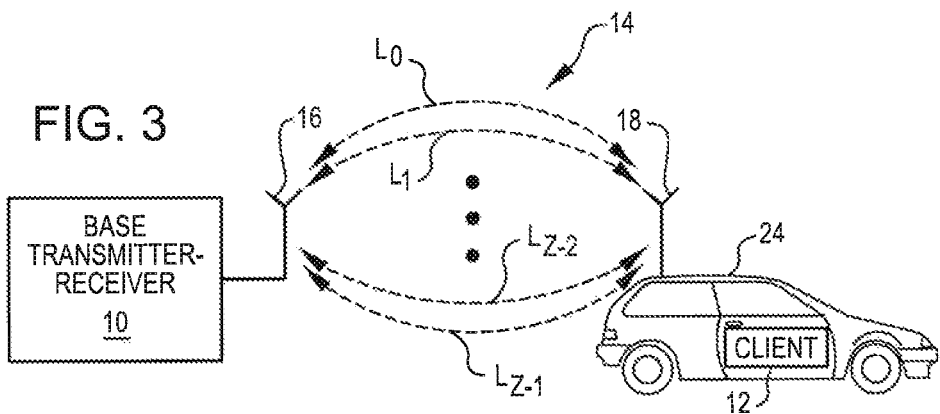
FIG. 3 is a diagram of an embodiment of base and client OFDM transmitter-receivers that are moving relative to one another while they are communicating with one another.

FIG. 3 is a diagram of an embodiment of the base transmitter-receiver 10 and of the client transmitter-receiver 12 of FIG. 1, but where the base and client are moving relative to one another at a non-zero velocity (the velocity may be constant or may be time varying, i.e., an acceleration) while they are communicating with one another, and where like numbers refer to components common to FIGS. 1 and 3. For example, the base 10 may be a cell tower, and the client 12 may be an internet-capable smart phone that is located within a moving automobile 24. The base 10 and the client 12 may communicate with one another according to one or more communications standards that specify OFDM technology for mobile communications. These standards include, for example, the DVB-H standard and the WiMAX standard. Furthermore, although only the client 12 is shown as moving, in other embodiments the base 10 may be moving and the client 12 may be stationary, or both the base and the client may be moving simultaneously.

Figure 4:
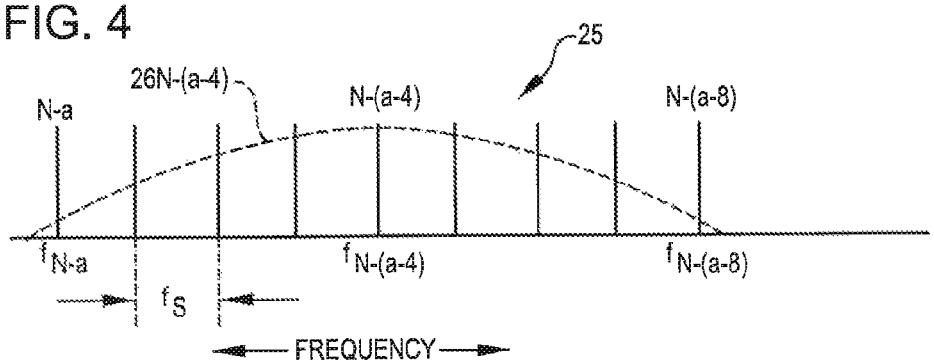
FIG. 4 is a plot of an embodiment of the frequencies of carrier signals (solid lines) generated by the presently transmitting transmitter-receiver of FIG. 3, and of the frequency slot (dashed line) that the center one of these plotted carrier signals may occupy at the presently receiving transmitter-receiver of FIG. 3.

FIG. 4 is a frequency plot of some of the N subcarriers (here, subcarriers N–a to N–(a–8) in solid line) of an embodiment of an OFDM symbol 25 that may be transmitted by the base 10 of FIG. 1 and received by the client 12, or vice versa. Although the base 10 is described as transmitting the OFDM symbol in the example below, it is understood that this example would be similar if the client 12 were transmitting the OFDM symbol.

At the base 10, the OFDM symbol may be similar to the OFDM symbol of FIG. 2 in that the base modulates each of at least some of the N subcarriers with a respective data subsymbol, and each of the data-modulated ones of the N subcarriers has a center frequency $f_k$ represented by a respective one of the solid lines.

But at the receiving client 12, the frequency $f_k$ of a subcarrier k may be shifted/spread by one or more times $f_s$ as indicated by the frequency slot $26_{N-(a-4)}$ of the subcarrier k=N–(a–4) (only this one frequency slot is shown in FIG. 3 for clarity) such that energy from a subcarrier k may spill over to the frequencies of one or more adjacent subcarriers (e.g., k–1, k+1) on either side of the subcarrier k. For example, in the embodiment shown in FIG. 4, energy from the subcarrier k=N–(a–4) may spill over to the frequencies $f_{N-a}$–$f_{N-(a-3)}$ and $f_{N-(a-5)}$–$f_{N-(a-8)}$ of the subcarriers k=N–a to N–(a–3) and k=N–(a–5) to N–(a–8).

The frequency shifts/spreads of the received OFDM subcarriers of FIG. 4 may be significantly greater than the frequency shifts/spreads of the received OFDM subcarriers of FIG. 2 because, in addition to the causes for this frequency shifting/spreading described above (e.g., the existence of multiple transmission paths L and channel conditions), the received OFDM subcarriers of FIG. 4 may also experience respective Doppler shifts caused by the relative movement between the base 10 and the client 12.

According to the Doppler Effect, the frequency of a signal at a receiver is different from the frequency of the signal at a transmitter if the receiver and transmitter are moving relative to one another at a non-zero velocity. If the receiver and transmitter are moving away from one another, then the frequency of the signal at the receiver is typically lower than the frequency of the signal at the transmitter; conversely, if the receiver and transmitter are moving toward one another, then the frequency of the signal at the receiver is typically higher than the frequency of the signal at the transmitter. For example, a person (receiver) who is listening to the whistle of an approaching train (transmitter) may experience this phenomenon. While the train is moving toward the person, the person perceives the whistle as having a pitch (frequency) that is higher than the pitch that one on the train would perceive the whistle as having. But after the train passes the person, and is thus moving away from him/her, the person perceives the whistle as having a pitch lower than the pitch that one on the train would perceive the whistle as having.

Consequently, the subcarrier frequencies of the OFDM symbol 25 (FIG. 4) may be influenced by the Doppler Effect in a similar manner at the receiver of the client 12 (FIG. 3).

A measure of the influence that the Doppler Effect has on a single transmitted tone (e.g., an unmodulated subcarrier signal with constant, non-zero amplitude) is the "Doppler Spread", which is the bandwidth that the tone may occupy at the receiver due to the Doppler Effect. For example, suppose that the frequency of the tone is 1,000 Hz at the transmitter, but that at the receiver, due to the non-zero velocity of the receiver relative to the transmitter, the received tone may have a frequency anywhere from 980 Hz to 1,020 Hz depending on the instantaneous velocity. Therefore, in this example, the Doppler Spread=1020 Hz−980 Hz=40 Hz. That is, the Doppler Spread is (40 Hz)/(1000 Hz)=4% of the frequency of the transmitted tone—although expressed here in Hz and as a percentage of the transmitted frequency, the Doppler Spread may be expressed in other quantities as described below.

For mobile OFDM devices, one may characterize the ICI caused by the Doppler Spread of a subcarrier in terms of the highest number of adjacent subcarriers with which the subcarrier may interfere. For example, the total Doppler induced ICI caused by the $50^{th}$ (k=50) subcarrier is greater if energy from this subcarrier spills over to the $48^{th}$, $49^{th}$, $51^{st}$, and $52^{nd}$ subcarriers, and is less if energy from this subcarrier spills over to only the $49^{th}$ and $51^{st}$ subcarriers. In actuality, because the Doppler Spread of a subcarrier may cause the subcarrier to spill over energy into many or all of the other N subcarrier slots to some degree, one may set a Doppler Spread interference threshold below which one subcarrier is deemed to be unaffected by the Doppler Spread of another subcarrier; such threshold may have units of, e.g., power or amplitude. Therefore, for a mobile OFDM device, the extent of Doppler induced ICI caused by a subcarrier k may be defined in terms of the number of adjacent subcarriers (above and below the subcarrier k in question) that may experience a level of ICI above the Doppler Spread interference threshold for the device. Furthermore, although in some applications one may assume that all of the subcarriers k experience the same Doppler Spread, in other applications, one may decide not to make this assumption.

Consequently, referring to FIGS. 3 and 4, the frequency slots 26 (only the frequency slot $26_{N-(a-4)}$ of the subcarrier N–(a–4) is shown for clarity) each represent the bandwidth that a respective subcarrier transmitted by the base 10 may occupy at the receiving client 12 due to all causes (e.g., the existence of multiple transmission paths L, channel conditions, and Doppler Spread). But when the base 10 and client 12 are moving relative to one another, the greatest contributor to the frequency-slot bandwidth may be the Doppler Spread.

Still referring to FIGS. 3 and 4, because the Doppler Spread of an OFDM signal may vary relatively quickly with time, transmitting a training symbol separately from the data symbol may not allow the receiver of the client 12 to adequately determine the channel-estimation matrix $\hat{H}$ for the channel 14 as it exists while the OFDM data symbol is being transmitted.

Consequently, mobile OFDM devices, such as the base 10, may combine training subsymbols and data subsymbols into a single OFDM symbol such that a receiving device, such as the client 12, may characterize the channel 14 for the same time period during which the data subsymbols are transmitted.

Figure 5:
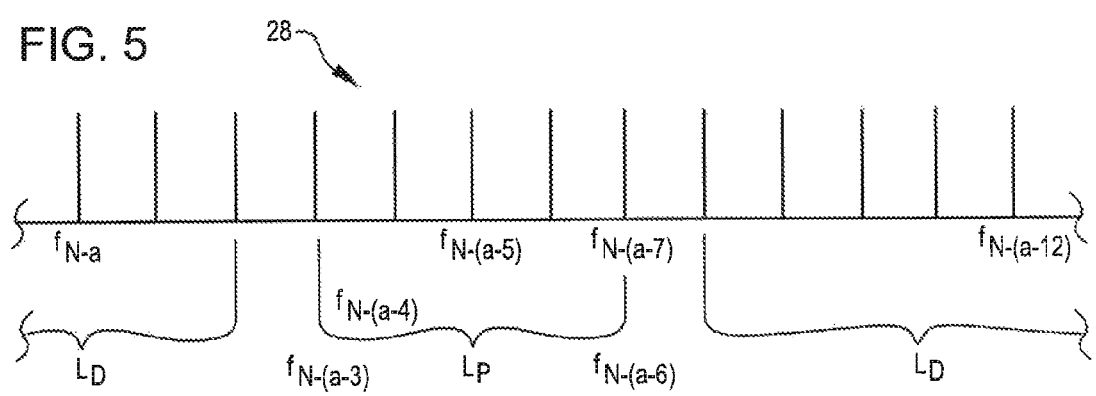
FIG. 5 is a plot of an embodiment of the frequencies of carrier signals generated by the presently transmitting transmitter-receiver of FIG. 3, where the carrier signals are grouped into clusters of data-carrier signals (data clusters) and clusters of pilot-carrier signals (pilot clusters).

FIG. 5 is a frequency plot of some of the N subcarriers k (here, subcarriers k=N–a to N–(a–12)) of an embodiment of an OFDM symbol 28, which may be transmitted by the base 10 (FIG. 3) and received by the client 12 (FIG. 3), or vice versa, where the OFDM symbol includes both training and data subsymbols. Although the base 10 is described as transmitting the OFDM signal in the example below, it is understood that this example would be similar if the client 12 were transmitting the OFDM signal.

The OFDM symbol 28 includes one or more clusters $L_D$ of data subcarriers, and one or more clusters $L_P$ of training subcarriers, which are hereinafter called "pilot" subcarriers. The transmitter of the base 10 may modulate the pilot subcarriers with respective pilot subsymbols. In an embodiment, the data clusters $L_D$ and the pilot clusters $L_P$ are arranged in alternating fashion (i.e., one after the other) such that each data cluster $L_D$ is separated from adjacent data clusters by at least one pilot cluster $L_P$, and such that each pilot cluster $L_P$ is separated from adjacent pilot clusters by at least one data cluster, within the OFDM symbol 28. As discussed below in conjunction with FIG. 9, because the client 12 receiver "knows" the pilot subsymbols ahead of time, the client receiver may use the pilot subsymbols to more accurately estimate the channel 14 as it exists while the data subsymbols are being transmitted as compared to using a training symbol transmitted separately from the data symbol to estimate the channel.

In an embodiment, each data cluster $L_D$ within the OFDM symbol 28 includes a same first number (e.g., sixteen) of data subcarriers, and each pilot cluster $L_P$ within the OFDM symbol includes a same second number (e.g., five or nine) of pilot subcarriers. For example, in the embodiment of FIG. 5, the illustrated pilot cluster $L_P$ includes five pilot subcarriers k=N−(a−3) to N−(a−7), and the other pilot clusters (not shown in FIG. 5) of the OFDM symbol 28 also each include five respective pilot subcarriers. But in another embodiment, a data cluster $L_D$ may include a different number of data subcarriers than another data cluster within the same OFDM symbol, and a pilot cluster $L_P$ may include a different number of pilot subcarriers than another pilot cluster within the same OFDM symbol. Furthermore, as discussed above, some of the data subcarriers may be unmodulated by a data subsymbol or may have zero amplitude (i.e., zero energy), and, as discussed below in conjunction with FIGS. 7-8, some of the pilot subcarriers may be unmodulated by a pilot subsymbol or may have zero energy. Moreover, a pilot cluster $L_P$ or a data cluster $L_D$ may "wrap around the ends" of the N subcarriers. For example, if there are N=128 subcarriers (k=0 to 127), then a pilot cluster $L_P$ may include five pilot subcarriers k=126, k=127, k=0, k=1, and k=2.

A designer of an OFDM receiver, such as the receiver of the client 12 (FIG. 3), may select the minimum number $N_P$ of pilot clusters $L_P$ in the OFDM symbol 28, and may select the minimum number $L_{PN}$ of pilot subcarriers $k_P$ within each pilot cluster, for an intended application of the receiver based on the generally expected conditions of the communication channel 14 (FIG. 3) and on a desired data-error rate. For example, for an application where the receiver may be used in a moving automobile, a designer may use the generally expected conditions of a communication channel between a ground-based transmitter and receiver that are moving relative to one another at speeds between approximately 0 and 150 miles per hour—although, non-racing automobiles rarely travel at speeds even approaching 150 miles per hour, if the transmitter and receiver are in respective automobiles that are moving in opposite directions, then the speed of one automobile relative to the other automobile may approach or exceed 150 miles per hour. And to maximize the number of data subcarriers in, and thus the data bandwidth of, the OFDM symbol 28, the designer may select the minimum number $N_P$ of pilot clusters $L_P$, and the minimum number $L_{PN}$ of pilot subcarriers $k_P$ within each pilot cluster, that he/she predicts will allow the receiver to estimate the anticipated channel with an accuracy that is sufficient for the receiver to recover data within the desired error rate.

Figure 6:
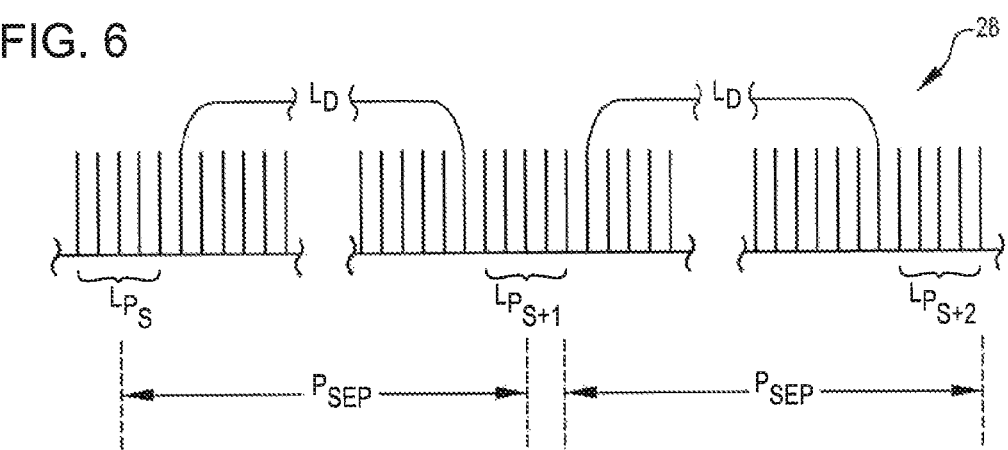
FIG. 6 is a plot of an embodiment of data clusters and pilot clusters generated by the presently transmitting transmitter-receiver of FIG. 3, where the pilot clusters have a uniform separation.

FIG. 6 is a frequency plot of some of the N subcarriers k of an embodiment of the OFDM symbol 28 of FIG. 5, where the frequency (x) axis of FIG. 6 has a lower resolution than the frequency (x) axis of FIG. 5.

In an embodiment, the pilot clusters $L_P$ are separated by a uniform separation value $P_{sep}$, which is the distance, measured in the number of subcarriers k, between a pilot subcarrier in a pilot cluster and a corresponding pilot subcarrier in an adjacent pilot cluster. That is, a pilot subcarrier that occupies a relative position within a pilot cluster $L_P$ is $P_{sep}$ subcarriers away from a pilot subcarrier that occupies the same relative position within an adjacent pilot cluster. For example, as shown in FIG. 6, the center pilot subcarrier (relative position 0) in pilot cluster $L_{PS}$ is separated from the center pilot subcarrier (also relative position 0) in the pilot cluster $L_{PS+1}$ by $P_{sep}$ subcarriers k. Also as shown in FIG. 6, the last pilot subcarrier (relative position +2 in this example) in $L_{PS+1}$ is separated from the last pilot subcarrier (also relative position +2 in this example) in the pilot cluster $L_{PS+2}$ by $P_{sep}$ subcarriers k. And, although not shown in FIG. 6, the very first pilot cluster $L_{P0}$ in the OFDM symbol 28 is separated from the very last pilot cluster $L_{P(Np-1)}$ in the OFDM symbol by $P_{sep}$ when this separation is calculated modulo N—calculating such a separation modulo N yields an accurate separation value if a pilot cluster $L_P$ or a data cluster $L_D$ "wraps around the ends" of the N subcarriers as discussed above.

Figure 7:
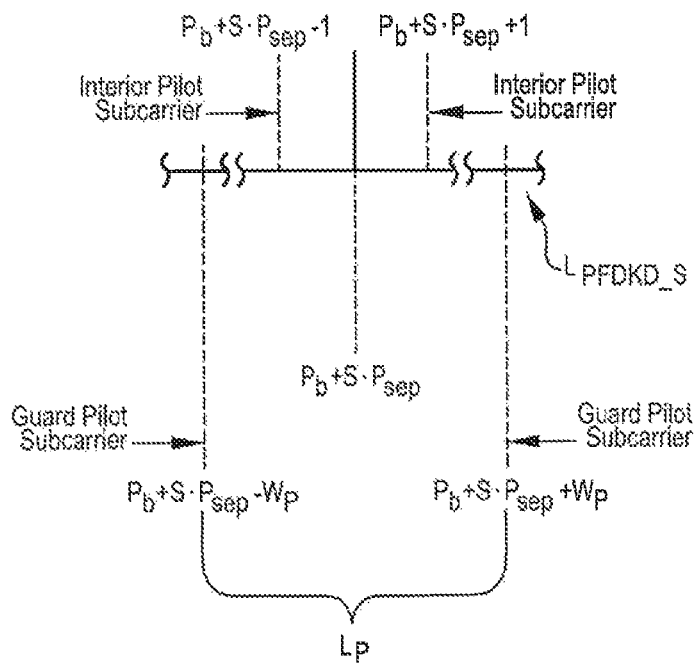
FIG. 7 is a plot of an embodiment of a pilot cluster.

FIG. 7 is a frequency plot of an embodiment of a Frequency-Domain Kronecker Delta (FDKD) pilot cluster $L_{PFDKD\_S}$.

Before substantive characteristics of the pilot cluster $L_{PFDKD\_S}$ are discussed, a convention for identifying a pilot cluster, such as the pilot cluster $L_{PFDKD\_S}$, and its pilot subcarriers is discussed. In this convention, $P_b$ identifies the relative location of the center subcarrier within the pilot cluster, S identifies the relative location of the pilot cluster within an OFDM symbol, $W_p$ is the total number of pilot subcarriers to the left and to the right of the center pilot subcarrier, $B_p$ is the number of interior pilot subcarriers to the left and to the right of the center pilot subcarrier, and $W_p - B_p$ is the number of guard pilot subcarriers $G_p$ at each end of the pilot cluster. For example, if a pilot cluster $L_{PFDKD\_S}$ includes $L_{PN}$=5 total pilot subcarriers and two guard pilot subcarriers, then $W_p=(5-1)/2=2$, $B_p=W_p-G_p=2-1=1$, and the pilot cluster $L_{PFDKD\_S}$ includes pilot subcarriers at the following relative locations: $P_b-2$, $P_b-1$, $P_b$, $P_b+1$, and $P_b+2$. And one may convert the relative-location identifiers into absolute-location identifiers by adding $S \cdot P_{sep}$ to each of the relative-location identifiers.

So, continuing with the above example, the pilot cluster $L_{PFDKD\_S}$ includes pilot subcarriers at the following absolute locations: $P_b+S \cdot P_{sep}-2$, $P_b+S \cdot P_{sep}-1$, $P_b+S \cdot P_{sep}$, $P_b+S \cdot P_{sep}+1$, and $P_b+S \cdot P_{sep}+2$. And, therefore, in this example, the pilot cluster $L_{PFDKD\_S}$ includes the following pilot subcarriers: $k_{Pb+S \cdot Psep-2}$, $k_{Pb+S \cdot Psep-1}$, $k_{Pb+S \cdot Psep}$, $k_{Pb+S \cdot Psep+1}$, and $k_{Pb+S \cdot Psep+2}$. For example, if each pilot cluster $L_{PFDKD\_S}$ in an OFDM symbol includes $L_{PN}$=5 pilot subcarriers, $P_{sep}$=8, and the first pilot subcarrier of the zero$^{th}$ pilot cluster $L_{PFDKD\_0}$ (S=0) is $k_0$, then $P_b=2$, $W_p=2$, and the sixth pilot cluster $L_{PFDKD\_6}$ S=6 and counting in a direction from the lowest to the highest subcarrier frequency) includes the following pilot subcarriers: $k_{48}$, $k_{49}$, $k_{50}$, $k_{51}$, and $k_{52}$.

Still referring to FIG. 7, in an embodiment, the center subcarrier $k_{Pb+S \cdot Psep}$ (solid line in FIG. 7) of an FDKD pilot cluster $L_{PFDKD\_S}$ is modulated with a non-zero pilot subsymbol, and all of the other subcarriers (dashed lines) have zero energy; that is, all of the other subcarriers are effectively modulated with a zero pilot subsymbol equal to 0+j0. Therefore, in a FDKD pilot cluster $L_{PFDKD\_S}$, the only energy transmitted within the pilot cluster $L_{PFDKD\_S}$ is transmitted on the center subcarrier $k_{pb+S\cdot Psep}$; the remaining subcarriers in the pilot cluster are transmitted with approximately zero energy. But for reasons discussed above in conjunction with FIG. 4, at the receiver, subcarriers of the pilot cluster $L_{PFDKD\_S}$ other than the center subcarrier may carry significant non-zero energy due to, e.g., Doppler Spread. And, as discussed below in conjunction with FIG. 9, the energy carried by the interior pilot subcarriers at the receiver may allow the receiver to generate an estimate of the communication channel as it exists during transmission of an OFDM symbol, where the estimate takes into account ICI caused by Doppler Spread. The guard pilot subcarriers are included to provide a guard band that may reduce to negligible levels the amount of energy from data subcarriers that "spills over" into the center and interior pilot subcarriers, and vice-versa. One may select the total number $L_{PN}$ of pilot subcarriers and the number $G_P$ of guard pilot subcarriers in a pilot cluster $L_P$ for a particular application based on the expected Doppler Spread. Typically, the larger the expected Doppler Spread, the larger the total number $L_{PN}$ of pilot subcarriers and the larger the number $G_p$ of guard pilot subcarriers, and the smaller the expected Doppler Spread, the smaller the total number $L_{PN}$ of pilot subcarriers and the smaller the number $G_p$ of guard pilot subcarriers ($G_p$ may even equal zero).

Figure 8:
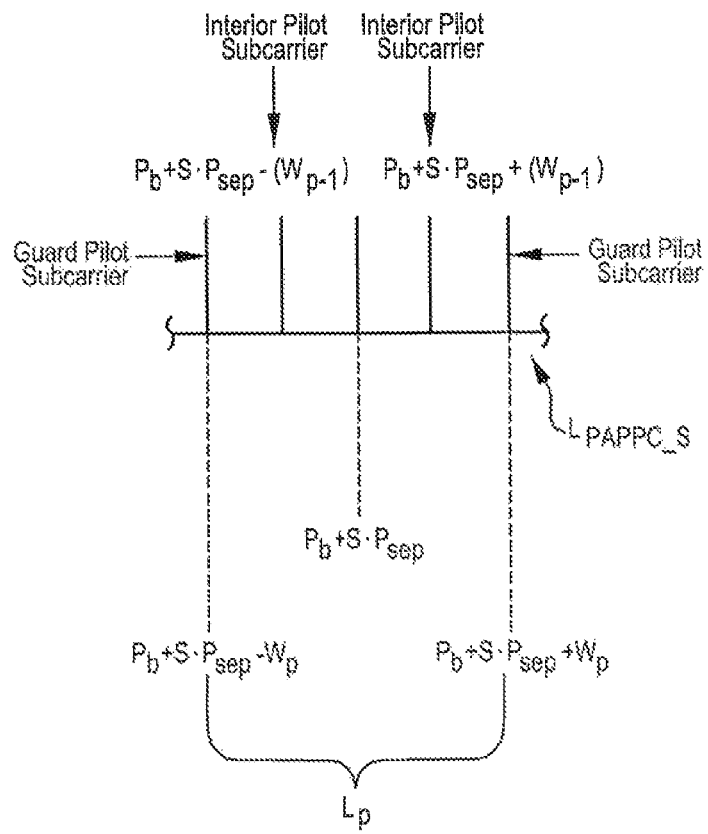
FIG. 8 is a plot of another embodiment of a pilot cluster.

FIG. 8 is a frequency plot of an embodiment of an All-Pilot Pilot Cluster (APPC) $L_{PAPPC\_S}$. Unlike the FDKD pilot cluster $L_{PFDKD\_S}$ of FIG. 7 in which only the center subcarrier $k_{Pb+S\cdot Psep}$ is modulated with a non-zero pilot subsymbol, in an APPC pilot cluster $L_{PAPPC\_S}$, all of the pilot subcarriers (solid lines) $k_{Pb+S\cdot Psep-W_p}$-$k_{Pb+S\cdot Psep+W_p}$ are modulated with a respective non-zero pilot subsymbol. That is, non-zero energy is transmitted on all of the pilot subcarriers $k_{Pb+S\cdot Psep-W_p}$-$k_{Pb+S\cdot Psep+W_p}$ within an APPC pilot cluster. Furthermore, the pilot subcarriers $k_{Pb+S\cdot Psep-W_p}$-$k_{Pb+S\cdot Psep+W_p}$ of an APPC pilot cluster may each be modulated with the same, or with different, pilot subsymbols. And differences between the transmitted pilot subsymbols (which are known ahead of time by the receiver) and the respective received pilot subsymbols may allow the receiver to generate an estimate of the communication channel as it exists during transmission of an OFDM symbol, where the estimate takes into account ICI caused by Doppler Spread.

Figure 9:
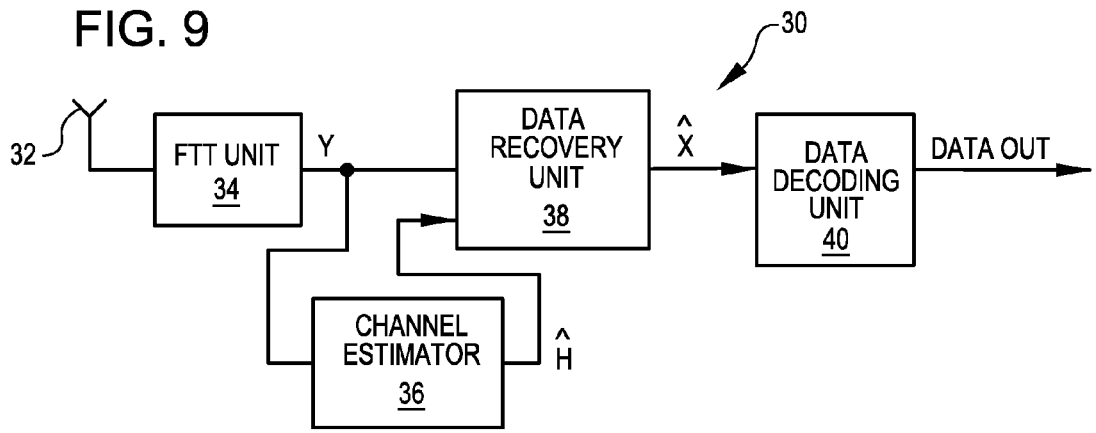
FIG. 9 is a diagram of an embodiment of the receiver of one or both of the base and client transmitter-receivers of FIG. 3.

FIG. 9 is a diagram of an embodiment of a receiver 30 for a mobile OFDM device such as the base 10 or client 12 of FIG. 3.

The receiver 30 includes a receive antenna 32, a Fast Fourier Transform (FFT) unit 34, a channel estimator 36, a data-recovery unit 38, and a data-decoding unit 40. The FFT unit 34, channel estimator 36, data-recovery unit 38, and data-decoding unit 40 may each be implemented in software, hardware, or a combination of software and hardware. For example, one or more of the FFT unit 34, the channel estimator 36, the data-recovery unit 38, and the decoder 40 may be implemented on an integrated circuit (IC), and other components, such as a transmitter, may also be implemented on the same IC, either on a same or different IC die. And this IC may be combined with one or more other ICs (not shown in FIG. 9) to form a system such as the base 10 or client 12 of FIG. 3. Or, one or more of these components may be implemented by a software-executing controller such as a processor.

The receive antenna 32 may receive an OFDM signal (i.e., a signal that carries one or more OFDM symbols) from a transmitter, such as the transmitter of the base 10 or client 12 of FIG. 3, where at least some of the subcarriers may experience Doppler Spread. The antenna 32 may also function to transmit an OFDM signal generated by a transmitter (not shown in FIG. 9) of the OFDM device that incorporates the receiver 30. That is, the antenna 32 may function to both receive and transmit OFDM signals.

The FFT unit 34 conventionally converts a received OFDM signal from a time-domain waveform into an N×1 column vector y of complex frequency-domain coefficients (e.g., one complex coefficient for each subcarrier).

The channel estimator 36 estimates the response of the communication channel (e.g., the channel 14 of FIG. 3) from the coefficients of the vector y corresponding to the pilot subcarriers, which, as discussed above in conjunction with FIGS. 5-8, are the subcarriers that compose the training portion of the received OFDM symbol. From these pilot-subcarrier coefficients, the estimator 36 generates an N×N channel-estimation matrix $\hat{H}$ of complex frequency coefficients that collectively approximate the effective frequency response H of the communication channel—the effective frequency response may take into account the effect of, e.g., channel conditions such as temperature and humidity, the existence of multiple transmission paths, and the Doppler Spread, at each of the subcarrier frequencies $f_k$. Because, as discussed above, the Doppler Spread may cause energy from one subcarrier to spill over into the frequency slot of another subcarrier at the receiver 30, the matrix $\hat{H}$ may not be a diagonal matrix—a matrix is diagonal if all of its elements are zero except for the elements that lie along the main diagonal, which extends from the top left corner of the matrix to the bottom right corner. Embodiments of the channel estimator 36, and embodiments of techniques for generating the channel-estimation matrix $\hat{H}$, are discussed in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284, 898 filed Oct. 29, 2011, which are incorporated by reference.

The data-recovery unit 38 recovers the data carried by the OFDM signal as transmitted by generating an N×1 column vector $\hat{x}$, which is an estimation of the OFDM data symbol x carried by the transmitted OFDM signal. That is, it includes complex coefficients (one for at least each data subcarrier) that are estimates of the complex coefficients with which the transmitter modulated the transmitted data subcarriers. The unit 38 may generally recover x according to the following equations:

$$y = \hat{H}\hat{x} + n \quad (1)$$

$$\hat{H}^{-1}(y) = \hat{H}^{-1}\hat{H}\hat{x} + \hat{H}^{-1}n = \hat{x} + \hat{H}^{-1}n \quad (2)$$

where n is an N×1 column vector of Additive-White-Gaussian-Noise (AWGN) complex coefficients at each of the subcarrier frequencies. Because, as discussed above, some of the y coefficients are for pilot subcarriers that are used only for channel-estimation purposes, the elements of $\hat{H}$, $\hat{x}$, y, and n that correspond to the $N_P L_{PN}$ pilot subcarriers (where $N_P$ is the number of pilot clusters $L_P$ in an OFDM symbol and $L_{PN}$ is the number of pilot subcarriers per pilot cluster $L_P$) may be discarded prior to calculating $\hat{H}^{-1}$ and solving equation (2) so as to reduce the complexity, and increase the speed, of the calculation of $\hat{x}$. Examples of a data-recovery unit and data-recovery techniques that may be used as and by the data-recovery unit 38 are disclosed in U.S. patent application Ser. Nos. 12/579,935 and 12/579,969, which were filed on Oct. 15, 2009 and which are incorporated by reference. And conventional data-recovery units and techniques that may be respectively used as and by the data-recovery unit 38 also exist. Furthermore, additional embodiments of data-recovery units and techniques are discussed below in conjunction with FIGS. 19, 22, and 23.

The data-decoding unit 40 effectively uses the $\hat{x}$ coefficients that correspond to the data subcarriers of the OFDM symbol to demodulate the corresponding data subsymbols, and to thus recover the data represented by the data subsymbols. For example, if the transmitter modulated a data subcarrier by mapping it to a respective QPSK constellation element, then the data decoder 40 QPSK demodulates the data subcarrier to recover the same constellation element, which represents the bits of data carried by the modulated data, subcarrier.

Referring back to FIGS. 1 and 3, multiple base transmitter-receivers 10 may communicate with respective client transmitter-receivers 12 over a same channel space using one of a number of conventional techniques to prevent a first signal transmitted by a first transmitter-receiver 10 or 12 from catastrophically interfering with a second signal transmitted by a second transmitter-receiver—a first signal "catastrophically" interferes with a second signal if the first signal renders the intended receiver of the second signal unable to recover data or other necessary information from the second signal.

For example, one such conventional technique is time-division multiplexing, where only one base 10 or client 12 can transmit a signal at any time; that is, time-division multiplexing prevents catastrophic interference by preventing multiple bases or clients from simultaneously transmitting signals. But time-division multiplexing allows signals from multiple bases 10 or clients 12 to occupy a same portion of the frequency spectrum (e.g., use one or more of the same subcarrier frequencies in the case of OFDM signals).

Another such conventional technique is spread spectrum, where each base 10 or client 12 transmits a respective signal over a same portion of the frequency spectrum using a different scrambling code to prevent catastrophic interference. The scrambling codes effectively cause each transmitted signal to include different frequencies while propagating through the channel space even though each signal may use the same subcarrier frequencies before the scrambling code is applied to the signal. But, unlike time-division multiplexing, spread spectrum allows simultaneous transmitting of signals.

Referring to FIGS. 10-23, described is an embodiment of a communication technique that prevents catastrophic interference but that also allows simultaneous transmission of multiple signals on the same frequencies in the same channel space without the use of scrambling codes. Therefore, such a technique may provide a channel space with an effective device bandwidth that is greater than the effective device bandwidth that either time-divisional multiplexing or spread spectrum can provide. Here, "device bandwidth" is a measure of the number of devices that can share a channel space.

Figure 10:
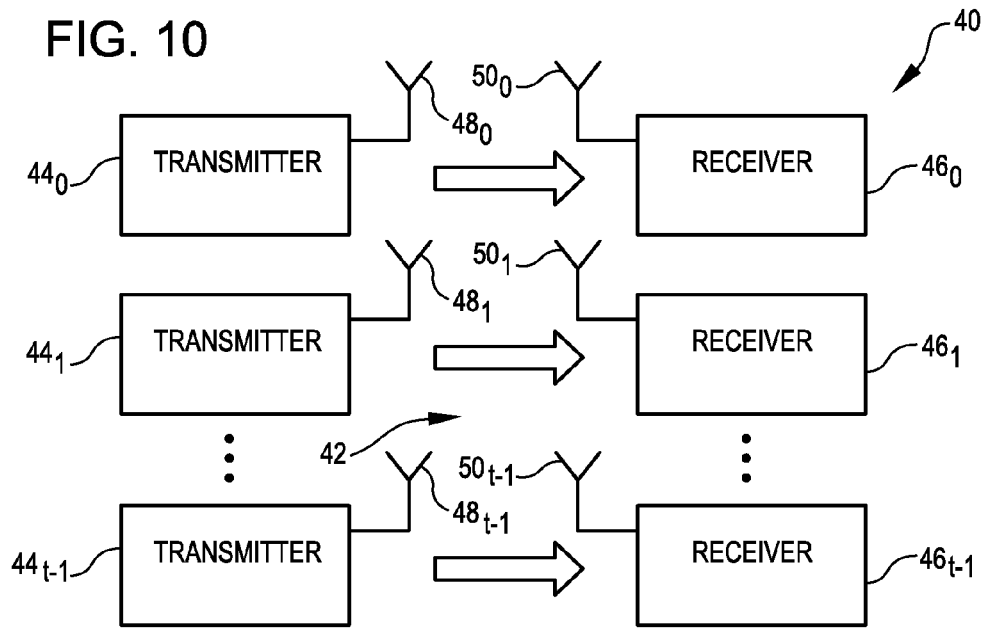
FIG. 10 is a diagram of OFDM transmitters that may simultaneously transmit signals that include at least one same frequency over a shared transmission-channel space to respective receivers according to an embodiment.

FIG. 10 is a diagram of a transmit-receive system 40, which includes a shared channel space 42, t transmitters $44_0$-$44_{t-1}$, and t receivers $46_0$-$46_{t-1}$, which are configured to operate according to an embodiment of the above-described simultaneous-transmission technique, and where the receivers and transmitters may be moving relative to each other. For purposes of explanation, the transmitters 44 are described as transmitting signals, and the receivers 46 are described as receiving signals. But it is understood that the transmitters 44 and receivers 46 may be part of respective transmitter-receivers, and that in such an embodiment, a similar description may apply if the receivers are transmitting signals and the transmitters are receiving the signals. For example, the transmitters 44 may belong to respective smart phones, and the receivers 46 may be respective cell towers or wireless access points.

Each transmitter 44 is coupled to a respective antenna 48, and each receiver 46 is coupled to a respective antenna 50. Alternatively, each antenna 48 may be considered to be a component of the respective transmitter 44, and each antenna 50 may be considered to be a component of the respective receiver 46.

In an embodiment, each receiver 46 is configured to recover data from only a signal transmitted by a corresponding one of the transmitters 44. For example, the receiver $46_0$ may be configured to recover data from only a signal transmitted by the transmitter $44_0$, the receiver $46_1$ may be configured to recover data from only a signal transmitted by the transmitter $44_1$, and the receiver $46_{t-1}$ may be configured to recover data from only a signal transmitted by the transmitter $44_{t-1}$.

Furthermore, the transmitters 44 have a hierarchy in which the transmitter $44_0$ has the highest priority, the transmitter $44_1$ has the next highest priority, and the transmitter $44_{t-1}$ has the lowest priority.

Figure 11A:
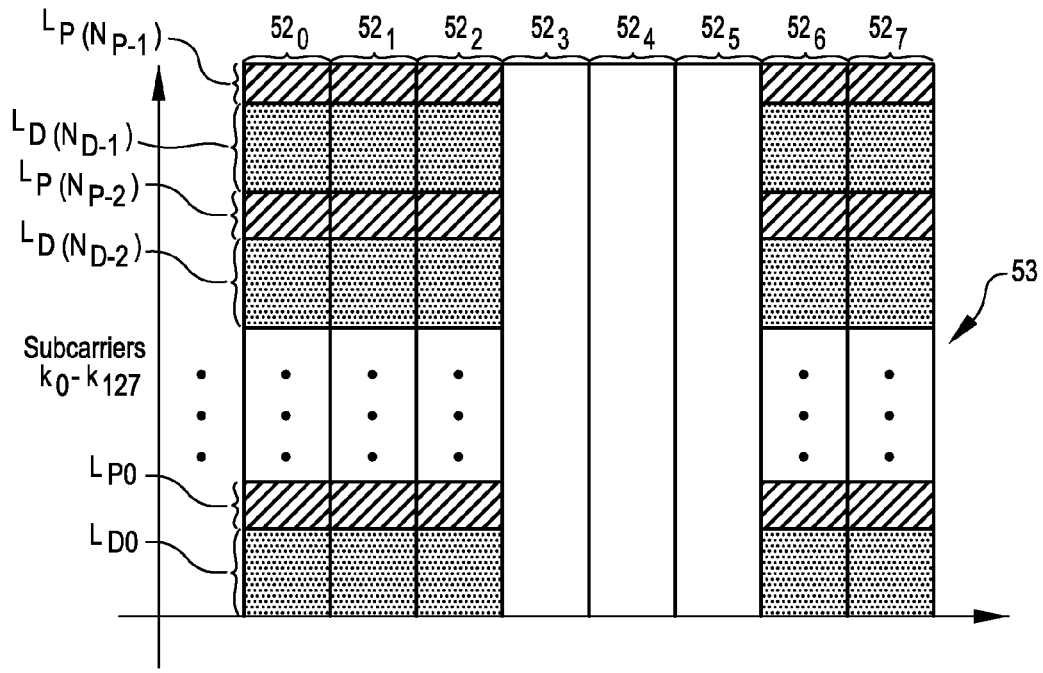
FIGS. 11A and 11B are plots of a primary OFDM signal being transmitted by a higher-priority transmitter, and of a secondary OFDM signal being simultaneously transmitted by a lower-priority transmitter, according to an embodiment.
Figure 11B:
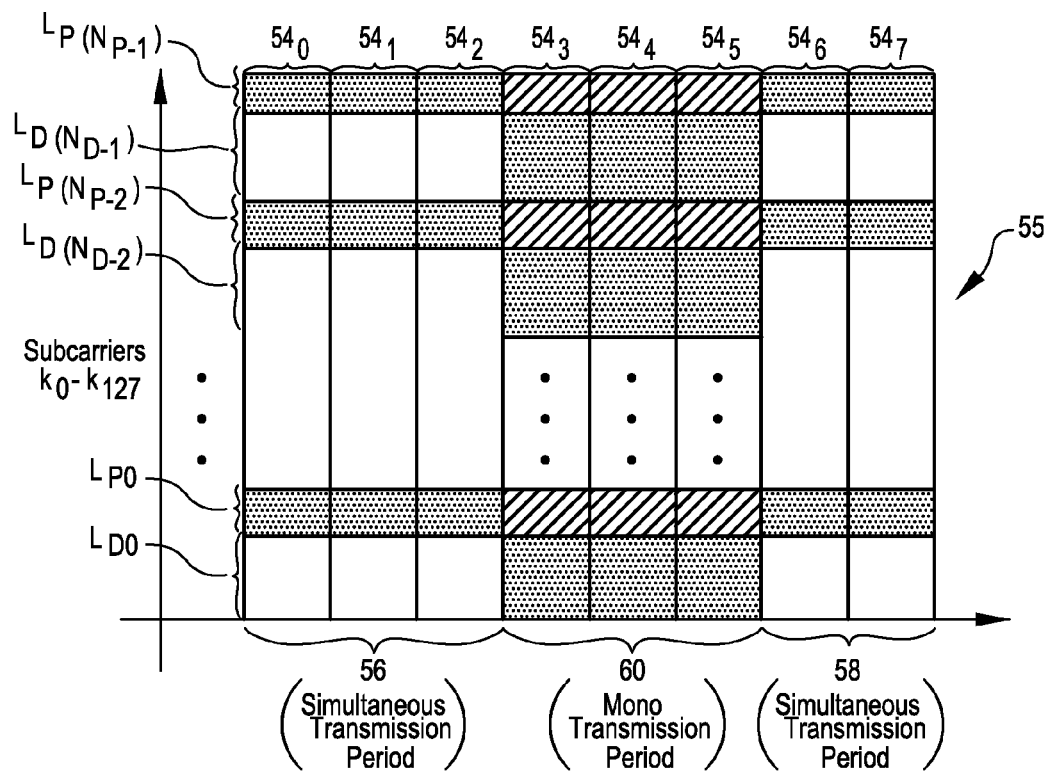

FIG. 11A is a plot of an embodiment of eight OFDM symbols $52_0$-$52_7$ carried by an OFDM signal 53, which is transmitted by a transmitter 44 (FIG. 10) having a higher priority, and FIG. 11B is a plot of an embodiment of eight OFDM symbols $54_0$-$54_7$ carried by an OFDM signal 55, which is transmitted by a transmitter 44 having a lower priority. The OFDM symbols 52 and 54 each include subcarriers at the same subcarrier frequencies, and include data clusters $L_D$ and pilot clusters $L_P$ of the same respective sizes and at the same respective subcarrier locations within the OFDM symbols. For example, if the OFDM symbols $52_0$-$52_7$ each include N=128 subcarriers $k_0$-$k_{127}$ at respective frequencies $f_0$-$f_{127}$, and each include four pilot clusters having five pilot subcarriers each, starting at subcarrier $k_{12}$, and separated by $P_{SEP}$=27 modulo<N>, then the OFDM symbols $54_0$-$54_7$ also each include N=128 subcarriers $k_0$-$k_{127}$ at the frequencies $f_0$-$f_{127}$, and also each include four pilot clusters having five pilot subcarriers each, starting at subcarrier $k_{12}$, and separated by $P_{SEP}$=27 modulo<N>.

Referring to FIG. 11A, during first and second simultaneous-transmission periods 56 and 58, the OFDM symbols $52_0$-$52_2$ and $52_6$-$52_7$ may be conventional, with respective data symbols modulating the data subcarriers in the data clusters $L_D$, and with respective pilot symbols modulating the pilot subcarriers in the pilot clusters $L_P$—here, a "data symbol" is the collection of all data subsymbols that modulate the respective data subcarriers in an OFDM signal, and a "pilot symbol" is the collection of all pilot subsymbols that modulate the respective pilot subcarriers in an OFDM signal.

But during a mono-transmission period 60, the OFDM symbols $52_3$-$52_5$ are not transmitted, i.e., have zero energy at all data and pilot subcarriers.

Referring to FIG. 11B, during the mono-transmission period 60, the OFDM symbols $54_3$-$54_5$ may be conventional, with respective data symbols modulating the data subcarriers in the data clusters $L_D$, and with respective pilot symbols modulating the pilot subcarriers in the pilot clusters $L_P$.

But during the first and second simultaneous-transmission periods 56 and 58, the data subcarriers of the OFDM symbols $54_0$-$54_2$ and $54_6$-$54_7$ have zero energy (i.e., are effectively modulated by a data symbol equal to zero) so as not to interfere with the data subcarriers of the OFDM symbols $52_0$-$52_2$ and $52_6$-$52_7$ of FIG. 11A; and the pilot clusters $L_P$ of each of the OFDM symbols $54_0$-$54_2$ and $54_6$-$54_7$ are modulated by a respective pilot symbol and by a respective one or more data symbols. As discussed in more detail in conjunction with FIG. 16, the pilot and data symbols that modulate the pilot clusters $L_P$ of the OFDM symbols $54_0$-$54_2$ and $54_6$-$54_7$ are designed such that the modulated pilot subcarriers of the OFDM signal 55 do not catastrophically interfere with the modulated pilot and data subcarriers of the OFDM signal 53. That is, even if a receiver 46 (FIG. 10) for which the OFDM signal 53 is intended also simultaneously receives the OFDM signal 55, then this receiver can still recover the data carried by the OFDM symbols $52_0$-$52_2$ and $52_6$-$52_7$. Similarly, if a receiver 46 for which the OFDM signal 55 is intended also simultaneously receives the OFDM signal 53, then this receiver can still recover the data carried by the OFDM symbols $54_0$-$54_2$ and $54_6$-$54_7$.

Referring to FIGS. 10-11B, the operations of the transmitters $44_0$ and $44_1$ and of the receivers $46_0$ and $46_1$ are described according to an embodiment. In this example, the transmitter $44_0$ is the higher-priority transmitter, and is called the "primary transmitter," and the transmitter $44_1$ is the lower-priority transmitter, and is called the "secondary transmitter." Furthermore, the "primary" OFDM signal 53 transmitted by the primary transmitter $44_0$ is intended for only the receiver $46_0$, which is, therefore, called the "primary receiver;" similarly, the "secondary" OFDM signal transmitted by the secondary transmitter $44_1$ is intended for only the receiver $46_1$, which is, therefore, called the "secondary receiver."

First, the operations of the primary and secondary transmitters $44_0$ and $44_1$ are described.

During the first simultaneous-transmission period 56, the primary transmitter $44_0$ generates the primary OFDM symbols $52_0$-$52_2$ by modulating the data clusters $L_D$ of each of these primary OFDM symbols with a respective data symbol, and by modulating the pilot clusters $L_P$ of each of these primary OFDM symbols with a same pilot symbol.

Also during the first simultaneous-transmission period 56, the secondary transmitter $44_1$ detects that the primary transmitter $44_0$ is transmitting the primary OFDM signal 53, and, in response to this detection, generates the secondary OFDM symbols $54_0$-$54_2$ by modulating the pilot clusters $L_P$ of each of these secondary OFDM symbols with a same pilot symbol and with a respective one or more data symbols, and by causing the data clusters $L_D$ of each of these secondary OFDM symbols to have zero energy.

The primary and secondary pilot symbols respectively generated by the primary and secondary transmitters $44_0$ and $44_1$, and the secondary data symbols generated by the secondary transmitter, during the simultaneous-transmission period 56 are designed to prevent catastrophic interference between the modulated primary pilot subcarriers of the OFDM symbols $52_0$-$52_2$ and the modulated secondary pilot subcarriers of the OFDM symbols $54_0$-$54_2$.

In an embodiment, such prevention of catastrophic interference may be realized by designing the primary and secondary pilot symbols respectively generated by the primary and secondary transmitters $44_0$ and $44_1$, and the secondary data symbols generated by the secondary transmitter, to be orthogonal to one another. That is, the primary pilot symbols generated by the primary transmitter $44_0$ are designed to be orthogonal to the secondary pilot symbols and secondary data symbols generated by the secondary transmitter $44_1$, the secondary pilot symbols generated by the secondary transmitter are designed to be orthogonal to the primary pilot symbols generated by the primary transmitter and to the secondary data symbols generated by the secondary transmitter, and the secondary data symbols generated by the secondary transmitter are designed to be orthogonal to the primary and secondary pilot symbols respectively generated by the primary and secondary transmitters.

Furthermore, the secondary transmitter $44_1$ causes the data clusters $L_D$ of the secondary OFDM symbols $54_0$-$54_2$ to have zero energy during the first simultaneous-transmission period 56 to prevent catastrophic interference between the primary data subcarriers transmitted by the primary transmitter $44_0$ and the secondary data subcarriers transmitted by the secondary transmitter.

Still referring to FIGS. 10-11B, during the mono-transmission period 60, the primary transmitter $44_0$ causes the primary data and pilot subcarriers of the OFDM symbols $52_3$-$52_5$ to have zero energy, which is akin to saying that the primary transmitter transmits no OFDM signal 53 (primary or otherwise) during the mono-transmission period.

Also during the mono-transmission period 60, the secondary transmitter $44_1$ detects that the primary transmitter $44_0$ is not transmitting the primary OFDM signal 53.

In response to detecting no primary OFDM signal 53 from the primary transmitter $44_0$, the secondary transmitter $44_1$ generates the secondary OFDM symbols $54_3$-$54_5$ in a conventional manner by modulating the data clusters $L_D$ of each of these secondary OFDM symbols with a respective data symbol, and by modulating the pilot clusters $L_P$ of each of these secondary OFDM symbols with a same pilot symbol, which may be the same pilot symbol used to modulate the secondary OFDM symbols $54_0$-$54_2$ during the first simultaneous-transmission period 56.

During the second simultaneous-transmission period 58, the primary transmitter $44_0$ generates the primary OFDM symbols $52_6$-$52_7$ in a manner that is similar to the above-described manner in which the primary transmitter generates the primary OFDM symbols $52_0$-$52_2$ during the first simultaneous-transmission period 56.

Further during the second simultaneous-transmission period 58, the secondary transmitter $44_1$ generates the secondary OFDM symbols $54_6$-$54_7$ in a manner that is similar to the above-described manner in which the secondary transmitter generates the secondary OFDM symbols $54_0$-$54_2$ during the first simultaneous-transmission period 56.

Consequently, there is no catastrophic interference between the primary and secondary OFDM signals 53 and 55 during the second simultaneous-transmission period 58.

Still referring to FIGS. 10-11B, the operations of the primary and secondary receivers $46_0$ and $46_1$ are described according to an embodiment.

Because the primary and secondary transmitters $44_0$ and $44_1$ transmit the primary and secondary OFDM signals 53 and 55 in the same channel space 42, the primary receiver $46_0$ may simultaneously receive both the primary and secondary OFDM signals during the first and second simultaneous transmission periods 56 and 58; similarly, the secondary receiver $46_1$ may simultaneously receive both the primary and secondary OFDM signals during the first and second simultaneous-transmission periods.

But even if the primary receiver $46_0$ simultaneously receives both of the primary and secondary OFDM signals 53 and 55 during the first and second simultaneous-transmission periods 56 and 58, the primary receiver still is able to recover the data symbols from the primary OFDM symbols $52_0$-$52_2$ and $52_6$-$52_7$ because, as discussed above, the pilot symbols of these primary OFDM symbols, and the pilot and data symbols of the secondary OFDM symbols $54_0$-$54_2$ and $54_6$-$54_7$, are designed so as to prevent catastrophic interference between the pilot subcarriers of these primary and secondary OFDM symbols. An example of how the primary receiver $46_0$ may recover the data symbols from the primary OFDM symbols $52_0$-$52_2$ and $52_6$-$52_7$ is discussed below in conjunction with FIGS. 17-18 and 21-22.

For similar reasons, even if the secondary receiver $46_1$ simultaneously receives both of the primary and secondary OFDM signals 53 and 55 during the simultaneous-transmission periods 56 and 58, the secondary receiver still is able to recover the data symbols from the secondary OFDM symbols $54_0$-$54_2$ and $54_6$-$54_7$. An example of how the secondary receiver $46_1$ may recover the data symbols from the secondary OFDM symbols $54_0$-$54_2$ and $54_6$-$54_7$ is discussed below in conjunction with FIGS. 19-20 and 22-23.

Still referring to FIGS. 10-11B, the above example may be extended to more than two transmitters 44 transmitting to a respective more than two receivers 46 during the simultaneous-transmitting periods 56 and 58.

In such an extended example, the transmitter with the highest priority would be the primary transmitter, and would transmit a primary OFDM signal like the primary OFDM signal 53, and the remaining transmitters would be secondary transmitters, and would transmit respective secondary OFDM signals like the secondary OFDM signal 55. And to prevent these primary and secondary OFDM signals from catastrophically interfering with one another during simultaneous transmission periods, the primary pilot symbols transmitted by the primary transmitter, the secondary pilot symbols transmitted by the secondary transmitters, and the secondary data symbols transmitted by the secondary transmitters may be orthogonal to one another.

And because the primary and secondary OFDM signals would not catastrophically interfere with one another, the primary receiver can recover data from the primary OFDM signal, and the secondary receivers can recover data from the respective secondary OFDM signals, even if one or more of these receivers simultaneously receives more than one of the OFDM signals over the shared channel space 42.

Furthermore, at least some of the transmitters 44 may operate as both primary and secondary transmitters, and at least some of the receivers 46 may operate as both primary and secondary receivers. For example, the transmitter $44_1$ and the receiver $46_1$ may respectively operate as a primary transmitter and a primary receiver while the transmitter $44_0$ is inactive, and may respectively operate as a secondary transmitter and a secondary receiver while the transmitter $44_0$ is active.

Still referring to FIGS. 10-11B, alternate embodiments of the transmitters 44, receivers 46, and primary and secondary OFDM signals 53 and 55 are contemplated. For example, the primary and secondary transmitters may prevent catastrophic interference between the primary and secondary OFDM signals 53 and 55 during the simultaneous-transmission periods 56 and 58 using a technique other than orthogonal pilot and data symbols. Furthermore, each transmitter 44 and each receiver 46 may be implemented in hardware, software, or a combination of hardware and software.

FIG. 12 is a diagram of a transmit-receive system 70, which includes the shared channel space 42, the t transmitters $44_0$-$44_{t-1}$, and a receiver 46, where the receiver and one or more of the transmitters may be moving relative to one another. A difference between the system 70 and the transmit-receive system 40 of FIG. 10 is that the system 70 includes only the single receiver 46, which is intended to receive the primary and secondary OFDM signals (such as the OFDM signals 53 and 55 of FIGS. 11A-11B) that are transmitted by all of the transmitters $44_0$-$44_{t-1}$. Therefore, the receiver 46 may operate such as described above in conjunction with FIGS. 10-11B and below in conjunction with FIGS. 17-23 to recover data from the primary and secondary OFDM signals transmitted by the transmitters 44 during both simultaneous- and mono-transmission periods (such as the simultaneous-transmission periods 56 and 58 and the mono-transmission period 60 of FIGS. 11A-11B). Furthermore, it is understood that the transmitters 44 and the receiver 46 may be part of respective transmitter-receivers, and that in such an embodiment, the transmitter-receiver to which the receiver 46 belongs may transmit primary or secondary OFDM signals to one or more of the transmitter-receivers that respectively include the transmitters 44.

Alternate embodiments of the transmit-receive system 70 are contemplated. For example, the system 70 may include more than one, but fewer than t, receivers 46, where some of the receivers may be intended to receive OFDM signals from all of the transmitters 44, and others of the receivers may be intended to receive OFDM signals from one or more, but fewer than all, of the transmitters 44.

Figure 13:
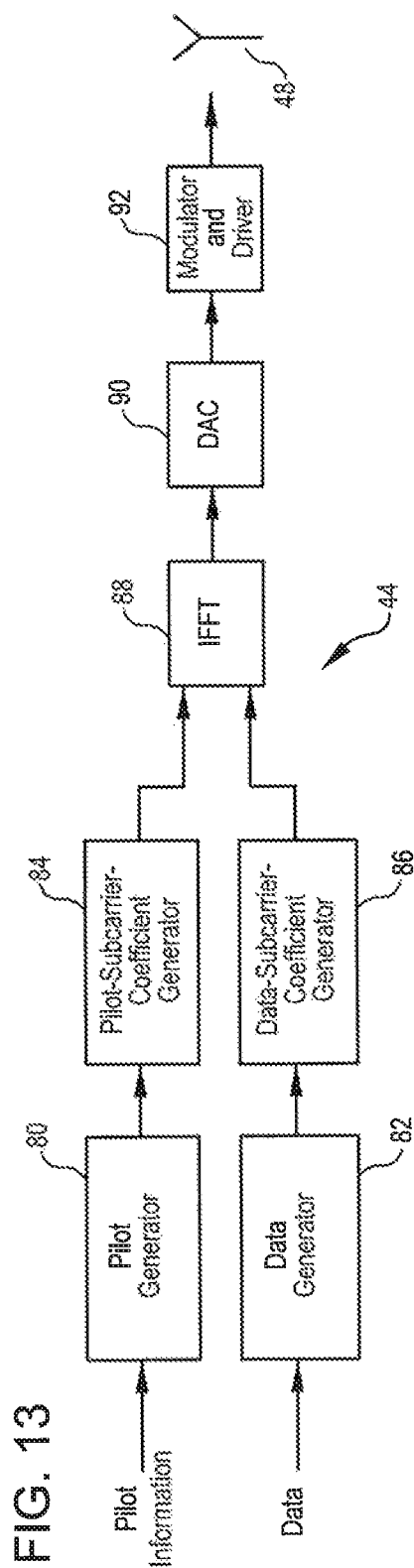
FIG. 13 is a diagram of a higher-priority transmitter that may transmit a primary OFDM signal according to an embodiment.

FIG. 13 is a diagram of an embodiment of a primary transmitter 44, such as the highest-priority transmitter $44_0$ of FIG. or of FIG. 12. The primary transmitter 44 may generate a primary OFDM signal, such as the primary OFDM signal 53 of FIG. 11A, and may modulate the pilot subcarriers of a primary OFDM symbol (such as the symbol $52_0$ of FIG. 11A) with a primary pilot symbol (hereinafter called a "pilot-symbol pattern" or a "pilot-symbol-pattern matrix") $P_{pilot\_primary}^{(i)}$, which prevents catastrophic interference between the primary OFDM signal and one or more secondary OFDM signals. In an embodiment, the primary pilot-symbol pattern $P_{pilot\_primary}^{(i)}$ is orthogonal to the pilot-symbol patterns and the data-symbol patterns pilot primary that modulate the pilot subcarriers of the secondary OFDM signal(s). All pilot-symbol patterns discussed hereinafter are assumed to be APPC pilot clusters (FIG. 8) unless otherwise noted.

The transmitter 44 includes a pilot generator 80, a data generator 82, a pilot-subcarrier-coefficient generator 84, a data-subcarrier-coefficient generator 86, an Inverse Fourier Transform (IFFT) unit 88, a digital-to-analog converter (DAC) 90, a modulator and driver 92, and the antenna 48.

The pilot generator 80 may generate pilot subsymbols from pilot information that may include the pilot-symbol pattern $P_{pilot\_primary}^{(i)}$, which is in the form of a matrix as discussed further below.

Similarly, the data generator 82 may generate data subsymbols from data information.

The pilot-subcarrier-coefficient generator 84 generates, from each pilot subsymbol, a respective complex frequency-domain coefficient for mapping to the respective pilot subcarrier.

Similarly, the data-subcarrier-coefficient generator 86 generates, from each data subsymbol, a respective complex frequency-domain coefficient for mapping to the respective data subcarrier.

The IFFT unit 88 transforms the pilot-subcarrier coefficients and data-subcarrier coefficients into a digital time-domain waveform.

The DAC 90 converts the digital time-domain waveform into an analog time-domain waveform.

The modulator and driver 92 modulates a carrier signal (e.g., a 5.4 GHz carrier) with the analog waveform, and drives the antenna with the modulated carrier signal.

And the antenna 48 transmits the modulated carrier signal for reception by a receiver such as a primary receiver 46 of FIG. 10. The antenna 48 may also function as a receive antenna if the transmitter 44 is part of a transmitter-receiver device.

Figure 14:
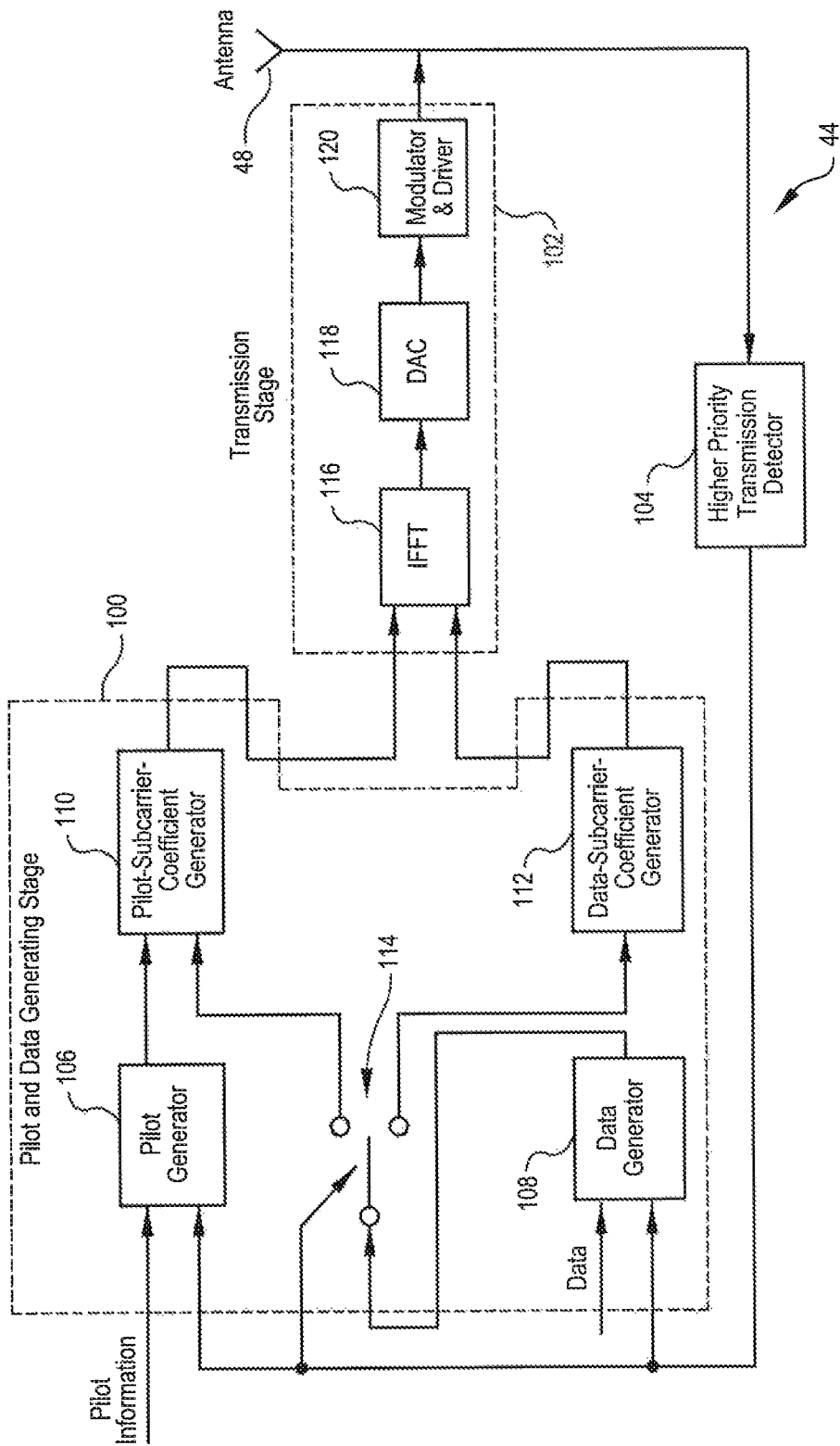
FIG. 14 is a diagram of a lower-priority transmitter that may transmit a secondary OFDM signal according to an embodiment.

In an embodiment, the pilot generator 80 may generate a primary pilot-symbol pattern according to a respective pilot-symbol-pattern matrix $P_{pilot\_primary}^{(i)}$ such that each column of $P_{pilot\_primary}^{(i)}$ is orthogonal to every column of each of the secondary pilot-symbol-pattern matrices $P_{pilot\_secondary}^{(i)}$ and secondary data-symbol-pattern matrices $P_{data\_secondary}^{(i)}$, which are generated by the respective secondary transmitters (described below in conjunction with FIG. 14). Such orthogonality is present when the following equation is true:

$$P^{(m)H}P^{(n)}=0 \text{ for } 0 \le m \le j-1, 0 \le n \le j-1, \quad (3)$$

where j is the combined number of primary pilot symbols, secondary pilot symbols, and data symbols, $m \ne n$, and $P^{(m)}$ and $P^{(n)}$ represent the matrices $P_{pilot\_primary}^{(i)}$, $P_{pilot\_secondary}^{(i)}$, and $P_{data\_secondary}^{(i)}$ depending on the values of m and p n.

An example of such an orthogonal primary pilot-symbol-pattern matrix is given by the following equation:

$$P_{pilot\_primary}^{(0)} = [f^{(0Z)}; f^{(0Z)}; \ldots; f^{(0Z)}] \quad (4)$$

where "0" is the index number (i=0) for the primary pilot-symbol-pattern matrix, $f^{(0Z)}$ is a column vector, Z is the number of paths L in each channel between a respective transmitter-receiver pair (in an embodiment it is assumed that each channel always has the same number Z of paths L), and $P_{pilot\_primary}^{(0)}$ has $N_P$ rows (each row represents a pilot cluster) and $L_{PN}=2w_p+1$ identical columns (i.e. $f^{(0Z)H}f^{(0Z)}=N_P$) so as to have a form given by the following equation:

$$P_{pilot\_primary}^{(0)} = \begin{bmatrix} p_{cluster\_(0)}^{(0)} \\ \vdots \\ p_{cluster\_(Np-1)}^{(0)} \end{bmatrix} \quad (5)$$

where, the first row $p_{cluster\_(0)}^{(0)}$ of $P_{pilot\_primary}^{(0)}$ includes the pilot subsymbols that compose the $0^{th}$ pilot cluster $L_P$ transmitted by the antenna 48, the second row $p_{cluster\_(1)}^{(0)}$ of $P_{pilot\_primary}^{(0)}$ includes the pilot subsymbols that compose the $1^{st}$ pilot cluster $L_P$ transmitted from the antenna, and the $(N_P-1)^{th}$ row $p_{cluster\_(N_P-1)}^{(0)}$ of $P_{pilot\_primary}^{(0)}$ includes the pilot subsymbols that compose the $(N_P-1)^{th}$ pilot cluster $L_P$ transmitted from the antenna. In an embodiment, the rows of $P_{pilot\_primary}^{(0)}$ may be shifted up or down as long as they remain in a sequence $0-N_P-1$, and the same shift is applied to all of the matrices $P_{pilot\_secondary}^{(i)}$ and $P_{data\_secondary}^{(i)}$ for $1 \le i \le j-1$, where j is the combined number of the primary pilot symbol, secondary pilot symbols, and data pilot symbols.

An example of the $N_P \times 1$ column vector $f^{(iZ)}$ is given by the following equation:

$$f^{(iZ)} = [1 \, e^{-j2\pi\Delta f_p iZ} \, e^{-j2\pi 2 \Delta f_p iZ} \, e^{-j2\pi 3 \Delta f_p iZ} \ldots \\ e^{-j2\pi(N_p-1)\Delta f_p iZ}]^T \quad (6)$$

where $$\Delta f_p = \frac{1}{N_p}.$$

Therefore, $$f^{(0Z)} = [1 \, 1 \, 1 \, 1 \ldots 1]^T \quad (7)$$

In another embodiment, the pilot generator 80 may generate a respective primary pilot-symbol pattern according to a respective primary pilot-symbol-pattern matrix $P_{pilot\_primary}^{(i)}$ such that not only is each column of $P_{pilot\_primary}$ orthogonal to every column of each of the secondary pilot-symbol-pattern matrices $P_{pilot\_secondary}^{(i)}$ and secondary data-symbol-pattern matrices $P_{data\_secondary}^{(i)}$, but each column of $P_{pilot\_primary}$ is also orthogonal to every other column of the same matrix $P_{pilot\_primary}^{(i)}$. Such "dual" orthogonality is present when the following equations are true:

$$P^{(m)H}P_{(n)}=0 \text{ for } 0 \le m \le j-1, 0 \le n \le j-1, \text{ and } m \ne n, \text{ and} \quad (8)$$

$$f^{(d)H}f^{(v)}=0 \text{ for } 0 \le d \le L_{PN}-1, 0 \le v \le L_{PN}-1, \text{ and } d \ne v \quad (9)$$

where $f^{(u)}$ are the $L_{PN}$ column vectors that compose $P_{pilot\_primary}^{(i)}$.

An example of such pilot-symbol- and data-symbol-pattern matrices with dual orthogonality is given by the following equation:

$$P^{(i)} = [f^{(iL_{PN}Z+0Z)}; f^{(iL_{PN}Z+1Z)}; f^{(iL_{P}Z+2Z)}; \ldots; \\ f^{(iL_{PN}Z+(L_{PN}-1)Z)}] \text{ for } 0 \le i \le j-1 \quad (10)$$

where i is the pattern index, Z is the number of paths L in each channel between a respective transmitter-receiver pair (in an embodiment it is assumed that each channel always has the same number Z of paths L), and $P^{(i)}$ has $N_P$ rows (each row represents a pilot cluster) and $L_{PN}=2w_p+1$ orthogonal columns such that $f^{(iL_{PN}Z+d)H}f^{(iL_{PN}Z+v)}=0$ for d, $v \in \{0, Z, \ldots, ((L_{PN}-1)Z)\}$ and $d \ne v$.

An example of an $N_P \times 1$ column vector $f^{(iL_{PN}Z+u)}$ for $u \in \{0, Z, \ldots, ((L_{PN}-1)Z)\}$ (this means that "u" is a constant selected from the set of $L_{PN}$ possible elements $0, Z, \ldots, (L_{PN}-1)Z$) is given by the following equation:

$$f^{(iL_{PN}Z+u)} = [1 \, e^{-j2\pi\Delta f_p(iL_{PN}Z+u)} \, e^{-j2\pi 2\Delta f_p(iL_{PN}Z+u)} \\ e^{-j2\pi 3\Delta f_p(iL_{PN}Z+u)} \ldots e^{-j2\pi(N_p-1)\Delta f_p(iL_{PN}Z+u)}]^T \quad (11)$$

where $$\Delta f_p = \frac{1}{N_p}.$$

Therefore, one may form each vector of the primary pilot-symbol-pattern matrix $P_{pilot\_primary}^{(0)}$ according to the following equation:

$$f^{(0L_{PN}Z+u)} = [1 \, e^{-j2\pi\Delta f_p(u)} \, e^{-j2\pi 2\Delta f_p(u)} \, e^{-j2\pi 3\Delta f_p(u)} \ldots \\ e^{-j2\pi(N_p-1)\Delta f_p(u)}]^T \quad (12)$$

where i=0 and $u \in \{0, Z, \ldots, ((L_{PN}-1)Z)\}$. That is, to form the entire matrix $P_{pilot\_primary}^{(0)}$, one generates the first column of this matrix from equation (12) with u=0, the second column of this matrix from equation (12) with u=Z, the third column of this matrix from equation (12) with u=2Z, ..., and the $L_{PN}^{th}$ column of this matrix from equation (12) with $u=(L_{PN}-1)Z$.

It has been found that such dual-orthogonal pilot-symbol-pattern matrices $P^{(i)}$ may improve the performance of a receiver's channel estimator as discussed in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011, which are incorporated by reference.

Still referring to FIG. 13, alternate embodiments of the primary transmitter 44 are contemplated. For example, the modulator 92 may be omitted. Furthermore, the functions performed by any of the components of the transmitter 44 may be performed in hardware, software, or a combination of hardware and software, where the software is executed by a controller such as a processor. Moreover, pilot-symbol patterns and pilot-symbol-pattern matrices other than those described are contemplated.

FIG. 14 is a diagram of an embodiment of a secondary transmitter 44, such as the second-highest-priority transmitter $44_1$ of FIG. 10 or 12. The transmitter 44 may operate as a primary transmitter, and thus may generate a primary OFDM signal such as the primary OFDM signal 53 of FIG. 11A, while the transmitter is the highest-priority transmitter currently transmitting a signal, and may operate as a secondary transmitter, and thus may generate a secondary OFDM signal such as the secondary OFDM signal 55 of FIG. 11B, while the transmitter is not the highest-priority transmitter currently transmitting a signal. While operating as a primary transmitter, the transmitter 44 may modulate the pilot subcarriers of the primary OFDM symbol (such as the symbol $52_0$ of FIG. 11A) with a primary pilot-symbol pattern $P_{pilot\_primary}^{(i)}$ such as discussed above in conjunction with FIG. 13; and while operating as a secondary transmitter, the transmitter 44 may modulate the pilot subcarriers and data subcarriers of the secondary OFDM symbol (such as the symbol $54_0$ of FIG. 11B) with a secondary pilot-symbol pattern $P_{pilot\_secondary}^{(i)}$ and with one or more secondary data-symbol patterns $P_{data\_secondary}^{(i)}$, which are discussed below. As discussed above, modulating the pilot subcarriers with $P_{pilot\_primary}^{(i)}$ while the transmitter 44 is operating as a primary transmitter, and with $P_{pilot\_secondary}$ and $P_{data\_secondary}^{(i)}$ and while the transmitter is operating as a secondary transmitter, prevents catastrophic interference between the primary OFDM signal and one or more simultaneously transmitted secondary OFDM signals because, for example, $P_{pilot\_primary}$, $P_{pilot\_secondary}$, and $P_{data\_secondary}^{(i)}$ are orthogonal to one another.

The secondary transmitter 44 includes a pilot-and-data-generating stage 100, a transmission stage 102, a higher-priority-transmission detector 104, and an antenna 48.

The pilot-and-data-generating stage 100 includes a pilot generator 106, a data generator 108, a pilot-subcarrier-coefficient generator 110, a data-subcarrier-coefficient generator 112, and a primary-secondary mode switch 114.

The pilot generator 106 generates pilot information that may include a primary pilot-symbol pattern $P_{pilot\_primary}^{(i)}$ while the transmitter 44 is operating as a primary transmitter, and that may include a secondary pilot-symbol pattern $P_{pilot\_primary}^{(i)}$ while the transmitter is operating as a secondary transmitter; $P_{pilot\_primary}^{(i)}$ and $P_{pilot\_secondary}^{(i)}$ are in the form of matrices as discussed above and below.

Similarly, the data generator 108 generates data subsymbols from data information, and the data subsymbols may collectively be in the form of a data-symbol pattern. While the transmitter 44 is operating as a primary transmitter, the data generator 108 generates a primary data-symbol pattern that is compatible with the data-subcarrier-coefficient generator 112 modulating the data subcarriers with the primary data-symbol pattern; but while the transmitter is operating as a secondary transmitter, the data generator generates one or more secondary data-symbol patterns $P_{data\_secondary}^{(i)}$ that are compatible with the pilot-subcarrier-coefficient generator 110 modulating the pilot subcarriers with the secondary data-symbol pattern(s).

While the transmitter 44 is operating as a primary transmitter, the pilot-subcarrier-coefficient generator 110 generates, from each pilot subsymbol provided by the pilot generator 106, a respective complex frequency-domain coefficient for mapping to the respective pilot subcarrier. And while the transmitter 44 is operating as a secondary transmitter, the pilot-subcarrier-coefficient generator 110 generates, from each pilot subsymbol provided by the pilot generator 106 and from each data subsymbol provided by the data generator 108 via the mode switch 114, a respective complex frequency-domain coefficient for mapping to the respective pilot subcarrier.

While the transmitter 44 is operating as a primary transmitter, the data-subcarrier-coefficient generator 112 generates, from each data subsymbol received from the data generator 108 via the mode switch 114, a respective complex frequency-domain coefficient for mapping to the respective data subcarrier. For example, the data-subcarrier-coefficient generator 112 may be similar to the data-subcarrier-coefficient generator 86 of FIG. 13.

The transmission stage 102 includes an Inverse Fourier Transform (IFFT) unit 116, a digital-to-analog converter (DAC) 118, and a modulator and driver 120, which may be similar to the IFFT unit 88, DAC 90, and modulator and driver 92, respectively, of FIG. 13. But as discussed below, the IFFT unit 116 may increase the power of the pilot subcarriers while the transmitter 44 is operating as a secondary transmitter so that the total power of the secondary OFDM signal may be approximately the same as the total power of a primary OFDM signal that the transmitter generates while operating as a primary transmitter.

The antenna 48 transmits the modulated carrier signal for reception by a receiver such as a primary or secondary receiver 46 of FIG. 10, or by the combined (primary and secondary) receiver 46 of FIG. 12. The antenna 48 may also function as a receive antenna if the transmitter 44 is part of a transmitter-receiver device.

The higher-priority-transmission detector 104 conventionally senses whether a higher-priority transmitter is transmitting within the shared channel space 42 (FIGS. 10 and 12). If the detector 104 senses that a higher-priority transmitter is transmitting, then the detector generates a control signal that causes the pilot generator 106 to generate the secondary pilot-symbol-pattern matrix P the data generator 108 to generate one or more secondary data-symbol-pattern matrices $P_{data\_secondary}^{(i)}$, and the mode switch 114 to couple the data generator 108 to the pilot-subcarrier-coefficient generator 110. But if the detector 104 does not sense that a higher-priority transmitter is transmitting, then the detector generates a control signal that causes the pilot generator 106 to generate the primary pilot-symbol-pattern matrix $P_{pilot\_primary}^{(i)}$, the data generator 108 to generate a primary data-symbol-pattern matrix, and the mode switch 114 to couple the data generator 108 to the data-subcarrier-coefficient generator 112. If the detector 104 first detects that a higher-priority transmitter is transmitting, and then detects that a higher-priority transmitter is not transmitting, then the detector generates a control signal that causes the transmitter 44 to shift from secondary mode to primary mode; conversely, if the detector 104 first detects that a higher-priority transmitter is not transmitting, and then detects that a higher-priority transmitter is transmitting, then the detector generates a control signal that causes the transmitter 44 to shift from primary mode to secondary mode.

In an embodiment, while the transmitter 44 is operating as a primary transmitter, the pilot generator 106 may generate a primary pilot-symbol pattern according to a pilot-symbol-pattern matrix $P_{pilot\_primary}^{(0)}$ as discussed above in conjunction with FIG. 13.

And while the transmitter 44 is operating as a secondary transmitter, the pilot generator 106 may generate a secondary pilot-symbol pattern according to a secondary pilot-symbol-pattern matrix $P_{pilot\_secondary}^{(1)}$, which is orthogonal to $P_{pilot\_primary}^{(0)}$ for reasons discussed above in conjunction with FIG. 13.

An example of such an orthogonal secondary pilot-symbol-pattern matrix is given by the following equation:

$$P_{pilot\_secondary}^{(1)} = [f^{(1Z)}; f^{(1Z)}; \ldots; f^{(1Z)}] \quad (13)$$

where i=1 is the secondary pilot-symbol-pattern index number, $f^{(1Z)}$ is a column vector, Z is the number of paths L in each channel between a respective transmitter-receiver pair (in an embodiment it is assumed that each channel always has the same number Z of paths L), and $P_{pilot\_secondary}^{(1)}$ has $N_P$ rows (each row represents a pilot cluster) and $L_{PN}=2w_p+1$ identical columns (i.e., $f^{(1Z)H}f^{(1Z)}=N_P$) so as to have the following matrix form:

$$P_{pilot\_secondary}^{(1)} = \begin{bmatrix} p_{cluster\_(0)}^{(1)} \\ \vdots \\ p_{cluster\_(N_p-1)}^{(1)} \end{bmatrix} \quad (14)$$

where the first row $p_{cluster\_(0)}^{(1)}$ of $P_{pilot\_secondary}$ includes the pilot subsymbols that compose the $0^{th}$ pilot cluster $L_P$ transmitted by the antenna 48, the second row $p_{cluster\_(0)}^{(1)}$ of $P_{pilot\_secondary}^{(1)}$ secondary includes the pilot subsymbols that compose the $1^{st}$ pilot cluster $L_P$ transmitted from the antenna, and the $(N_P-1)^{th}$ row $p_{cluster\_(N_p-1)}^{(1)}$ of $P_{pilot\_secondary}$ includes the pilot subsymbols that compose the $(N_P-1)^{th}$ pilot cluster $L_P$ transmitted from the antenna. In an embodiment, the rows of $P_{pilot\_secondary}$ may be shifted up or down as long as they remain in a sequence 0-$N_{P\_1}$, and the same shift is applied to all of the matrices $P_{pilot\_primary}^{(i)}$ and $P_{data\_secondary}^{(i)}$ for $1 \leq i \leq j-1$, where j is the combined number of the primary pilot symbol, secondary pilot symbol, and data pilot symbol(s).

An example of the $N_P \times 1$ column vector $f^{(iZ)}$ is given by equation (6) above. Therefore, $$f^{(1Z)} = [1 e^{-j2\pi\Delta fpZ} e^{-j2\pi 2\Delta fpZ} e^{-j2\pi 3\Delta fpZ} \ldots e^{-j2\pi(N_p-1)\Delta fpZ}]^T \quad (15)$$

where $$\Delta f_p = \frac{1}{N_p}.$$

In another embodiment, the pilot generator 106 may generate a respective secondary pilot-symbol pattern according to a respective secondary pilot-symbol-pattern matrix $P_{pilot\_secondary}^{(i)}$ such that not only is each column of $P_{pilot\_secondary}$ orthogonal to each column of the primary pilot-symbol-pattern matrix $P_{pilot\_primary}^{(i)}$ and the secondary data-symbol-pattern matrix(ces) $P_{data\_secondary}^{(i)}$, but each column of $P_{pilot\_secondary}^{(i)}$ is also orthogonal to every other column of the same matrix $P_{pilot\_secondary}^{(i)}$ as discussed above in conjunction with FIG. 13 and equations (8) and (9).

An example of such a secondary pilot-symbol matrix with dual orthogonality is given by the following equation:

$$P_{pilot\_secondary}^{(1)} = [f^{(1L_{PN}Z+0)}; f^{(1L_{PN}Z)}; \ldots; f^{(1L_{PN}Z+(L_{PN}-1)Z)}] \quad (16)$$

per equation (10) above, where i=1 is the secondary pilot-symbol-pattern index number, $f^{(L_{PN}Z+Z)}$ is a column vector, Z is the number of paths L in each channel between a respective transmitter-receiver pair (in an embodiment it is assumed that each channel always has the same number Z of paths L), and $P_{pilot\_secondary}^{(1)}$ has $N_P$ rows (each row represents a pilot cluster) and $L_{PN}=2w_p+1$ different columns.

Per equation (11) above, an example of an $N_p \times 1$ column vector $f^{(L_{PN}Z+u)}$ for $u \in \{0, Z, \ldots, ((L_{PN}-1)Z)\}$ is given by the following equation:

$$f^{(L_{PN}Z+u)} = [1 e^{-j2\pi\Delta fp(L_{PN}Z+u)} e^{-j2\pi 2\Delta fp(L_{PN}Z+u)} e^{-j2\pi 3\Delta fp(L_{PN}Z+u)} \ldots e^{-j2\pi(N_p-1)\Delta fp(L_{PN}Z+u)}]^T \quad (17)$$

That is, to form the entire matrix $P_{pilot\_primary}^{(1)}$, one generates the first column of this matrix from equation (17) with u=0, the second column of this matrix from equation (17) with u=Z, the third column of this matrix from equation (17) with u=2Z, ..., and the $L_{PN}^{th}$ column of this matrix from equation (17) with u=$(L_{PN}-1)Z$.

Still referring to FIG. 14, and further while the transmitter 44 is operating as a secondary transmitter, the data generator 108 may generate one or more secondary data-symbol patterns according to one or more secondary data-symbol-pattern matrices $P_{data\_secondary}^{(i)}$, which are each orthogonal to $P_{pilot\_primary}^{(0)}$ and to P $P_{pilot\_secondary}^{(1)}$ for reasons discussed above in conjunction with FIG. 13.

An example of such an orthogonal secondary data-symbol-pattern matrix is given by the following equation:

$$P_{data\_secondary}^{(i)} = \alpha_i P^{(i)} \text{ for } i=2 \to \lfloor N_P/Z \rfloor \quad (18)$$

where the "$\lfloor\ \rfloor$" operator indicates that $N_P/Z$ is rounded to the nearest integer not greater than $N_P/Z$, where $$P^{(i)} = [f^{(iZ)}; f^{(iZ)}; \ldots; f^{(iZ)}] \quad (19)$$

per equations (4) and (6) above, or $$P^{(i)} = [f^{(iL_{PN}Z+0Z)}; f^{(iL_{PN}Z+2Z)}; \ldots; f^{(iL_{PN}Z+(L_{PN}-1)Z)}] \quad (20)$$

per equation (10) above, where $\alpha_i$ is given by the following equation:

$$\alpha_i = \sqrt{\frac{(L_{PN} + L_{DN})Z}{L_{PN}(N_P - 2Z)}} X_i \quad (21)$$

and where $L_{PN}$ is the length of each pilot cluster, $L_{DN}$ is the length of each data cluster, Z is the number of paths L in each channel between a transmitter-receiver pair in the shared channel space 42 (FIGS. 10 and 12), $N_P$ is the number of pilot clusters in the primary and secondary OFDM symbols, and $X_i$ are the data subsymbols that are generated by the data generator 108. In an embodiment, i=2 is the first symbol-pattern index value for the secondary data-symbol-pattern matrices $P_{data\_secondary}^{(i)}$ per equation (19) because i=0 is the index value for the primary pilot-symbol-pattern matrix $P_{pilot\_primary}$ per equation (4), and because i=1 is the index value for the secondary pilot-symbol-pattern matrix $P_{pilot\_secondary}^{(i)}$ per equation (16).

The group of all possible data-symbol-pattern matrices $P_{data\_secondary}^{(i)}$ is given by the following equation:

$$P_{data\_secondary} = \sum_{i=2}^{\lfloor \frac{N_P}{Z} \rfloor} \alpha_i P^{(i)} \quad (22)$$

$P_{data\_secondary}^{(i)}$, therefore, may be a sum of multiple secondary data-symbol-pattern matrices $P_{data\_secondary}^{(i)}$, where the pilot-subcarrier-coefficient generator 110 modulates the pilot subcarriers of a secondary OFDM symbol with the sum of $P_{pilot\_secondary}^{(1)}$ and $P_{data\_secondary}$ (where $P_{data\_secondary}$ itself may be a sum of j−2 matrices, where j is the total number of primary pilot, secondary pilot, and secondary data matrices).

Each secondary data-symbol-pattern matrix $P_{data\_secondary}^{(i)}$ is in the form:

$$P_{data\_secondary}^{(i)} = \begin{bmatrix} p_{cluster\_(0)}^{(i)} \\ \vdots \\ p_{cluster\_(N_p-1)}^{(i)} \end{bmatrix} \quad (23)$$

where, the first row $p_{cluster\_(0)}^{(i)}$ of $P_{data\_secondary}^{(i)}$ includes the pilot subsymbols that compose the $0^{th}$ pilot cluster $L_P$ transmitted by the antenna 48, the second row $p_{cluster\_(1)}^{(i)}$ of $P_{data\_secondary}^{(i)}$ includes the pilot subsymbols that compose the $1^{st}$ pilot cluster $L_P$ transmitted from the antenna, and the $(N_P-1)^{th}$ row $p_{cluster\_(N^{P-1})}^{(i)}$ of $P_{data\_secondary}^{(i)}$ includes the pilot subsymbols that compose the $(N_P-1)^{th}$ pilot cluster $L_P$ transmitted from the antenna. In an embodiment, the rows of each matrix $P_{data\_secondary}^{(i)}$ may be shifted up or down as long as they remain in a sequence $0-N_P-1$, and the same shift is applied to all of the matrices $P_{pilot\_primary}^{(0)}$, $P_{pilot\_secondary}^{(1)}$ and any other matrix(ces) $P_{data\_secondary}^{(i)}$.

Still referring to FIG. 14, the operation of the transmitter 44 is described according to an embodiment.

In a primary mode while the detector 104 is not detecting a transmission from a transmitter that has a higher priority, the transmitter 44 generates and transmits a primary OFDM signal such as the primary OFDM signal 53 of FIG. 11A. The pilot generator 106 generates a primary pilot-symbol pattern $P_{pilot\_primary}^{(0)}$, and the pilot-subcarrier-coefficient generator 110 modulates the pilot subcarriers of each primary OFDM symbol with $P_{pilot\_primary}^{(0)}$. Furthermore, the data generator 108 generates primary data-symbol patterns, and the mode switch 114 couples the primary data-symbol patterns to the data-subcarrier-coefficient generator 112, which modulates the data subcarriers of each primary OFDM symbol with a respective one of the primary data-symbol patterns. The IFFT 116 converts the modulated pilot and data subcarriers from the coefficient generators 110 and 112 into a time-domain digital signal, the DAC 118 converts this time-domain digital signal into a time-domain analog signal, and the modulator-driver 120 modulates a carrier signal (e.g., 5.4 GHz) with the time-domain analog signal and drives the antenna 48 with the modulated carrier signal for transmission.

In a secondary mode while the detector 104 is detecting a transmission from a transmitter that has a higher priority, the transmitter 44 generates and transmits a secondary OFDM signal such as the secondary OFDM signal 55 of FIG. 11B. The pilot generator 106 generates a secondary pilot-symbol pattern $P_{pilot\_secondary}^{(1)}$, the data generator 108 generates secondary data-symbol patterns $P_{data\_secondary}$, and the mode switch 114 routes $P_{data\_secondary}$ to the pilot-subcarrier-coefficient generator 110, which modulates the pilot subcarriers of each secondary OFDM symbol with both $P_{pilot\_secondary}^{(1)}$ and a respective $P_{data\_secondary}$. The IFFT unit 116 converts the modulated pilot subcarriers—the data subcarriers have zero energy—from the coefficient generator 110 into a time-domain digital signal, the DAC 118 converts this time-domain digital signal into a time-domain analog signal, and the modulator-driver 120 modulates a carrier signal (e.g., 5.4 GHz) with the time-domain analog signal and drives the antenna 48 with the modulated carrier signal for transmission. And as discussed above, the IFFT unit 116 may increase the power of the pilot subcarriers relative to the power of the pilot subcarriers of the primary OFDM signal that the transmitter 44 generates while operating as a primary transmitter such that the total power of the secondary OFDM signal is approximately the same as the total power of the primary OFDM signal being transmitted by the higher-priority transmitter.

Still referring to FIG. 14, alternate embodiments of the primary-secondary transmitter 44 are contemplated. For example, there may be more than two transmitters simultaneously transmitting in secondary mode. In such a scenario, the secondary transmitters "share" the available index values for i. Suppose there are two secondary transmitters, and that $\lfloor N_P/Z \rfloor = 4$. The primary transmitter uses $P_{pilot\_primary}$ (i=0), the first secondary transmitter uses $P_{pilot\_secondary}$ (i=1) and $P_{data\_secondary}^{(2)}$ (i=2), and the second secondary transmitter uses $P_{pilot\_secondary}^{(3)}$ (i=3) and $P_{data\_secondary}$ (i=4). Therefore, one can see that $\lfloor N_P/Z \rfloor$ effectively sets a limit as to how many secondary transmitters can simultaneously transmit secondary OFDM signals. In such an embodiment, the transmission detector 104 may also detect the number of transmitters transmitting in secondary mode, and indicate whether, based on the value $\lfloor N_P/Z \rfloor$, the transmitter 44 is able to simultaneously transmit in secondary mode. If the transmitter 44 has a higher priority than another transmitter that is transmitting, then the transmitter 44 may broadcast a signal that indicates that the transmitter 44 has priority to transmit, and that causes the other transmitter to cease transmitting so as to allow the transmitter 44 to transmit.

In addition, referring to FIGS. 13 and 14, although $P_{pilot\_primary}^{(i)}$, $P_{pilot\_secondary}^{(1)}$, and $P_{data\_secondary}^{(i)}$ are described as being symbol patterns for APPC pilot clusters (FIG. 8), one may modify one or more of these symbol patterns for use with FDKD pilot clusters (FIG. 7), and may, accordingly, modify one or more of equations (3)-(23), in accordance with known principles. Furthermore, the primary transmitter 44 of FIG. 13 may be omitted from the transmitter-receiver systems 40 (FIG. 10) and 70 (FIG. 12) so that the hierarchy of the transmitters may be periodically changed so that one transmitter is not always the primary transmitter. In addition, one may use the above-described principles to modulate the data clusters with multiple data-symbol patterns to increase the data rate of a transmitter 44.

Before describing in more detail the primary and secondary receivers 46 of FIGS. 10 and 12, a model of the channels between the transmitters 44 and receivers of FIGS. 10 and 12 within the shared channel space 42 is described below in conjunction with FIGS. 15 and 16 according to an embodiment.

Figure 15:
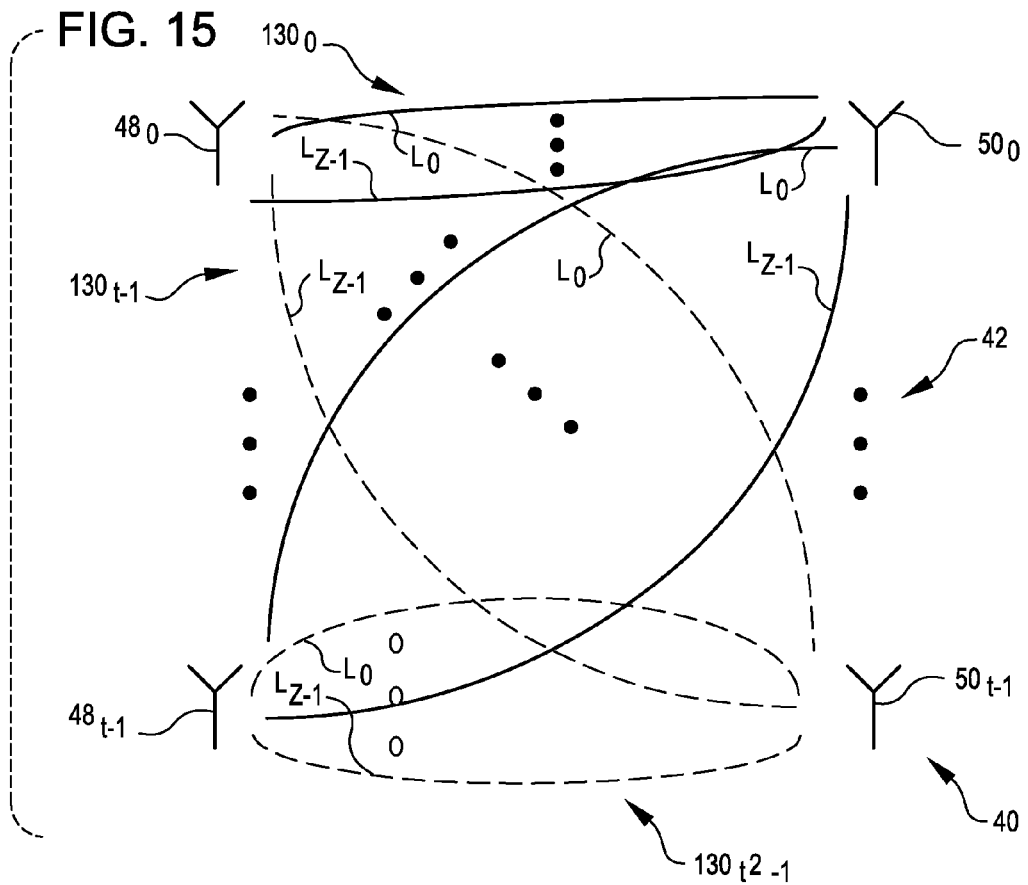
FIG. 15 is a diagram of the communication channels between the transmitters and receivers of FIG. 10, and of the multiple paths that respectively form each of the channels, according to an embodiment.

FIG. 15 is a diagram of the t transmitters 44 and the t receivers 46 of FIG. 10, and of the shared channel space 42 between the transmitters and receivers; the diagram is simplified to include only the antennas 48 and 50 of the transmitters and receivers, respectively. Furthermore, only the configuration and operation of the transmitter-receiver system 40 where the transmitters 44 transmit signals and the receivers 46 receive signals is discussed, it being understood that the configuration and operation of the system where a device including a transmitter 44 receives a signal and a device including a receiver 46 transmits a signal may be similar. In addition, one or more of the transmitters 44 and one or more of the receivers 46 may be moving relative to one another such that a signal propagating between a transmitter and receiver pair may experience Doppler Spread.

As discussed above in conjunction with FIGS. 10, 13, and 14, each transmitter 44 transmits a respective OFDM signal carrying respective OFDM symbols via a respective antenna 48.

Therefore, in the described configuration, the system 40 forms $t^2$ multipath transmit channels $130_0\text{-}130_{t-1}^2$ between the respective transmit antennas $48_0\text{-}48_{t-1}$ and the corresponding receive antennas $50_0\text{-}50_{t-1}$. That is, the system 40 includes a respective channel 130 between each transmit antenna $48_0$-$48_{t-1}$ and the corresponding receive antenna $50_0$-$50_{t-1}$. Furthermore, in an embodiment of the system 40, a designer may assume that each channel 130 has the same number Z of paths L.

Because the channels 130 each include different paths L, the channels may be said to be spatially different or diverse. As described above and as evident from the equations described below in conjunction with FIGS. 17-23, even though the transmitters 44 may transmit t primary and secondary OFDM signals using the same N subcarriers, the spatial diversity of the channels 130, and the orthogonality between the primary pilot symbols, secondary pilot symbols, and secondary data symbols, may allow each receiver 46 to recover the data from the OFDM signal transmitted by a corresponding transmitter 44 with an error rate that may be suitable for many applications, including mobile applications where Doppler Spread may be present.

Figure 16:
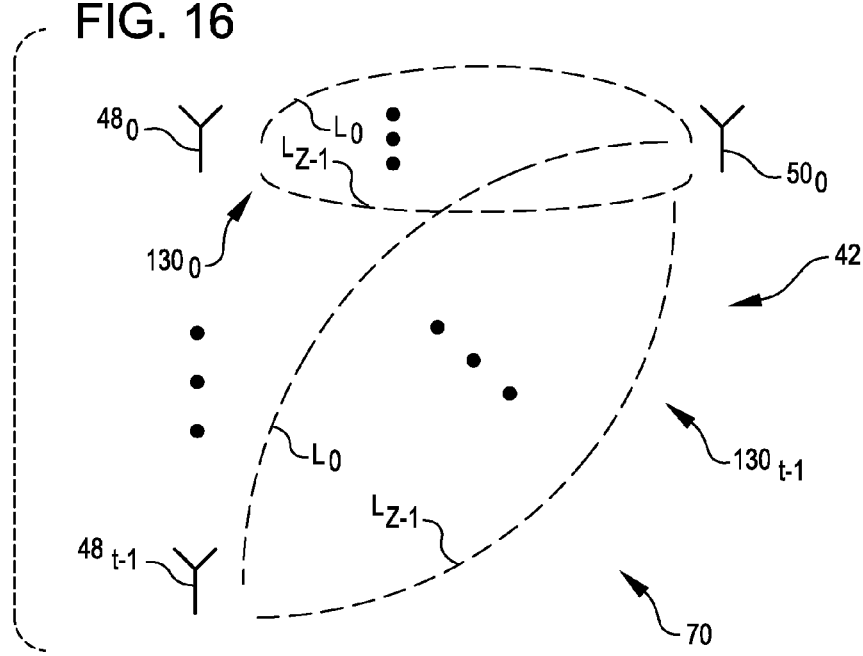
FIG. 16 is a diagram of the communication channels between the transmitters and receiver of FIG. 12, and of the multiple paths that respectively form each of the channels, according to an embodiment.

FIG. 16 is a diagram of the transmitter-receiver system 70 of FIG. 12, in which the number of receivers 46 (here only one receiver 46) is less than t, and in which the number of channels 130 is less than $t^2$. For example, where the system 70 includes only one receiver 46, then the system includes t channels $130_1$-$130_{t-1}$.

The operations of the receivers 46 of FIGS. 10 and 12 in primary and secondary modes are described below in conjunction with FIGS. 17-23. For example purposes, it is assumed that, unless otherwise noted, the system 40 of FIG. 10 includes a primary transmitter $44_0$ and one secondary transmitter $44_1$, includes a primary receiver $46_0$ for recovering data from a primary OFDM signal transmitted by the primary transmitter, and includes one secondary receiver $46_1$ for recovering data from a secondary OFDM signal transmitted by the secondary transmitter. Consequently, it is assumed that, unless otherwise noted, there are the following four channels in the channel space 42: a primary-primary (p, p) channel $130_0$ between the primary transmitter $44_0$ and primary receiver $46_0$, a primary-secondary (p, s) channel $130_1$ between the primary transmitter and the secondary receiver $46_1$, a secondary-primary (s, p) channel $130_2$ between the secondary transmitter $44_1$ and the primary receiver, and a secondary-secondary (s, s) channel between the secondary transmitter and the secondary receiver.

Before describing the primary and secondary receivers $46_0$ and $46_1$, some channel-estimation-related quantities, other quantities, and the mathematical relationships between some of these quantities, are described. All of the quantities and relationships described below assume that: (1) APPC pilot clusters $L_P$ (FIG. 8) are used unless otherwise noted (embodiments of primary and second receivers $46_0$ and $46_1$ that are compatible with FDKD pilot clusters (FIG. 7) are discussed below in conjunction with FIGS. 21 and 23); (2) the pilot clusters $L_P$ and the data clusters $L_D$ in each primary and secondary OFDM signal from a respective transmitter are in the same relative positions (i.e., include the same subcarriers); and (3) each of the four channels $130_0$-$130_3$ includes, or is assumed to include, the same number Z of paths L. Furthermore, these quantities, the relationships between these quantities, and related concepts are described in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011, which are incorporated by reference.

$$h_l^{(a,b)} = [h_l^{(a,b)}(\underline{s}), \ldots, h_l^{(a,b)}(\underline{s}+N-1)]^T \quad (24)$$

where $h_l^{(a,b)}$ is a column vector that represents the time-domain response of the path $0 \leq l \leq Z$ of the (a, b) channel during an OFDM symbol period, $\underline{s}$ is the first sample time after the cyclic prefix in the OFDM symbol (if there is a cyclic prefix), and N is the number of subcarriers k (both pilot and data subcarriers) in the OFDM signal transmitted by the transmit antenna 48 for the (a, b) channel. For example, if N=128 and the cyclic prefix has four samples, then the OFDM signal transmitted by the transmit antenna 48 for the (a, b) channel has a total of 128+4=132 samples, and $h_l^{(a,b)}$ includes one hundred twenty eight complex elements corresponding to the time-domain samples taken by the receiver.

In at least some applications, the elements of $h_l^{(a,b)}$ may be approximated as fitting a curve such as a straight line. Therefore, the elements of $h_l^{(a,b)}$ may be represented in terms of a polynomial that describes the curve. For example, where the curve is a straight line, which one may represent with the linear equation y=mx+b where m is the slope of the line and b is the y-axis intercept, $h_l^{(a,b)}$ may be similarly represented in terms of an offset and slope according to the following equation:

$$h_l^{(a,b)} = B\overline{h}_l^{(a,b)} \quad (25)$$

where B is a binomial expansion matrix having elements (m, n) arranged in Q columns such that $B(m,n)=m^n$ (m is the row number and n is the column number), and $\overline{h}_l^{(a,b)}$ is a scaling column vector having Q rows/elements; consequently, where the fitting curve is a straight line, $$B = \begin{bmatrix} 1 & 0 \\ \vdots & \vdots \\ 1 & N-1 \end{bmatrix} \text{ and } \overline{h}_l^{(a,b)}$$

is a column vector with Q=2 elements that respectively represent offset and slope. Because typically Q<<N, $\overline{h}_l^{(a,b)}$ is typically much smaller (e.g., has many fewer elements), and is thus typically easier to manipulate, than $h_l^{(a,b)}$.

A concatenation vector $\hat{h}^{(a,b)}$ of all Z scaling column vectors $\overline{h}_l^{(a,b)}$ for a channel (a, b) is given by the following equation:

$$\hat{h}^{(a,b)} = [\overline{h}_0^{(a,b)T}, \ldots, \overline{h}_{Z-1}^{(a,b)T}]^T \quad (26)$$

A channel-independent $N_P \times 1$ column vector $P_p^a$, which a receiver 46 may determine or store ahead of time, is given by the following equation:

$$P_p^a = [P_b + a, P_b + P_{sep} + a, \ldots, P_b + (N_p-1)P_{sep} + a]^T \quad (27)$$

where, as discussed above in conjunction with FIGS. 7-8, $P_b$ is the relative center pilot subcarrier of each pilot cluster $L_P$ (and, therefore, is the center pilot subcarrier of the zeroth pilot cluster $L_P$), $P_{sep}$ is the pilot-cluster separation, and $N_P$ is the number of pilot clusters in a primary OFDM signal and in a secondary OFDM signal. For example, if a signal has $N_P$=3 pilot clusters of $L_{PN}$=5 pilot subcarriers each, $P_b$=2, and $P_{sep}$=8, then $P_p^{-2}$=[0, 8, 16], $P_p^{-1}$=[1, 9, 17], $P_p^0$=[2, 10, 18], $P_p^{+1}$=[3, 11, 19], and $P_p^{+2}$=[4, 12, 20].

A channel-independent $(2B_c+1)N_P \times 1$ master-pilot-subcarrier-index column vector $P_{master\_pilot}$, which a receiver 46 may determine or store ahead of time, is given by the following equation:

$$P_{master\_pilot} = [P_p^{(-B_c)T} P_p^{(-B+1)T} \ldots P_p^{(+B_c)T}]^T \quad (28)$$

A channel-independent matrix Q (not to be confused with the value Q described above) having the same dimensions $N_P \times L_{PN}$ as $P_{primary\_pilot}^{(i)}$, $P_{secondary\_pilot}^{(i)}$, and $P_{secondary\_data}^{(i)}$, and which a receiver 46 may determine or store ahead of time, is given by the following equation:

$$Q = \begin{bmatrix} P_b - w_p & \cdots & P_b + w_p \\ & \vdots & \\ P_b + P_{sep}(N_p - 1) - w_p & \cdots & P_b + P_{sep}(N_p - 1) + w_p \end{bmatrix} \quad (29)$$

That is, the matrix Q includes the subcarrier indices k for the pilot subcarriers corresponding to the pilot clusters in $P_{primary\_pilot}^{(i)}$, $P_{secondary\_pilot}^{(i)}$, and $P_{secondary\_data}^{(i)}$. For example, if a transmitted signal has $N_P=3$ pilot clusters of $L_{PN}=5$ pilot subcarriers each, $P_b=2$, and $P_{sep}=8$, then $$Q = \begin{bmatrix} 0 & 1 & 2 & 3 & 4 \\ 8 & 9 & 10 & 11 & 12 \\ 16 & 17 & 18 & 19 & 20 \end{bmatrix}.$$

A channel-independent (assuming all pilot clusters are in the same relative positions in all of the transmitted primary and secondary OFDM signals) column vector $p_Q$ having dimensions $N_P L_{PN} \times 1$, and which a receiver 46 may determine or store ahead of time, is given by the following equation:

$$p_Q = [k_{P_b - w_p} \cdots k_{P_b + P_{sep}(N_p - 1) + w_p}]^T \quad (30)$$

That is, $p_Q$ includes the subcarrier indices k of all pilot subcarriers in an OFDM symbol; or, viewed another way, $p_Q$ includes the rows of the matrix Q transposed and "stacked" end to end.

A generic pilot-symbol-pattern matrix $P_{pat}^{(i)}$ equals $P_{primary\_pilot}^{(i)}$ for a primary receiver 46, and equals $P_{secondary\_pilot}^{(i)}$ for a secondary receiver 46. That is, the value of the index i indicates to which pilot pattern $P_{pat}^{(i)}$ is equal in the following equations and relations in which $P_{pat}^{(i)}$ appears.

Channel-dependent $2N_P \times L_{PN}$ matrices $\underline{\theta}_l^{(i)}$, which a receiver 46 may determine or store ahead of time, are given by the following equation:

$$\underline{\theta}_l^{(i)} = \begin{bmatrix} e^{-j2\pi Q \Delta f l} \\ e^{-j2\pi Q \Delta f l} \end{bmatrix} \odot \begin{bmatrix} P_{pat}^{(i)} \\ P_{pat}^{(i)} \end{bmatrix} \quad (31)$$

where $$\Delta f = \frac{1}{N}$$

and the "$\odot$" operator indicates that each e term is formed using a respective element of the matrix Q, each formed e term is multiplied by a corresponding element of the matrix $P_{pat}^{(i)}$, and this procedure is repeated for all $N_P \times L_{PN}$ elements of Q and $P_{pat}^{(i)}$, resulting in another $N_P \times L_{PN}$ matrix. For example the $(m,n)^{th}$ element of $e^{-j2\pi Q \Delta f l}$ is $e^{-j2\pi Q(m,n) \Delta f l}$. Then, this resulting matrix is effectively "stacked" on itself to obtain the $2N_P \times L_{PN}$ matrix $\underline{\theta}_l^{(i)}$.

Channel- and path-dependent $N_P \times L_{PN}$ matrices $R_l^{(m,i)}$, which a receiver 46 may determine or store ahead of time, are given by the following equation for $0 \le m \le N_P - 1$:

$$R_l^{(m,i)} = \underline{\theta}_l^{(i)}(m \to m + N_P 1; :) \quad (32)$$

where "m→m+Np-1" are the rows of $\underline{\hat{\theta}}_l^{(i)}$ used to populate $R_l^{(m,i)}$, and ":" indicates that all columns of these rows of $\underline{\theta}_l^{(i)}$ are used to populate $R_l^{(m,i)}$.

Channel- and path-dependent $N_P \times N_P L_{PN}$ matrices $\theta_l^{(i)}$ (note there is no underlining beneath "θ", this lack of underlining distinguishing this matrix from the matrix $\underline{\theta}_l^{(i)}$ of equation (31)), which a receiver 46 may determine and/or store ahead of time, are given by the following equation:

$$\theta_l^{(i)} = [R_l^{(0,i)} R_l^{(1,i)} \cdots R_l^{(N_p - 1, i)}] \quad (33)$$

j channel-independent $N_P L_{PN} \times N$ matrices $W^{(j)}$, which a receiver 46 may calculate or store dynamically or ahead of time, are given by the following equation for $-B_c \le j \le +B_c$:

$$W^{(j)} = \frac{1}{N} \begin{bmatrix} F^H(\langle N + (p_Q(0) - P_b - j)\rangle, :) \\ F^H(\langle N + (p_Q(1) - P_b - j)\rangle, :) \\ \vdots \\ F^H(\langle N + (p_Q(N_p L_{PN} - 1) - P_b - j)\rangle, :) \end{bmatrix} \quad (34)$$

where F is the known Fourier matrix, the "$\langle \ \rangle$" operator indicates a modulo N operation, $p_Q(n)$ is the $n^{th}$ element of the vector $p_Q$ (equation (30)), $P_b$ is the index of the relative center pilot subcarrier of each pilot cluster $L_P$ (and the center pilot subcarrier of the zeroth pilot cluster), and ":" indicates all columns of the matrix $F^H$ in the indicated rows. Note that the number of rows in each $W^{(j)}$ matrix is equal to the number $N_p L_{PN}$ of pilot subcarriers in each transmitted primary and secondary OFDM signal.

A receive-antenna-dependent column vector $\bar{y}^{(r)}$ is given by the following equation:

$$\bar{y}^{(r)} = y^r(P_{master\_pilot}) \quad (35)$$

where $y^r$ is the signal received by the $r^{th}$ receiver 46, and "$(P_{master\_pilot})$" (equation (28)) indicates which elements of $y^r$ form $\bar{y}^{(r)}$. For example, if the receiver 46 is the primary receiver, then r=p, and, if there are $N_P=2$ pilot clusters with $L_{PN}=5$ pilot subcarriers and three ($B_c=1$) non-guard pilot subcarriers located at subcarriers k=0 (guard), k=1, k=2, k=3, k=4 (guard), and k=8 (guard), k=9, k=10, k=11, k=12 (guard), then $\bar{y}^{(r)}$ would include the following pilot subcarriers of $y^r$ in the listed order: k=1, k=9, k=2, k=10, k=3, k=11.

Pilot-symbol-pattern- and path-dependent $N_P \times (2B_c+1)$ row vectors $q_l^{(i)H}$, which a receiver 46 may calculate or store dynamically or ahead of time, are given by the following equation:

$$q_l^{(i)H} = [f^{(iZ+1)H} \cdots f^{(iZ+I)H}] \quad (36)$$

where $f^{(iZ+I)H}$ is a $N_P \times 1$ row vector that is repeated $2B_c+1$ times to form $q_l^{(i)H}$. An example of $f^{(iZ+I)}$ is described above in equation (17) with "iZ" replacing "$L_{PN}Z$", and "I" replacing "u". These values of $q_l^{(i)H}$ are suitable for applications where the pilot-symbol-pattern matrices $P_{pilot\_primary}^{(i)}$ and $P_{pilot\_secondary}^{(i)}$ are based on $f^{(iZ)}$ per, e.g., equations (4), (6), (7), and (15) above; but the values of $q_l^{(i)H}$ may be modified according to known principles if the pilot-symbol-pattern matrices are based on a different function such as $f^{(iL_{PN}Z+u)}$ of equation (11) above.

Pilot-symbol-pattern- and path-dependent matrices $\phi_l^{(i)}$, which a receiver 46 may determine or store ahead of time, are given by the following equation:

$$\phi_l^{(i)} = \begin{bmatrix} \theta_l^{(i)} & 0 & \cdots & 0 \\ 0 & \theta_l^{(i)} & \cdots & 0 \\ \vdots & \vdots & \ddots & \vdots \\ 0 & 0 & \cdots & \theta_l^{(i)} \end{bmatrix} \begin{bmatrix} W^{(-B_c)} B \\ \vdots \\ W^{(+B_c)} B \end{bmatrix} \quad (37)$$

Therefore, one can determine $\bar{y}^{(a,b)}$ according to the following equation:

$$\bar{y}^{(a,b)} = [\phi_0^{(i)} \phi_1^{(i)} \cdots \phi_{Z-1}^{(i)}] \hat{h}^{(a,b)} \quad (38)$$

where $\bar{y}^{(a,b)}$ represents the signal from transmitter a to receiver b at the pilot subcarriers only (as given by ($P_{master\_pilot}$) per equation (35) above), and $\hat{h}^{(a,b)}$ is given above by equation (26). For example, $\bar{y}^{(p,p)}$ represents the signal from the primary transmitter $44_0$ to the primary receiver $46_0$ at the pilot subcarriers only (as given by ($P_{master\_pilot}$)), $\bar{y}^{(p,s)}$ represents the signal from the primary transmitter $44_0$ to the secondary receiver $46_1$ at the pilot subcarriers only (as given by ($P_{master\_pilot}$)), $\bar{y}^{(s,p)}$ represents the signal from the secondary transmitter $44_1$ to the primary receiver $46_0$ at the pilot subcarriers only (as given by ($P_{master\_pilot}$)), and $\bar{y}^{(s,s)}$ represents the signal from the secondary transmitter $44_1$ to the secondary receiver $46_0$ at the pilot subcarriers only (as given by ($P_{master\_pilot}$)).

Figure 17:
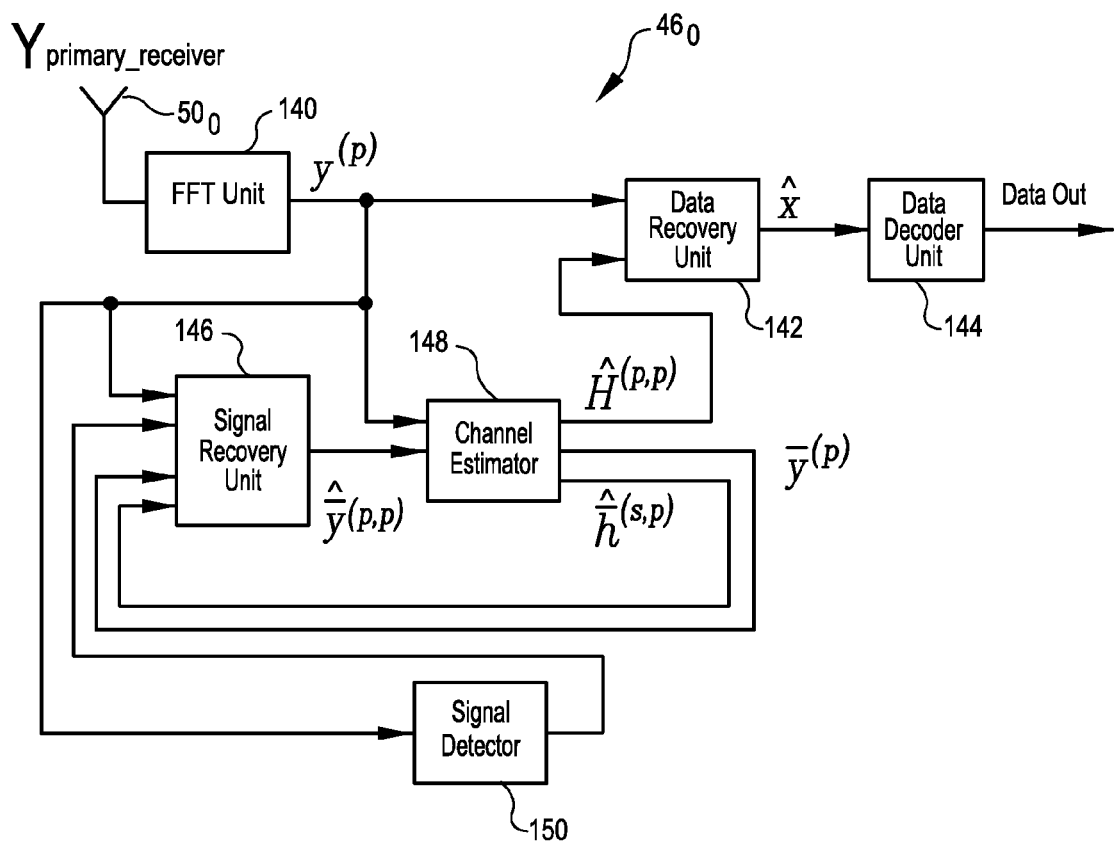
FIG. 17 is a diagram of a higher-priority receiver that may receive, and recover data from, a primary OFDM signal according to an embodiment.

FIG. 17 is a diagram of the primary receiver $46_0$ of FIG. 10 according to an embodiment, and according to the above-described example where there the transmitter-receiver system 40 includes a primary transmitter $44_0$ for transmitting a primary OFDM signal, a secondary transmitter $44_1$ for transmitting a secondary OFDM signal, the primary receiver $46_0$ for recovering data from the primary OFDM signal, and a secondary receiver $46_1$ for recovering data from the secondary OFDM signal.

The primary receiver $46_0$ includes an FFT unit 140, a data-recovery unit 142, a data-decoder unit 144, a signal-recovery unit 146, a channel estimator 148, and a signal detector 150.

The FFT unit 140 generates a frequency-domain received-signal column vector $y^{(p)}$, and may be similar to the FFT unit 34 described above in conjunction with FIG. 9.

The data-recovery unit 142 recovers data symbols $\hat{x}$ from the data subcarriers of the primary OFDM signal $y^{(p,p)}$, and may be similar to the data-recovery unit 38 described above in conjunction with FIG. 9.

The data-decoder unit 144 decodes the data $\hat{x}$ recovered by the data-recovery unit 142, and may be similar to the data-decoder unit 40 described above in conjunction with FIG. 9.

The signal-recovery unit 146 recovers the modulated pilot subcarriers $\bar{y}^{(p,p)}$ of the primary OFDM signal during simultaneous-transmission periods while both the primary and secondary transmitters $44_0$ and $44_1$ (FIG. 10) are respectively transmitting the primary and secondary OFDM signals.

The channel estimator 148 estimates the channel $130_0$ (FIG. 10) between the primary transmitter $44_0$ and the primary receiver $46_0$ (FIG. 10) in response to the modulated pilot subcarriers of the received signal $y^{(p)}$ during a mono-transmission period while only the primary transmitter $44_0$ is transmitting. But during a simultaneous-transmission period while both the primary and secondary transmitters $44_0$ and $44_1$ are transmitting, the channel estimator 148 generates $\bar{y}^{(p)}$ per equation (35) above, and estimates, per equation (25) above, a concatenation vector $\hat{h}^{(s,p)}$ that characterizes the channel $130_2$ between the secondary transmitter and the primary receiver $46_0$, in response to VP), and estimates the channel $130_0$ between the primary transmitter and the primary receiver in response to the modulated primary pilot subcarriers $\bar{y}^{(p,p)}$ recovered by the signal-recovery unit 146.

The signal detector 150 detects, in response to VP), whether both the primary and secondary transmitters $44_0$ and $44_1$ are transmitting. If the detector 150 detects that both the primary and secondary transmitters $44_0$ and $44_1$ are transmitting (i.e., a simultaneous-transmission period), then the detector activates the signal-recovery unit 146 to recover the primary pilot subcarriers $\bar{y}^{(p,p)}$. But if the detector 150 does not detect that both the primary and secondary transmitters $44_0$ and $44_1$ are transmitting (i.e., a mono-transmission, or a no-transmission period), then the detector deactivates the signal-recovery unit 146 such that the primary receiver $46_0$ may operate in a conventional manner to recover the data from the data subcarriers of the primary OFDM signal.

Figure 18:
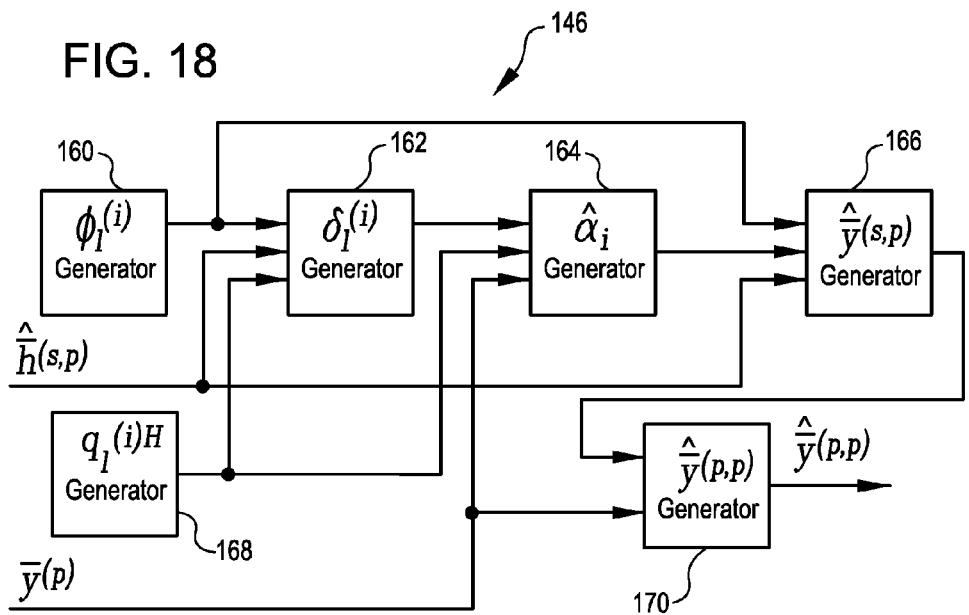
FIG. 18 is a diagram of the signal-recovery unit of the higher-priority receiver of FIG. 17 according to an embodiment.

FIG. 18 is a diagram of the signal-recovery unit 146 of FIG. 17 according to an embodiment. The time-domain signal $y_{primary\_receiver}$ that the primary receiver $46_0$ receives at the antenna $50_0$ (FIG. 17) is a combination of the primary and secondary OFDM signals transmitted by the primary and secondary receivers $44_0$ and $44_1$ (FIG. 10), respectively. Because the primary OFDM signal carries data on its data subcarriers, and because the secondary pilot-symbol-pattern $P_{pilot\_secondary}^{(1)}$ is an APPC pilot-symbol pattern as discussed above in conjunction with FIG. 8, the primary receiver $46_0$ effectively recovers the pilot subcarriers of the primary OFDM signal from the combination of these pilot subcarriers and the pilot subcarriers of the secondary OFDM signal so that the primary receiver can use the recovered primary pilot subcarriers to estimate the channel $130_0$ (FIG. 10) between the primary transmitter $44_0$ and primary receiver, and, ultimately, to recover the data from the primary data subcarriers in response to the estimated channel. The primary receiver $46_0$ performs this recovery because the guard subcarriers of the secondary pilot clusters may interfere with the data subcarriers of the primary OFDM signal, and so the primary pilot subcarriers $\bar{y}^{(p,p)}$ are recovered in a manner that takes such potential interference into account. As discussed below, the primary receiver $46_0$ recovers the pilot subcarriers of the primary OFDM signal by determining the contribution $\bar{y}^{(s,p)}$ of the secondary pilot subcarriers to $\bar{y}^{(p)}$, and then effectively subtracting this contribution from $\bar{y}^{(s,p)}$ to yield the primary pilot subcarriers $\bar{y}^{(p,p)}$.

The signal-recovery unit 146 includes a generator 160 for generating $\varnothing_l^{(i)}$ per equation (37) above, a generator 162 for generating quantities $\delta_l^{(i)}$, a generator 164 for generating $\alpha_l$ per equation (21) above, a generator 166 for generating a vector $\hat{h}^{(s,p)}$ (as discussed above, the "^" indicates that the quantity is an estimate) a generator 168 for generating $q_l^{(i)H}$ per equation (36) above, and a generator 170 for generating a vector $\hat{h}^{(p,p)}$. The signal-recovery unit 146 may also include a memory (not shown in FIG. 18) for storing values for quantities (e.g., scalars, vectors, matrices) that are calculated dynamically or ahead of time as discussed above; alternatively, the memory may be located elsewhere in the primary receiver $46_0$.

Referring to FIGS. 17 and 18, the operation of the primary receiver $46_0$ is described according to an embodiment. For example purposes, it is assumed that the pilot-symbol-pattern matrix used by the primary transmitter $44_0$ is $P_{pilot\_primary}^{(0)}$, the pilot-symbol-pattern matrix used by the secondary transmitter $44_1$ is $P_{pilot\_secondary}^{(0)}$, and the primary receiver $46_0$ "knows" that the primary and secondary transmitters $44_0$ and $44_1$ respectively use $P_{pilot\_primary}^{(0)}$ and $P_{pilot\_secondary}$. Furthermore, it is assumed that the secondary transmitter $44_1$ uses all values $2 \le i \le$ $$\left\lfloor \frac{N_P}{Z} \right\rfloor$$

to generate the data-symbol-patterns $P_{data\_secondary}^{(i)}$.

During a mono-transmission period while only the primary transmitter $44_0$ (FIG. 10) is transmitting a primary OFDM signal, the signal detector 150 disables the signal-recovery unit 146.

Consequently, the FFT unit 140 may conventionally generate $y^{(p)} = y^{(p,p)} + n^{(p)}$, where $n^{(p)}$ is noise generated by the primary receiver $46_0$, not by the channel $130_0$ (FIG. 15)–$y^{(p)}=$ $y^{(p,p)}+n^{(p)}$ because there is no secondary OFDM signal being received by the primary receiver. And, in response to $y^{(p,p)}$, the channel estimator 148 may conventionally generate a channel-estimation matrix $\hat{H}^{(p,p)}$ for the primary channel 130$_0$ between the primary transmitter 44$_0$ (FIG. 10) and the primary receiver 46$_0$—the channel estimator may account for the noise $n^{(p)}$ in a conventional manner, or may ignore it. For example, the channel estimator 148 may operate in a manner similar to the VSSO Kalman MIMO-OFDM channel estimator described in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011, which are incorporated by reference.

The data-recovery unit 142 may conventionally recover the data symbols $\hat{x}$ from the data subcarriers of the primary OFDM signal in response to $\hat{H}^{(p,p)}$, and the data-decoder unit 144 may conventionally decode the recovered data symbols $\hat{x}$.

Still referring to FIGS. 17 and 18, during a simultaneous-transmission period while both the primary transmitter 44$_0$ (FIG. 10) and the secondary transmitter 44$_1$ (FIG. 10) are respectively transmitting primary and secondary OFDM signals, the signal detector 150 enables the signal-recovery unit 146.

Consequently, the FFT unit 140 may conventionally generate $y^{(p)}=y^{(p,p)}+y^{(s,p)}+n^{(p)}$ and, in response to $y^{(s,p)}$, the channel estimator 148 may conventionally generate a concatenation vector $\hat{h}^{(s,p)}$ per equation (26) above, and may conventionally generate $\bar{y}^{(p)}$ per equation (35) above. In an embodiment, the channel estimator 148 may be able to generate $\hat{h}^{(s,p)}$ because the secondary pilot-symbol-pattern matrix $P_{pilot\_secondary}^{(1)}$ is orthogonal to the primary pilot pilot-symbol-pattern matrix pilot $P_{pilot\_primary}^{(1)}$ as discussed above in conjunction with FIG. 14. For example, the channel estimator 148 may generate $\hat{h}^{(s,p)}$ in a manner similar to the VSSO Kalman MIMO-OFDM channel estimator described in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011, which are incorporated by reference.

Next, in response to $y^{(p)}$, $\hat{h}^{(s,p)}$, and $\bar{y}^{(p)}$, the signal-recovery unit 146 generates $\hat{h}^{(p,p)}$ as further described below in conjunction with FIG. 18.

Then, in response to $\hat{h}^{(p,p)}$, the channel estimator 148 may conventionally generate the channel-estimation matrix $\hat{H}^{(p,p)}$ for the primary channel 130$_0$ (FIG. 15) between the primary transmitter 44$_0$ (FIG. 10) and the primary receiver 46$_0$ in a manner similar to that described above in conjunction with the mono-transmission period.

Next, the data-recovery unit 142 may conventionally recover the data symbols $\hat{x}$ from the data subcarriers of the primary OFDM signal in response to $y^{(p)}$ and $\hat{H}^{(p,p)}$, and the data-decoder unit 144 may conventionally decode the recovered data symbols.

Referring to FIG. 18, the operation of the signal-recovery unit 146 during a simultaneous-transmission period is described according to an embodiment.

First, the generator 160 generates $\emptyset_l^{(i)}$ for $1 \le i \le$ $$\left\lfloor \frac{N_P}{Z} \right\rfloor$$

and $0 \le l \le Z-1$ per equation (37) above.

Next, the generator 168 generates (or has previously stored) values for $q_l^{(i)H}$ for $1 \le i \le$ $$\left\lfloor \frac{N_P}{Z} \right\rfloor$$

per equation (36) above.

Then, in response to $\emptyset_l^{(i)}$ and $q_l^{(i)H}$ for $2 \le i \le$ $$\left\lfloor \frac{N_P}{Z} \right\rfloor$$

and $0 \le l \le Z-1$, and in response to $\hat{h}^{(s,p)}$, the generator 162 generates $\delta_l^{(i)}$ for $2 \le i \le$ $$\left\lfloor \frac{N_P}{Z} \right\rfloor$$

and $0 \le l \le Z-1$ according to the following equation:

$$\delta_l^{(i)} = q_l^{(i)H} \emptyset_l^{(i)} \hat{h}^{(s,p)}(lQ \rightarrow lQ+Q-1) \tag{39}$$

where ($lQ \rightarrow lQ+Q-1$) indicates entries from $lQ$ to $lQ+Q-1$ of $\hat{h}^{(s,p)}$.

Because $\bar{y}^{(p)}$ is the combination of $\bar{y}^{(p,p)}$ and $\bar{y}(s,p)$, ignoring receiver-induced noise (which may be negligible), the following equations are true:

$$\bar{y}^{(p)} = \bar{y}^{(p,p)} + \bar{y}^{(s,p)} \tag{40}$$

$$q_l^{(i)H} \bar{y}^{(p)} = q_l^{(i)H} \bar{y}^{(p,p)} + q_l^{(i)H} \bar{y}^{(s,p)} \tag{41}$$

But because $P_{pilot\_primary}^{(0)}$ is orthogonal to $P_{pilot\_secondary}^{(1)}$ and $P_{data\_secondary}^{(i)}$:

$$q_l^{(i)H} \bar{y}^{(p,p)} = 0 \tag{42}$$

for $1 \le i \le$ $$\left\lfloor \frac{N_P}{Z} \right\rfloor.$$

Consequently, equation (41) reduces to the following equation for $1 \le i \le$ $$\left\lfloor \frac{N_P}{Z} \right\rfloor:$$

$$q_l^{(i)H} \bar{y}^{(p)} = q_l^{(i)H} \bar{y}^{(s,p)} \tag{43}$$

And because $q_l^{(i)H}$ and $\bar{y}^{(p)}$ are known, $q_l^{(i)H} \bar{y}^{(s,p)}$ of equations (41) and (43) are also known for $1 \le i \le$ $$\left\lfloor \frac{N_P}{Z} \right\rfloor.$$

Next, the generator 164 generates $\hat{\alpha}_i$ for $2 \le i \le$ $$\left\lfloor \frac{N_P}{Z} \right\rfloor$$

according to the following equations:

$$\hat{X}_i = \text{Hard Decision of } \{\Sigma_{l=0}^{Z-1} \delta_l^{(i)*} q_l^{(i)H} \bar{y}^{(s,p)}\} \tag{44}$$

which may be written as follows per equations (41)-(43):

$$\hat{X}_i = \text{Hard Decision of } \{\Sigma_{l=0}^{Z-1} \delta_l^{(i)*} q_l^{(i)H} \bar{y}^{(p)}\} \tag{45}$$

where "*" indicates the complex conjugate of $\delta_l^{(i)}$. Furthermore,
(46)

$$\hat{\alpha}_i = \sqrt{\frac{(L_{PN} + L_{DN})Z}{L_{PN}(N_P - 2Z)}} \hat{X}_i \quad (46)$$

where $N_P$ is the number of pilot clusters in the primary and secondary OFDM signals, and $L_{PN}$ and $L_{DN}$ are, respectively, the number of pilot subcarriers in a pilot cluster and the number of data subcarriers in a data cluster.

Then, the generator 166 determines an estimate of $\overline{y}^{(s,p)}$ according to the following equation:
(47)

$$\hat{\overline{y}}^{(s,p)} = \left([\phi_0^{(1)} \cdots \phi_{Z-1}^{(1)}] + \sum_{i=2}^{\lfloor \frac{N_P}{Z} \rfloor} \hat{\alpha}_i [\phi_0^{(i)} \cdots \phi_{Z-1}^{(i)}]\right) \hat{\overline{h}}^{(s,p)} \quad (47)$$

Next, the generator 170 generates an estimate of $\overline{y}^{(p,p)}$ according to the following equation:

$$\overline{y}^{(p,p)} = \overline{y}^{(p)} - \hat{\overline{y}}^{(s,p)} \quad (48)$$

Referring to FIG. 17, as discussed above, the channel estimator 148 generates the channel-estimation matrix $\hat{H}^{(p,p)}$ in response to $\overline{y}^{(p,p)}$, and, in response to $\overline{H}^{(p,p)}$, the data-recovery unit 142 recovers the data $\hat{x}$ from the data subcarriers of the primary OFDM signal transmitted the primary transmitter 44₀ (FIG. 10)

Referring to FIGS. 17 and 18, alternate embodiments of the primary receiver 46₀ are contemplated. For example, the primary receiver 46₀ may also recover the data carried by the pilot subcarriers of the secondary OFDM signal transmitted by the secondary transmitter 44₁ from $\hat{X}_i$, which the signal-recovery unit 146 determines per equation (45) above. Furthermore, the primary receiver 46₀ may operate in a manner similar to that described above where there are multiple secondary transmitters 44 transmitting secondary OFDM signals during a simultaneous-transmission period. In addition, the order in which the generators 160, 162, 164, 166, 168, and 170 perform their respective operations may be different than described above. Moreover, because the elements of $\overline{y}^{(p)}$ are a subset of the elements of $\overline{y}^{(p)}$, then the signal-recovery unit 146 may derive the elements of $\overline{y}^{(p)}$ directly from the elements of $y^{(p)}$ instead of receiving $\overline{y}^{(p)}$ from the channel estimator 148. In addition, any components of the primary receiver 46₀ may be implemented in hardware, software, or a combination of hardware and software.

Figure 19:
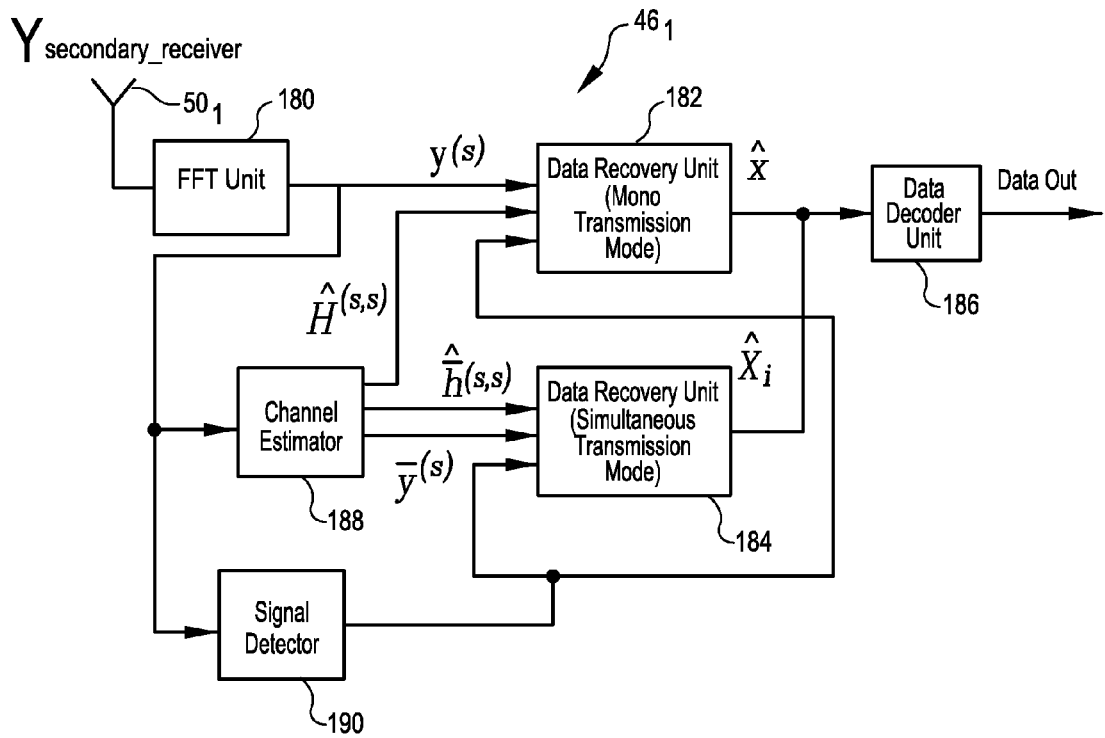
FIG. 19 is a diagram of a lower-priority receiver that may receive, and recover data from, a secondary OFDM signal according to an embodiment.

FIG. 19 is a diagram of the secondary receiver 46₁ of FIG. 10 according to an embodiment, and according to the above-described example where the transmitter-receiver system 40 (FIG. 10) includes a primary transmitter 44₀ for transmitting a primary OFDM signal, a secondary transmitter 44₁ for transmitting a secondary OFDM signal, a primary receiver 46₀ for recovering data from the primary OFDM signal, and the secondary receiver 46₁ for recovering data from the secondary OFDM signal.

The secondary receiver 46₁ includes an FFT unit 180, a mono-transmission-mode data-recovery unit 182, a simultaneous-transmission-mode data-recovery unit 184, a data-decoder unit 186, a channel estimator 188, and a signal detector 190.

The FFT unit 180 generates a frequency-domain received-signal column vector $y^{(s)}$, and may be similar to the FFT units 34 and 140 described above in conjunction with FIGS. 9 and 17, respectively.

The mono-transmission-mode data-recovery unit 182 recovers data $\hat{x}$ from the data subcarriers of the secondary OFDM signal $y^{(s,s)}$ while the secondary transmitter 44₁ (FIG. 10) is the only transmitter in the system 40 (FIG. 10) that is transmitting a signal. The mono-transmission-mode data-recovery unit 182 may be similar to the data-recovery units 38 and 142 described above in conjunction with FIGS. 9 and 17, respectively.

The simultaneous-transmission-mode data-recovery unit 184 recovers data $\hat{X}_i$ from the modulated pilot subcarriers $\overline{y}^{(s,s)}$ of the secondary OFDM signal during simultaneous-transmission periods while both the primary and secondary transmitters 44₀ and 44₁ (FIG. 10) are respectively transmitting the primary and secondary OFDM signals.

The data-decoder unit 186 decodes the data $\hat{x}$ and $\hat{X}_i$ recovered by the data-recovery units 182 and 184, respectively, and may be similar to the data-decoder units 40 and 144 described above in conjunction with FIGS. 9 and 17, respectively.

The channel estimator 188 generates the channel-estimation matrix $\hat{H}^{(s,s)}$ for the channel 130₃ (FIG. 15) between the secondary transmitter 44₁ (FIG. 10) and the secondary receiver 46₁ (FIG. 10) in response to the modulated pilot subcarriers of the received signal $y^{(s)}$ during a mono-transmission period while only the secondary transmitter 44₁ is transmitting. But during a simultaneous transmission period while both the primary and secondary transmitters 44₀ and 44₁ are transmitting, the channel estimator 188 generates $\overline{y}^{(s)}$ per equation (35) above, and estimates, per equation (25) above and in response to $y^{(s)}$, a concatenation vector $\overline{y}^{(s,s)}$ that characterizes the channel 130₃.

The signal detector 190 detects, in response to $y^{(s)}$, whether both the primary and secondary transmitters 44₀ and 44₁ are transmitting. If the detector 190 detects that both the primary and secondary transmitters 44₀ and 44₁ are transmitting (i.e., a simultaneous-transmission period), then the detector activates the data-recovery unit 184 to recover the data $\hat{X}_i$ from the secondary pilot subcarriers $\overline{y}^{(s,s)}$. But if the detector 150 does not detect that both the primary and secondary transmitters 44₀ and 44₁ are transmitting (i.e., a mono-transmission, or a no-transmission period), then the detector deactivates the data-recovery unit 184 and activates the data-recovery unit 182, which may operate in a conventional manner to recover the data from the data subcarriers of the secondary OFDM signal.

Figure 20:
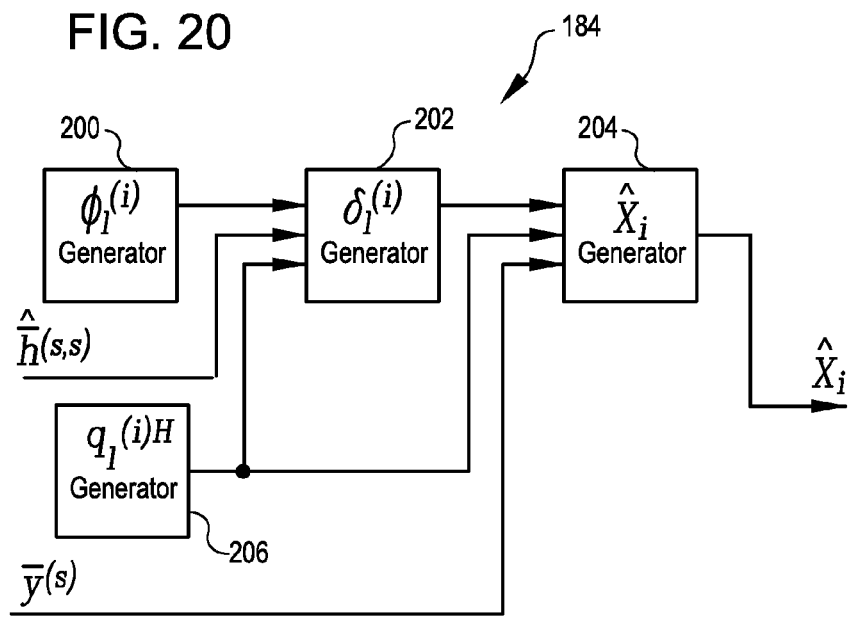
FIG. 20 is a diagram of the simultaneous-transmission-mode data-recovery unit of the receiver of FIG. 19 according to an embodiment.

FIG. 20 is a diagram of the simultaneous-transmission-mode data-recovery unit 184 of FIG. 19 according to an embodiment. The time-domain signal $y_{secondary\_receiver}$ that the secondary receiver 46₁ receives at the antenna 50₁ (FIG. 19) is a combination of the primary and secondary OFDM signals transmitted by the primary and secondary receivers 44₀ and 44₁ (FIG. 10), respectively, during a simultaneous-transmission period. Because the secondary OFDM signal carries data on its pilot subcarriers, the data-recovery unit 184 recovers the data $\hat{X}_i$ from the secondary pilot subcarriers in response to the estimated concatenation vector $\overline{y}^{(s,s)}$, which characterizes the channel 130₃ (FIG. 15) between the secondary transmitter and the secondary receiver 46₁.

The data-recovery unit 184 includes a generator 200 for generating matrices $\emptyset_l^{(i)}$ per equation (37) above, a generator 202 for generating quantities $\delta_l^{(i)}$, a generator 204 for generating the data symbols $\hat{X}_i$, and a generator 206 for generating vectors $q_l^{(i)H}$ equation (36) above. The data-recovery unit 184 may also include a memory (not shown in FIG. 20) for storing values for quantities that are calculated dynamically or ahead of time as discussed above; alternatively, the memory may be located elsewhere in the secondary receiver $46_1$.

Referring to FIGS. 19 and 20, the operation of the secondary receiver $46_1$ is described according to an embodiment. For example purposes, it is assumed that the pilot-symbol-pattern matrix used by the primary transmitter $44_0$ (FIG. 10) is $P_{pilot\_primary}^{(0)}$, the pilot-symbol-pattern matrix used by the secondary transmitter $44_1$ (FIG. 10) is $P_{pilot\_secondary}^{(1)}$ and the secondary receiver $46_1$ "knows" that the secondary transmitter $44_1$ uses $P_{pilot\_secondary}^{(1)}$ (the secondary receiver need not "know" that the primary transmitter uses $P_{pilot\_primary}^{(0)}$ because $P_{pilot\_primary}^{(0)}$ is orthogonal to $P_{pilot\_secondary}^{(1)}$). Furthermore, it is assumed that the secondary transmitter $44_1$ uses all values $2 \leq i \leq$ $$\left\lfloor \frac{N_P}{Z} \right\rfloor$$

to generate the data-symbol-pattern matrices $P_{data\_secondary}^{(i)}$.

During a mono-transmission period while only the secondary transmitter $44_1$ (FIG. 10) is transmitting a secondary OFDM signal, the signal detector 190 disables the data-recovery unit 184.

Consequently, the FFT unit 180 may conventionally generate $y^{(s)} = y^{(s,s)} + n^{(s)}$, where $n^{(s)}$ is noise generated by the secondary receiver $46_1$, not by the channel—$y^{(s)} = y^{(s,s)} + n^{(s)}$ because there is no primary OFDM signal being received by the secondary receiver. And, in response to $y^{(s,s)}$, the channel estimator 188 may conventionally generate a channel-estimation matrix $\hat{H}^{(s,s)}$ for the secondary channel $130_3$ (FIG. 15) between the secondary transmitter $44_1$ (FIG. 10) and the secondary receiver $46_1$—the channel estimator may account for the noise $n^{(s)}$ in a conventional manner, or may ignore it. For example, the channel estimator 188 may operate in a manner similar to the VSSO Kalman MIMO-OFDM channel estimator described in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011, which are incorporated by reference.

The data-recovery unit 182 may conventionally recover the data symbols $\hat{x}$ from the data subcarriers of the secondary OFDM signal in response to $\hat{H}^{(s,s)}$, and the data-decoder unit 186 may conventionally decode the recovered data symbols $\hat{x}$.

Still referring to FIGS. 19 and 20, during a simultaneous-transmission period while both the primary transmitter $44_0$ (FIG. 10) and the secondary transmitter $44_1$ are respectively transmitting primary and secondary OFDM signals, the signal detector 190 enables the simultaneous-transmission-mode data-recovery unit 184.

Consequently, the FFT unit 180 may conventionally generate $y^{(s)} = y^{(p,s)} + y^{(s,s)} + n^{(s)}$ and, in response to $y^{(s,s)}$, the channel estimator 188 may conventionally generate a concatenation vector $\hat{h}^{(s,s)}$ per equation (26) above, and may conventionally generate $\overline{y}^{(s)}$ per equation (35) above. In an embodiment, the channel estimator 188 may be able to generate $\hat{h}^{(s,s)}$ because the secondary pilot-symbol-pattern matrix $P_{pilot\_secondary}^{(1)}$ is orthogonal to the primary pilot-symbol-pattern matrix pilot $P_{pilot\_primary}^{(0)}$ as discussed above in conjunction with FIG. 14. For example, the channel estimator 188 may generate $\hat{h}^{(s,s)}$ in a manner similar to the VSSO Kalman MIMO-OFDM channel estimator described in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011, which are incorporated by reference.

Next, in response to $\hat{h}^{(s,s)}$ and $\overline{y}^{(s)}$, the data-recovery unit 184 generates $\hat{x}_t$ as described below in conjunction with FIG. 20.

Referring to FIG. 20, the operation of the data-recovery unit 184 during a simultaneous-transmission period is described according to an embodiment.

First, the generator 200 generates matrices $\phi_l^{(i)}$ for $1 \leq i \leq$ $$\left\lfloor \frac{N_P}{Z} \right\rfloor$$

and $0 \leq l \leq Z-1$ per equation (37) above.

Next, the generator 206 generates (or has previously stored) values for $q_l^{(i)H}$ for $1 \leq i \leq$ $$\left\lfloor \frac{N_P}{Z} \right\rfloor$$

per equation (36) above.

Then, in response to $\phi_l^{(i)}$ and $q_l^{(i)H}$ for $2 \leq i \leq$ $$\left\lfloor \frac{N_P}{Z} \right\rfloor$$

and $0 \leq i \leq Z-1$, and in response to $\hat{h}^{(s,s)}$, the generator 202 generates $\delta_l^{(i)}$ for $2 \leq i \leq$ $$\left\lfloor \frac{N_P}{Z} \right\rfloor$$

and $0 \leq i \leq Z-1$ according to the following equation:

$$\delta_l^{(i)} = q_l^{(i)H} \phi_l^{(i)} \overline{y}^{(s,s)}(lQ \to lQ+Q-1) \tag{49}$$

Because $\overline{y}^{(s)}$ is the combination of $\overline{y}^{(p,s)}$ and $\overline{y}^{(s,s)}$, the following equations are true:

$$\overline{y}^{(s)} = \overline{y}^{(p,s)} + \overline{y}^{(s,s)} \tag{50}$$

and $$q_l^{(i)H} \overline{y}^{(s)} = q_l^{(i)H} \overline{y}^{(p,s)} + q_l^{(i)H} \overline{y}^{(s,s)} \tag{51}$$

But because $P_{pilot\_primary}$ is orthogonal to $P_{pilot\_secondary}^{(1)}$ and $P_{data\_secondary}^{(i)}$:

$$q_l^{(i)H} \overline{y}^{(p,s)} = 0 \tag{52}$$

for $1 \leq i \leq$ $$\left\lfloor \frac{N_P}{Z} \right\rfloor.$$

Consequently, equation (51) reduces to the following equation for $1 \leq i \leq$ $$\left\lfloor \frac{N_P}{Z} \right\rfloor:$$

And because $q_l^{(i)H}$ and $\overline{y}^{(s)}$ are known, $q_l^{(i)H} \overline{y}^{(s,s)}$ of equations (51) and (53) is also known for $1 \leq i \leq$ $$\left\lfloor \frac{N_P}{Z} \right\rfloor.$$

Next, the generator 204 generates $\overline{X}_i$ for $2 \leq i \leq $ $$\left\lfloor \frac{N_P}{Z} \right\rfloor$$

according to the following equation:

$$\hat{X}_i = \text{Hard Decision of } \{\Sigma_{l=0}^{Z-1} \delta_l^{(9i)} * q_l^{(i)H} \overline{y}^{(s,s)}\} \quad (54)$$

which may be written as follows per equation (53):

$$\hat{X} = \text{Hard Decision of } \{\Sigma_{l=0}^{Z-1} \delta_l^{(i)} * q_l^{(i)H} \overline{y}^{(s)}\} \quad (55)$$

where "*" indicates the complex conjugate of $\delta_l^{(i)}$.

Referring to FIGS. 19 and 20, alternate embodiments of the secondary receiver $46_1$ are contemplated. For example, the secondary receiver $46_1$ may operate in a manner similar to that described above where there are multiple secondary transmitters 44 transmitting secondary OFDM signals during a simultaneous-transmission period. In addition, the order in which the generators 200, 202, 204, 206, and 208 perform their respective operations may be different than described above. Moreover, because the elements of $\overline{y}^{(s)}$ are a subset of the elements of $y^{(s)}$, then the simultaneous-transmission-mode data-recovery unit 184 may derive the elements of $\overline{y}^{(s)}$ directly from the elements of $y^{(s)}$ instead of receiving $\overline{y}^{(s)}$ from the channel estimator 188. In addition, the components of the secondary transmitter $44_1$ may be implemented in hardware, software, or a combination of hardware and software.

Figure 21:
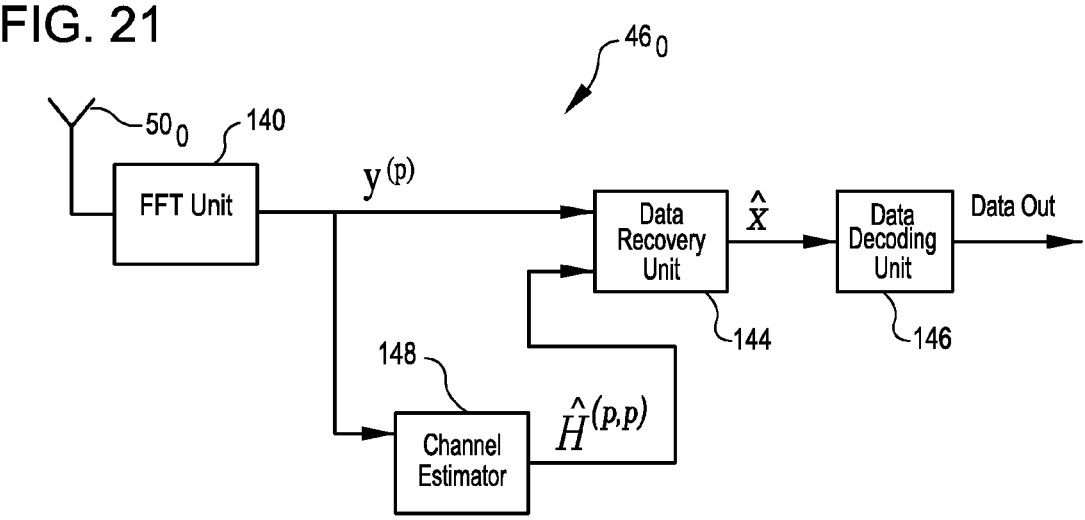
FIG. 21 is a diagram of a higher-priority receiver that may receive, and recover data from, a primary OFDM signal according to another embodiment.

FIG. 21 is a diagram of the primary receiver $46_0$ of FIG. 10 according to an embodiment, and according to an example that is similar to the above example, but where the primary transmitter $44_0$ and secondary transmitter $44_1$ use FDKD pilot clusters (FIG. 7) instead of APCC pilot clusters (FIG. 8); that is the center columns of the matrices $P_{pilot\_primary}^{(0)}$, $P_{pilot\_secondary}^{(1)}$, and $P_{data\_secondary}^{(i)}$ are the same as described above in conjunction with FIGS. 14 and 17-20, but all of the other columns of these matrices equal zero. Therefore, the primary receiver $46_0$ of FIG. 21 may be similar to the primary receiver $46_0$ of FIG. 17, but without the signal-recovery unit 146 and the signal detector 150. As discussed below, because FDKD pilot clusters are used, the guard subcarriers of the secondary pilot clusters do not interfere with the data subcarriers of the primary OFDM signal, and, therefore, the primary receiver $46_0$ may effectively "ignore" the secondary OFDM signal because $P_{pilot\_primary}^{(0)}$ is orthogonal to $P_{pilot\_secondary}^{(0)}$ and $P_{data\_secondary}^{(i)}$.

Referring to equation (41) above, because $P_{pilot\_primary}^{(0)}$ is orthogonal to $P_{pilot\_secondary}^{(1)}$ and $P_{data\_secondary}$:

$$q_l^{(0)H} \overline{y}^{(s,p)} = 0 \quad (56)$$

such that $$q_l^{(0)H} \overline{y}^{(p)} = q_l^{(0)H} \overline{y}^{(p,p)} \quad (57)$$

It follows from equation (57) that the channel estimator 148 may determine $\hat{h}^{(p,p)}$ and $\hat{H}^{(p,p)}$ without "knowing" $P_{pilot\_secondary}^{(1)}$ and $P_{data\_secondary}^{(i)}$, and without even considering the secondary pilot subcarriers of the secondary OFDM signal. For example, the channel estimator 148 may be a VSSO Kalman estimator as described in U.S. patent application Ser. No. 13/284,879, filed Oct. 29, 2011, Ser. No. 13/284,890 filed Oct. 29, 2011, Ser. No. 13/284,894 filed Oct. 29, 2011, and Ser. No. 13/284,898 filed Oct. 29, 2011.

Alternate embodiments of the primary receiver $46_0$ of FIG. 21 are contemplated. For example, components of the primary receiver $46_0$ may be implemented in hardware, software, or a combination of hardware and software.

Furthermore, according to the example described in conjunction with FIG. 21 where the primary transmitter $44_0$ and secondary transmitter $44_1$ use FDKD pilot clusters (FIG. 7) instead of APCC pilot clusters (FIG. 8), the secondary receiver $46_1$ of FIGS. 19 and 20 may be used without modification.

Figure 22:
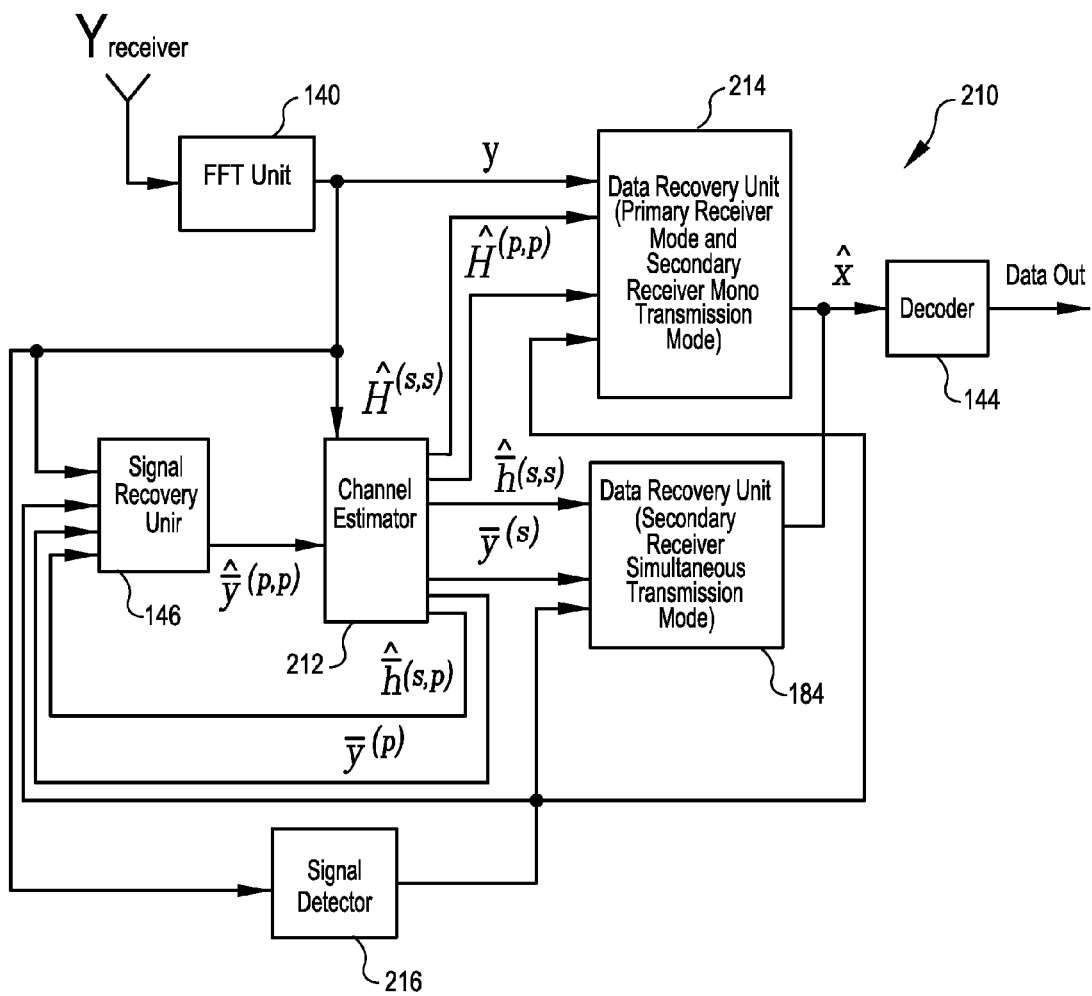
FIG. 22 is a diagram of a receiver that may operate as a higher-priority receiver or a lower-priority receiver according to an embodiment.

FIG. 22 is a diagram of a receiver 210, which may function as a primary receiver and a secondary receiver according to an embodiment where the primary and secondary transmitters 44 respectively transmit primary and secondary OFDM signals that include APCC pilot clusters. One may form the receiver 210 by modifying the receiver $46_0$ of FIG. 17 to include the simultaneous-transmission-mode data-recovery unit 184 of the receiver $46_1$ of FIG. 19, by including a channel estimator 212, which performs the above-described operations of the channel estimators 148 and 188 of FIGS. 17 and 19, respectively, by including a data-recovery unit 214, which performs the above-described operations of the data-recovery units 142 and 182 of FIGS. 17 and 19, respectively, and by including a signal detector 216, which performs the above-described operations of the signal detectors 150 and 190 of FIGS. 17 and 19, respectively, which causes the signal-recovery unit 146 and the data-recovery units 184 and 214 to operate appropriately depending on whether the receiver 210 is operating as a primary or secondary receiver and whether the receiver is operating during a mono- or simultaneous-transmission mode. The receiver 210 may include the ability to inform transmitters and other receivers whether it is operating as a primary or secondary receiver, and may include the ability to switch dynamically from primary- to secondary-receiver operation.

Alternate embodiments of the primary-secondary receiver 210 are contemplated. For example, components of the receiver 210 may be implemented in hardware, software, or a combination of hardware and software.

Figure 23:
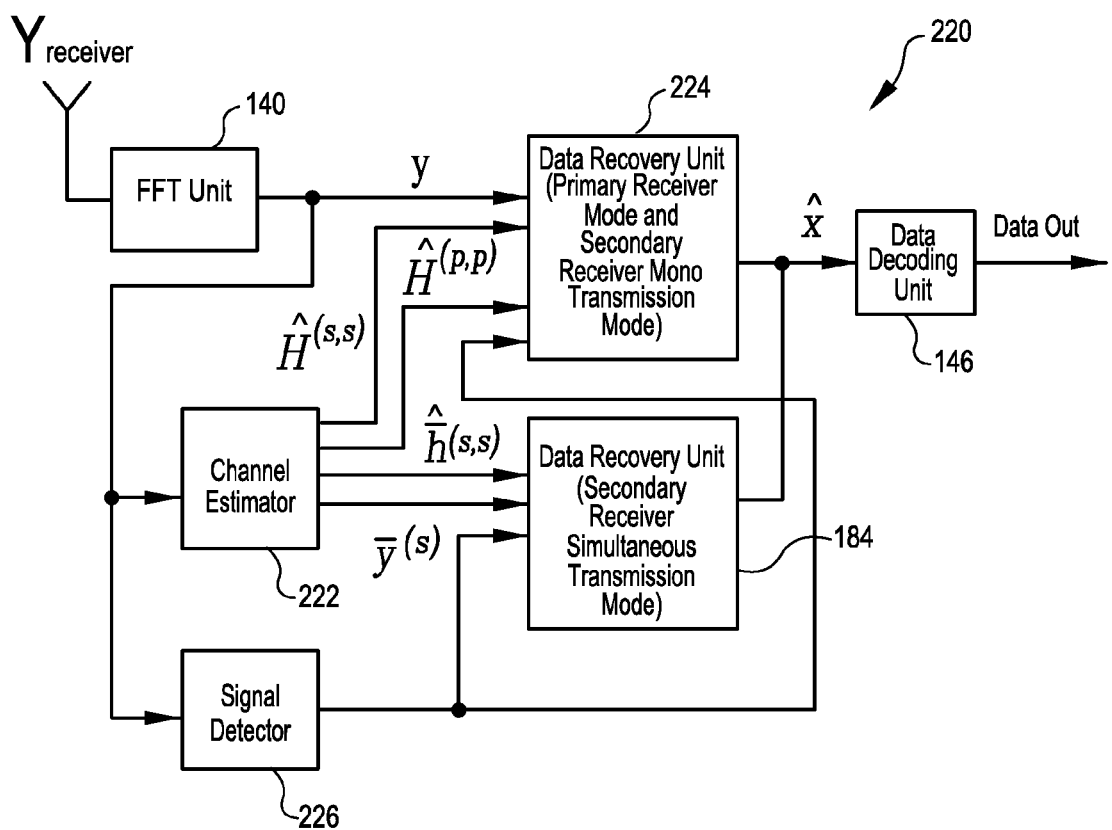
FIG. 23 is a diagram of a receiver that may operate as a higher-priority receiver or a lower-priority receiver according to another embodiment.

FIG. 23 is a diagram of a receiver 220, which may function as a primary receiver and a secondary receiver according to an embodiment where the primary and secondary transmitters 44 respectively transmit primary and secondary OFDM signals that include FDKD pilot clusters. One may form the receiver 220 by modifying the receiver $46_0$ of FIG. 21 to include the simultaneous-transmission-mode data-recovery unit 184 of the receiver $46_1$ of FIG. 19, by including a channel estimator 222 that performs the above-described operations of the channel estimators 148 and 188 of FIGS. 21 and 19, respectively, by including a data-recovery unit 224 that performs the above-described operations of the data-recovery units 144 and 182 of FIGS. 21 and 19, respectively, and by including a signal detector 226 that performs the above-described operations of the signal detector 190 of FIG. 19 and that causes the data-recovery units 184 and 224 to operate appropriately depending on whether the receiver 220 is operating as a primary or secondary receiver and whether the receiver is operating during a mono- or simultaneous-transmission mode. The receiver 220 may include the ability to inform transmitters and other receivers whether it is operating as a primary or secondary receiver, and may include the ability to switch dynamically from primary- to secondary-receiver operation.

Alternate embodiments of the primary-secondary receiver 220 are contemplated. For example, components of the receiver 220 may be implemented in hardware, software, or a combination of hardware and software.

Figure 24:
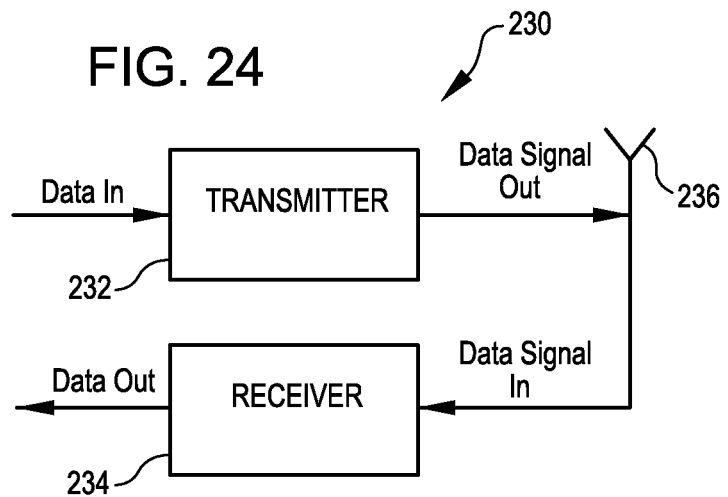
FIG. 24 is a diagram of a transmitter-receiver that includes a transmitter, such as the transmitter of FIG. 13 or 14, and a receiver, such as the receiver of FIG. 17, 19, 21, 22, or 23.

FIG. 24 is a diagram of a transmitter-receiver 230, which includes a transmitter 232, a receiver 234, and a transmit-receive antenna 236 according to an embodiment. The transmitter 232 may include a primary transmitter such as the primary transmitter 44 of FIG. 13, a secondary transmitter such as the secondary transmitter 44 of FIG. 14, a combination primary-secondary transmitter, or a combination of primary and secondary transmitters. Similarly, the receiver 234 may include a primary receiver such as the primary receiver $46_0$ of FIG. 17 or 21, a secondary receiver such as the secondary receiver $46_1$ of FIG. 19, a primary-secondary receiver such as the primary-secondary receiver 210 or 220 of FIGS. 22 and 23, respectively, or a combination of primary and secondary receivers.

In operation according to an embodiment, the transmitter 232 receives data, and generates a primary or secondary OFDM signal that includes the data as described above in conjunction with FIG. 11A, 11B, 13, or 14. And the receiver 234 receives a primary or secondary OFDM signal that includes data, and recovers the data as described above in conjunction with FIG. 17, 18, 19, 20, 21, 22, or 23.

Alternate embodiments of the transmitter-receiver 230 are contemplated. For example, the transmitter-receiver 230 may include components that are omitted from FIG. 24. Furthermore, components of the transmitter-receiver 230 may be implemented in hardware, software, or a combination of hardware and software.

Figure 25:
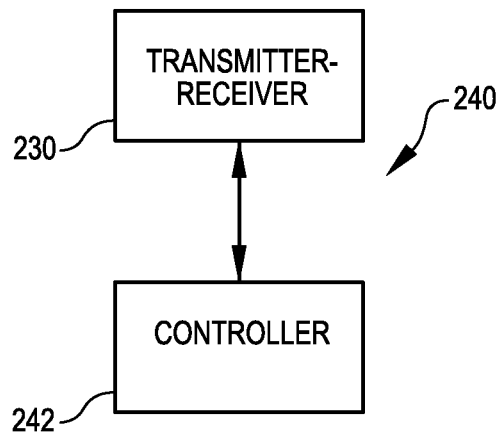
FIG. 25 is a diagram of a system that includes a transmitter-receiver, such as the transmitter-receiver of FIG. 24, and a controller.

FIG. 25 is a diagram of a system 240, which includes the transmit-receiver 230 of FIG. 24 and a controller 242, which controls, and receives information from, the transmitter-receiver according to an embodiment. The controller 242 may be, for example, a microcontroller or a microprocessor, and where the transmitter-receiver 230 and the controller are ICs, the transmitter-receiver and controller may be on a same die or on a different dies.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs to form a device such as a transmitter-receiver, and one or more of such devices may be coupled or otherwise used together to form a system. In addition, any described component or operation may be implemented/performed in hardware, software, or a combination of hardware and software. Furthermore, one or more components of a described apparatus or system may have been omitted from the description for clarity or another reason. Moreover, one or more components of a described apparatus or system that have been included in the description may be omitted from the apparatus or system.

What is claimed is:

1. A receiver comprising:
    a channel estimator configured to
        simultaneously receive first and second signals over a channel,
        determine a channel characteristic of the channel, the first and second signals respectively having first and second components, the first component having a first pilot subcarrier modulated with a first pilot sub-symbol and with at least one data sub-symbol, the at least one data sub-symbol being orthogonal to the first pilot sub-symbol, the second component having a second pilot subcarrier modulated with a second pilot sub-symbol, the second pilot sub-symbol being orthogonal to the first pilot sub-symbol and the at least one data sub-symbol; and
    a data-recovery unit configured to recover data from the first signal in response to the determined channel characteristic by recovering the at least one data sub-symbol from the first component of the first signal.

2. The receiver of claim 1 wherein the first and second components each includes a same center frequency.

3. The receiver of claim 1 wherein the first and second pilot subcarriers are at a same center frequency.

4. The receiver of claim 1 wherein the first and second pilot subcarriers are at a same center frequency; and wherein the second signal includes a data subcarrier at another frequency.

5. The receiver of claim 1 wherein the data-recovery unit is configured to recover the data from a pilot component of the first signal.

6. A receiver comprising:
    a channel estimator configured to determine a channel characteristic of a channel over which a first signal, which is received simultaneously with a second signal, propagated, the first and second signals respectively having first and second components; and
    a data-recovery unit configured to recover data from the first signal in response to the determined channel characteristic;
    wherein the first component includes a first pilot subcarrier modulated with a first pilot subsymbol and with at least one data subsymbol that is orthogonal to the first pilot subsymbol;
    wherein the second component includes a second pilot subcarrier modulated with a second pilot subsymbol that is orthogonal to the first pilot subsymbol and to the at least one data subsymbol; and
    wherein the data-recovery unit is configured to recover the data by recovering the at least one data subsymbol from the first component of the first signal.

7. A receiver comprising:
    a channel estimator configured to determine a channel characteristic of a channel over which a first signal, which is received simultaneously with a second signal, propagated, the first and second signals respectively having first and second components that include a first frequency; and
    a data-recovery unit configured to recover data from the first signal in response to the determined channel characteristic;
    wherein the first component includes first pilot subcarriers at respective second and third frequencies, one of the second and third frequencies being the same as the first frequency, the first pilot subcarriers being modulated with a first pilot symbol and with at least one data symbol that is orthogonal to the first pilot symbol;
    wherein the second component includes second pilot subcarriers at the second and third frequencies and being modulated with a second pilot symbol that is orthogonal to the first pilot symbol and to the at least one data symbol; and
    wherein the data-recovery unit is configured to recover the data by recovering the at least one data symbol from the first component of the first signal.

8. A receiver comprising
    a channel estimator configured to determine a channel characteristic of a channel over which a first signal, which is received simultaneously with a second signal, propagated, the first and second signals respectively having first and second components;
    a data-recovery unit configured to recover data from the first signal in response to the determined channel characteristic; and a detector configured to
- detect the second signal, to enable the data-recovery unit to recover the data from the first signal while the detector is detecting the second signal, and
- disable the data-recovery unit from recovering the data from the first signal while the detector is not detecting the second signal.

9. A method comprising:
- receiving first and second signals simultaneously, the first and second signals respectively including first and second components;
- determining a channel characteristic of a channel over which the first signal propagated; and
- recovering data from the first signal in response to the determined channel characteristic;
- wherein the first component includes a first pilot subcarrier modulated with a first pilot subsymbol and with at least one data subsymbol that is orthogonal to the first pilot subsymbol;
- wherein the second component includes a second pilot subcarrier modulated with a second pilot subsymbol that is orthogonal to the first pilot subsymbol and to the at least one data subsymbol; and
- wherein the recovering of the data includes recovering the data by recovering the at least one data subsymbol from the first component of the first signal.

10. A method comprising:
- receiving first and second signals simultaneously, the first and second signals respectively including first and second components that each include a first frequency;
- determining a channel characteristic of a channel over which the first signal propagated; and
- recovering data from the first signal in response to the determined channel characteristic;
- wherein the first component includes first pilot subcarriers at respective second and third frequencies, one of the second and third frequencies being the same as the first frequency, the first pilot subcarriers being modulated with a first pilot symbol and with at least one data symbol that is orthogonal to the first pilot symbol;
- wherein the second component includes second pilot subcarriers at the second and third frequencies and being modulated with a second pilot symbol that is orthogonal to the first pilot symbol and to the at least one data symbol; and
- wherein the recovering of the data includes recovering the data by recovering the at least one data symbol from the first component of the first signal.

11. A method comprising:
- receiving first and second signals simultaneously, the first and second signals respectively including first and second components;
- determining a channel characteristic of a channel over which the first signal propagated; and
- recovering data from the first signal in response to the determined channel characteristic; and
- wherein recovering the data includes recovering the data from the first component of the first signal while the second signal is being simultaneously received with the first signal, and not recovering data from the first component of the first signal while the second signal is not being simultaneously received with the first signal.

12. A method comprising:
- receiving first and second signals simultaneously, the first and second signals respectively including first and second components;
- determining a channel characteristic of a channel over which the first signal propagated; and
- recovering data from the first signal in response to the determined channel characteristic, the recovering comprising
  - recovering the data from the first component of the first signal while the second signal is being simultaneously received with the first signal, and
  - recovering data from another component of the first signal while the second signal is not being simultaneously received with the first signal.

13. A non-transitory computer-readable medium storing instructions that, when executed by a computing apparatus, cause the computing apparatus to perform a method comprising:
- receiving first and second signals simultaneously, the first and second signals respectively including first and second components;
- determining a channel characteristic of a channel over which the first signal propagated;
- recovering data from the first signal in response to the determined channel characteristic, the recovering comprising
  - recovering the data from the first component of the first signal while the second signal is being simultaneously received with the first signal, and
  - recovering data from another component of the first signal while the second signal is not being simultaneously received with the first signal.

* * * * *

UNITED STATES PATENT AND TRADEMARK OFFICE
CERTIFICATE OF CORRECTION

| | | |
|---|---|---|
| PATENT NO. | : 9,130,789 B2 | Page 1 of 2 |
| APPLICATION NO. | : 13/560947 | |
| DATED | : September 8, 2015 | |
| INVENTOR(S) | : Muralidhar et al. | |

It is certified that error appears in the above-identified patent and that said Letters Patent is hereby corrected as shown below:

Title Pages 1 and 2, item 63, Related U.S. Application Data

Delete the entire item (63)

Insert -- Continuation-in-part of application No. 13/284,879, filed on Oct. 29, 2011, and a continuation-in-part of application No. 13/284,890, filed on Oct. 29, 2011, and a continuation-in-part of application No. 13/284,894, filed on Oct. 29, 2011, and a continuation-in-part of application No. 13/284,898, filed on Oct. 29, 2011, said application No. 13/284,879 is a continuation-in-part of application No. 12/963,569, filed on Dec. 8, 2010, now Pat. No. 9,020,050, said application No. 13/284,879 is a continuation-in-part of application No. 12/579,935, filed on Oct. 15, 2009, now Pat. No. 8,737,536, said application No. 13/284,879 is a continuation-in-part of application No. 12/579,969, filed on Oct. 15, 2009, now Pat. No. 8,718,208, said application No. 13/284,890 is a continuation in-part of application No. 12/963,569, filed on Dec. 8, 2010, now Pat. No. 9,020,050, said application No. 13/284,890 is a continuation in-part of application No. 12/579,935, filed on Oct. 15, 2009, now Pat. No. 8,737,536, said application No. 13/284,890 is a continuation-in-part of application No. 12/579,969, filed on Oct. 15, 2009, now Pat. No. 8,737,536, said application No. 13/284,894 is a continuation in-part of application No. 12/963,569, filed on Dec. 8, 2010, now Pat. No. 9,020,050, said application No. 13/284,894 is a continuation-in-part of application No. 12/579,935, filed on Oct. 15, 2009, now Pat. No. 8,737,536, said application No. 13/284,894 is a continuation in-part of application No. 12/579,969, filed on Oct. 15, 2009, now Pat. No. 8,718,208, said application No. 13/284,898 is a continuation-in-part of application No. 12/963,569, filed on Dec.

Signed and Sealed this
Nineteenth Day of January, 2016

Michelle K. Lee
*Director of the United States Patent and Trademark Office*

8, 2008, now Pat. No. 9,020,050, said application No. 13/284,898 is a continuation in-part of application No. 12/579,935, filed on Oct. 15, 2009, now Pat. No. 8,737,536, said application No. 13/284,898 is a continuation-in-part of application No. 12/579,969, filed on Oct. 15, 2009, now Pat. No. 8,718,208. --